United States Patent [19]

Atwell et al.

[11] Patent Number: 5,073,392

[45] Date of Patent: Dec. 17, 1991

[54] PROCESS OF FORMING A MICROWAVEABLE FOOD PRODUCT HAVING A SELECTED COLOR

[75] Inventors: William A. Atwell, Andover; David J. Domingues, Plymouth; Paul J. Beckmann, Mendota Heights; Julio R. Panama, Blaine; Steven K. Fahrenholtz, Plymouth, all of Minn.

[73] Assignee: The Pillsbury Company, Minneapolis, Minn.

[21] Appl. No.: 611,159

[22] Filed: Nov. 8, 1990

Related U.S. Application Data

[62] Division of Ser. No. 339,567, Apr. 17, 1989.

[51] Int. Cl.$^5$ ............................................. A23L 1/00
[52] U.S. Cl. .................................. 426/231; 426/243; 426/262; 426/305
[58] Field of Search ............... 426/231, 233, 242, 243, 426/262, 305, 549, 94

[56] References Cited

U.S. PATENT DOCUMENTS

| | | | |
|---|---|---|---|
| 4,448,791 | 5/1984 | Fulde et al. | 426/94 |
| 4,650,686 | 3/1987 | Young et al. | 426/321 |
| 4,675,197 | 6/1987 | Banner et al. | 426/292 |
| 4,735,812 | 4/1988 | Bryson et al. | 426/262 |
| 4,751,090 | 6/1988 | Belleson et al. | 426/93 |
| 4,755,392 | 7/1988 | Banner et al. | 426/555 |
| 4,857,340 | 8/1989 | Parliment et al. | 426/96 |
| 4,882,184 | 11/1989 | Buckholz et al. | 426/243 |
| 4,904,490 | 2/1990 | Buckholz et al. | 426/262 |
| 4,917,907 | 4/1990 | Kwis et al. | 426/90 |

OTHER PUBLICATIONS

David C. T. Pei, *Microwave Baking-New Developments-*, Bakers Digest, Feb., 1982.

*Primary Examiner*—George Yeung
*Attorney, Agent, or Firm*—Kinney & Lange

[57] ABSTRACT

A method of forming a microwaveable food product having a region of a preselected color is disclosed. The method employs the use of a programmed computer means which provides output information useful in making a microwaveable food product of a preselected color. Information is inputted into the programmed computer means, the information is processed and output information is produced. Food prepared according to the output information has a region of a selected color.

5 Claims, 30 Drawing Sheets

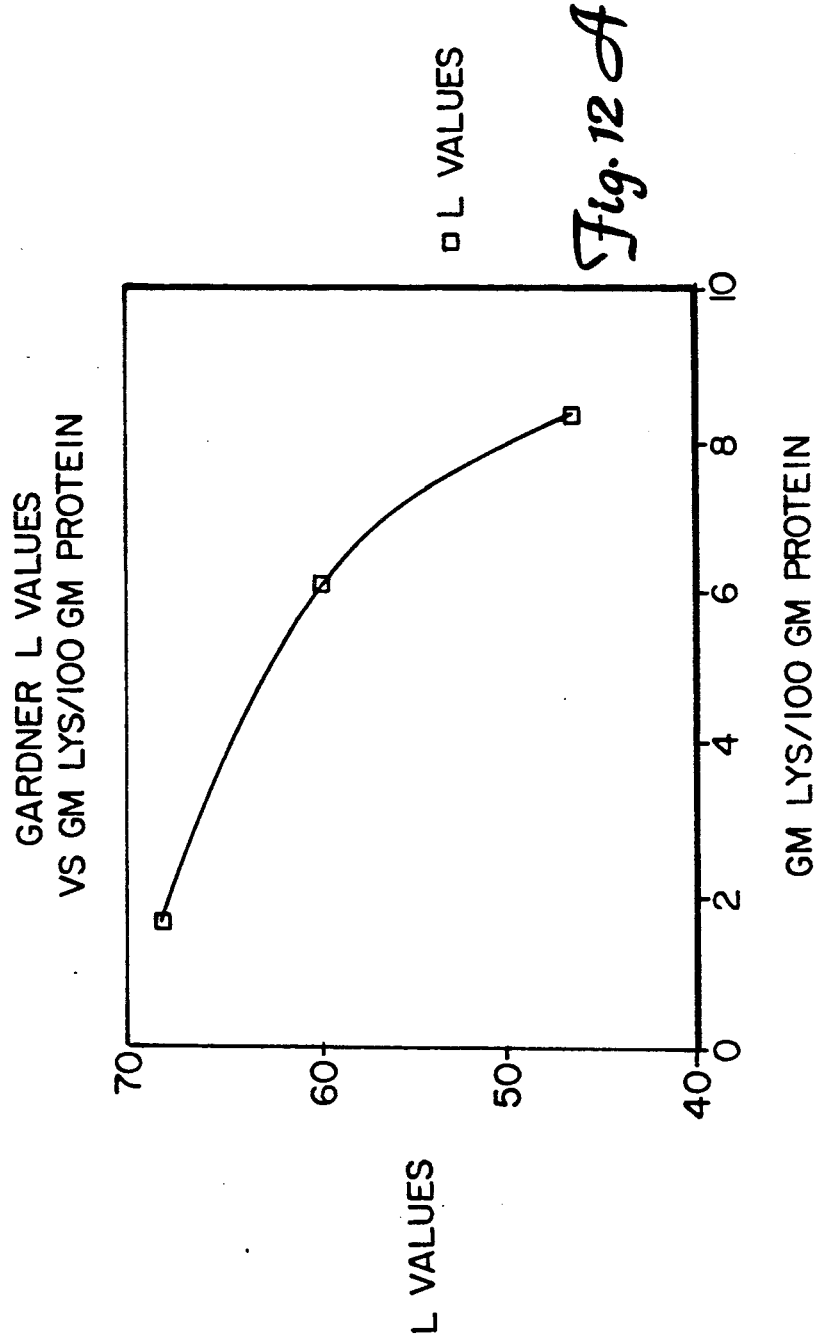

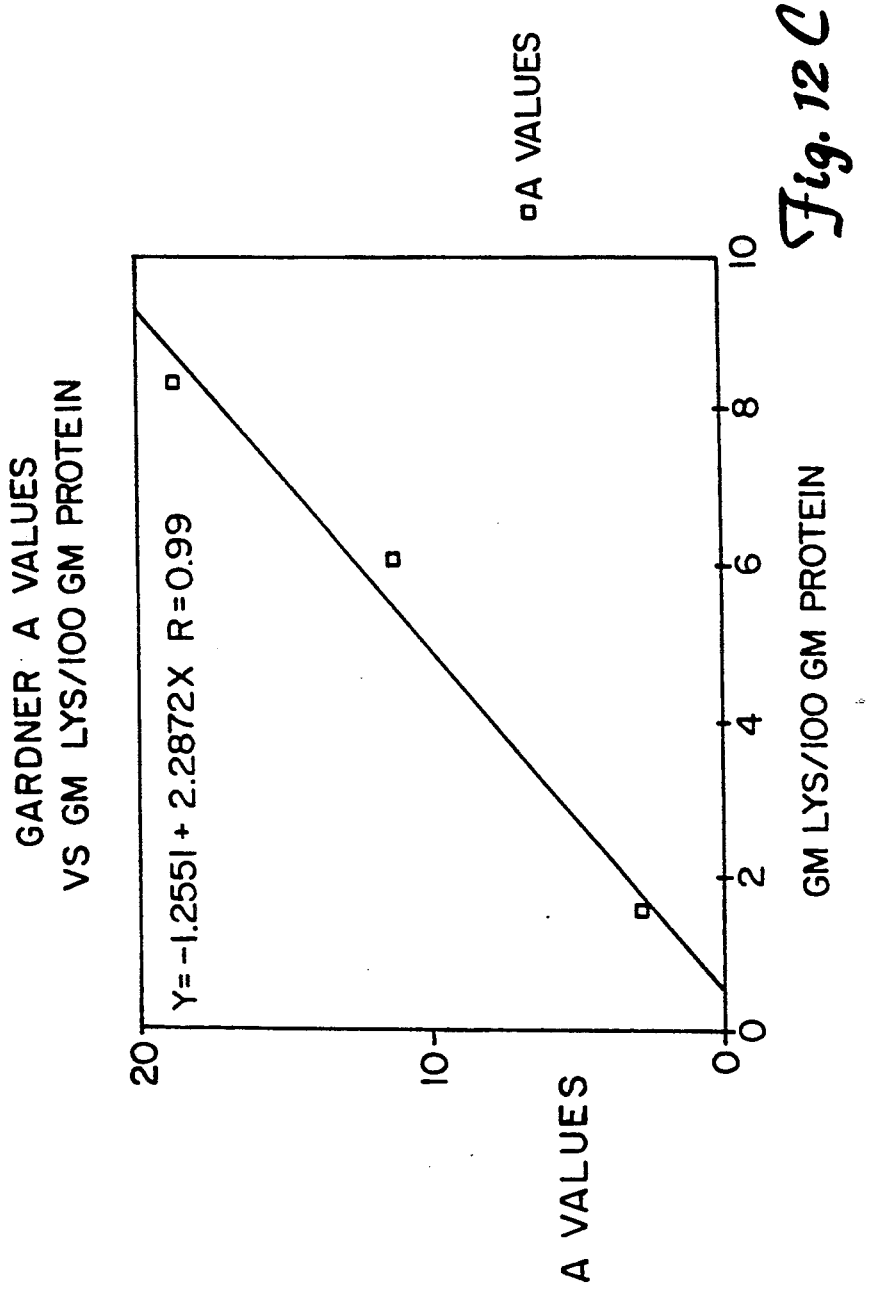

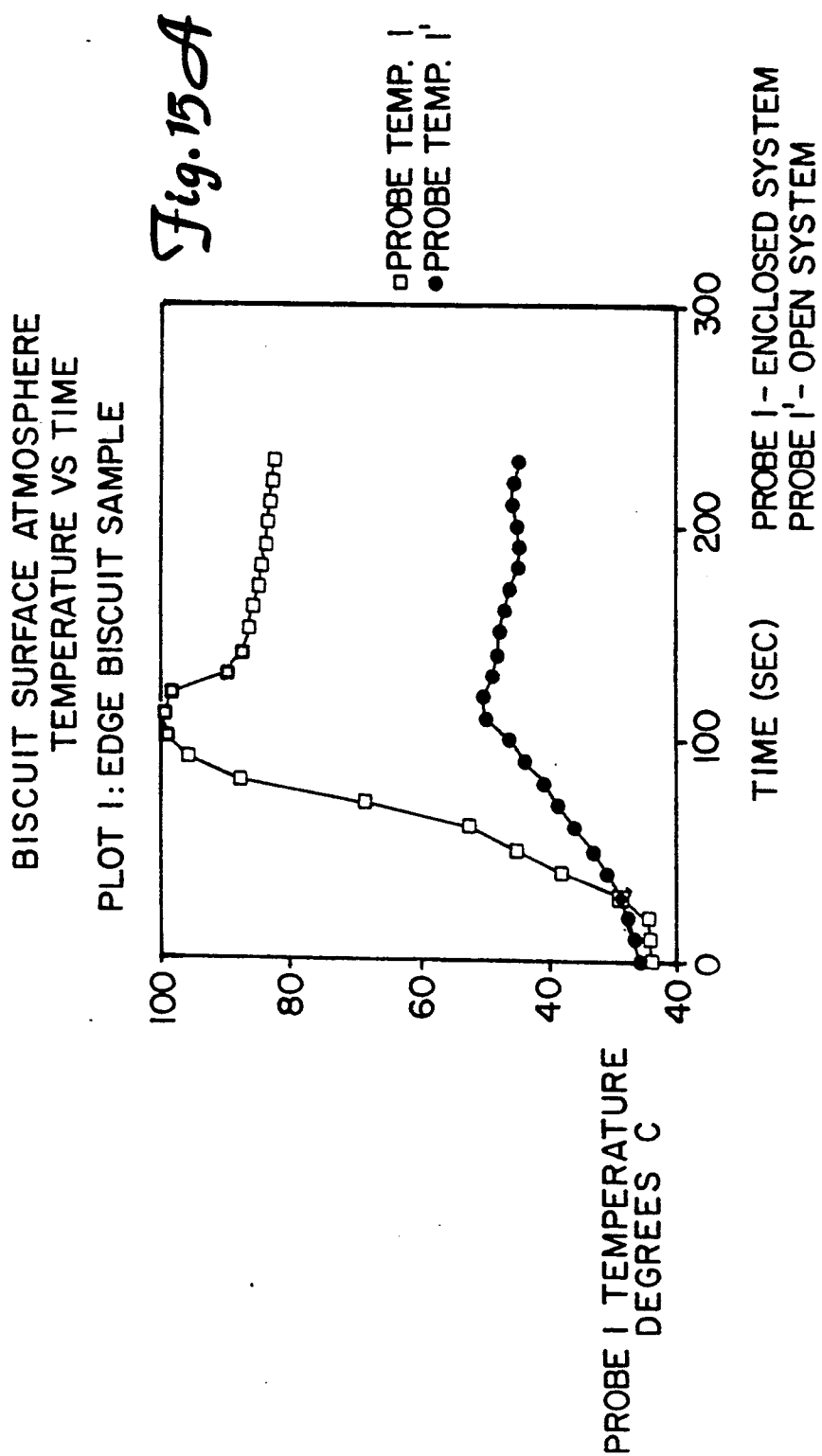

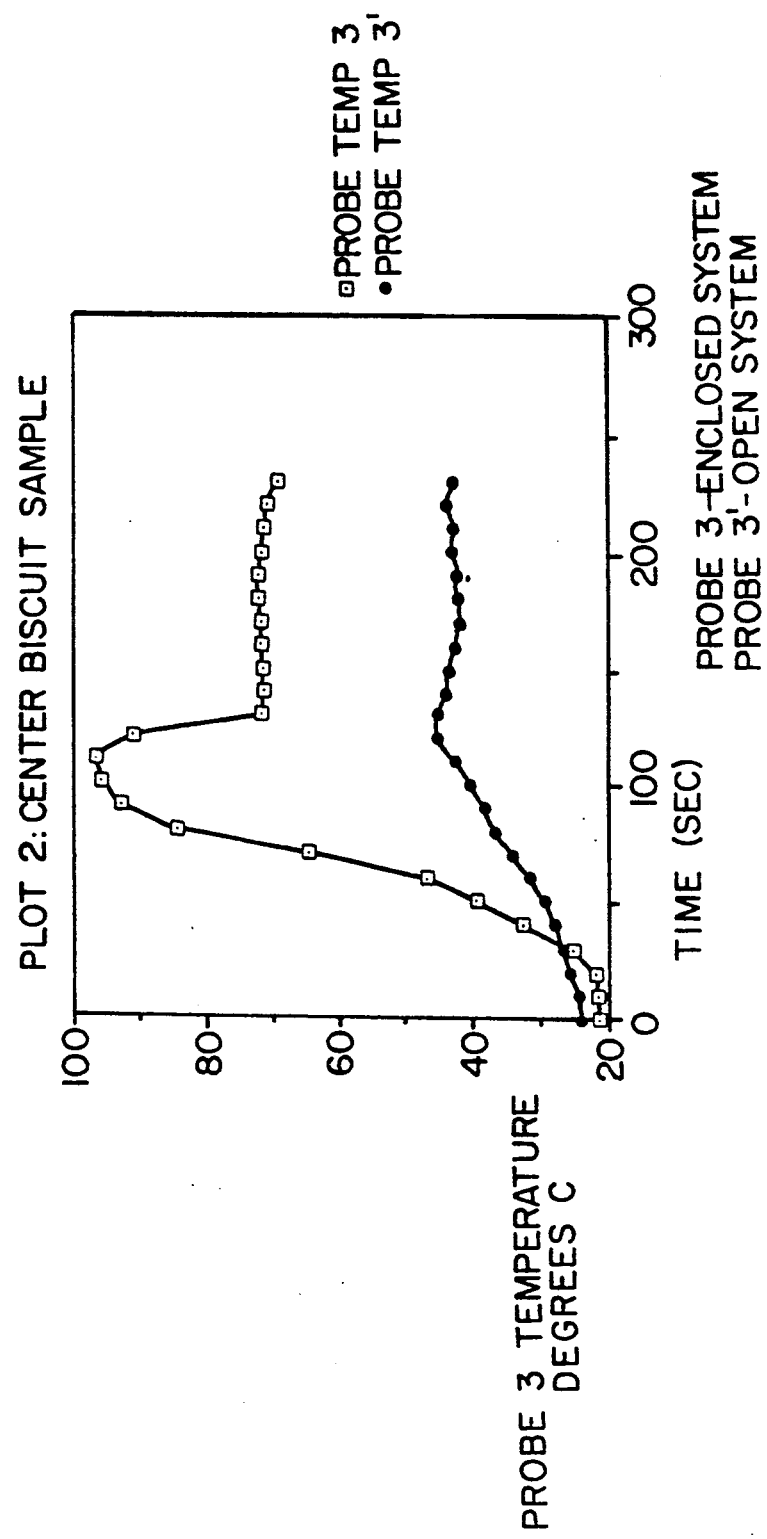

Fig. 22

| EP 120 RESPONSE SURFACE EXPERIMENT 3:4 | | | | | |
|---|---|---|---|---|---|
| TIME | SUGAR/PROTEIN | PERCENT SOY/ALBUMIN | PERCENT GLUCOSE/XYLOSE | PERCENT | SODA % |
| 80.0 | 0.917381 | 50.0 | 50.0 | 50.0 | 2.5 |

PROCESS OF FORMING A MICROWAVEABLE FOOD PRODUCT HAVING A SELECTED COLOR

The present application is a divisional application of parent case, Ser. No. 07/339,567, filed Apr. 17, 1989 for a PROCESS FOR MICROWAVE BROWNING.

BACKGROUND OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The present invention relates to a process for microwave-induced food browning, and to a food product. Using principles of food science and, more specifically, the principles of food browning chemistry, a browning system has been achieved that may be used to brown select regions of foods upon exposure to microwave radiation. Further, the invention includes a process for making a food product using computer, food, and color science.

A major part of the appetizing appearance of conventionally heated foods is imparted by brown colors developed on their surfaces during preparation. Consumers have come to expect this appearance and consider it desirable in a variety of food products including meat, cheese, and cereal grain based products. It is not usually difficult to obtain a browned appearance using conventional cooking because the reactions leading to brown colors will proceed for the components comprising the surface of most foods under conventional baking conditions. However, it has been very difficult to obtain brown colors on the surfaces of foods prepared in microwave ovens without using browning devices.

Reasons why surfaces of microwave prepared products do not brown have been suggested (see for example, D.C.T. Pei, Baker's Digest, February 1982). This reference states that the heat in a conventional oven is transmitted from the oven environment to the food surface via convection and transmitted from the surface to the interior of the product via conduction. This process of heat transfer enables the food surface to dehydrate and rise above the boiling point of water by the end of the conventional bake time. Microwaves, however, penetrate the surface of the product and directly heat the interior of the product. This induces moisture transfer to the surface. Evaporation of the moisture from the surface to the microwave oven environment usually restricts the surface temperature to a maximum of about the boiling point of water during the microwave bake time. The resultant surface temperature is too low to enable the browning reactions to proceed at the necessary rate with the browning reactants inherent to the product surface. In addition to the depressed rate of microwave browning versus conventional browning due to the temperature conditions, microwave preparation times are generally much shorter than conventional preparation times. Therefore, according to the aforementioned reference, the surface conditions and preparation times, resulting from the basic differences in heat transfer mechanisms between microwave and conventional heating, create a very difficult problem for those desiring to effect browning in a microwave oven.

Generally, the solutions to microwave browning can be divided into the following categories: packaging aided, cosmetic, and reactive coating approaches. The first approach involves the use of microwave susceptors which heat to temperatures exceeding the boiling point of water and brown surfaces in close proximity or direct contact (see for example, U.S. Pat. No. 4,266,108). Limitations of commercially available susceptors include the requirement of close proximity or direct contact, their generally uncontrolled temperature profile, and their generally high cost. The second approach is cosmetic and includes various surface applied formulations that are brown prior to application (U.S. Pat. No. 4,640,837, and U.S. patent application Ser. No. 251,035 Zimmerman, filed on Sept. 26, 1988, now abandoned). The third approach involves coating the surface with a formula that will react to yield a brown color at the surface conditions described above. Two such variations of this approach are described in U.S. Pat. Nos. 4,735,812 and 4,448,791.

The disclosure in assignee's United States patent application for an invention relating to "Color System and Method of Use on Foods" to Ernst Graf, et al., filed contemporaneously herewith, is incorporated herein by reference.

A discussion of microwave heating can be found in U.S. patent application Ser. No. 085,125 to Pesheck, et, filed on Aug. 13, 1987, now U.S. Pat. No. 5,008,507.

The success of a product approach to browning requires control over the rate of the browning reaction. During the shelf life of a product, the rate of browning should be controlled or the product may brown prior to preparation by the consumer. This is usually unacceptable to the consumer. Then, on exposure to a microwave field, the rate should be sufficiently high to brown the product during the short preparation times generally encountered with microwave products.

The invention described herein is primarily based on the chemistry of Maillard browning. Non-enzymatic browning of this type is well characterized, the literature on the subject is extensive and it i the most common form of browning in heated food systems.

There are many reviews of Maillard browning and associated reactions (e.g., Carbohydrates, In: Food Chemistry, H. D. Belitz and W. Grosch, Chapter 4, second edition, 1987, this reference is incorporated by reference herein). Although the myriad of individual reactions leading to the development of the brown melanoidin polymers has been extensively studied, reactions after the initial few steps are not well characterized. This complex series of reactions may be divided into three major categories: the initial condensation of the amine and the carbonyl, the formation of colorless intermediates, and the formation of colored compounds (e.g., the melanoidin polymers). FIG. 4 illustrates this highly simplified reaction scheme.

Promotion of browning in a microwave oven is a difficult problem. Initially, attempts were made to develop a microwave Maillard browning system capable of browning refrigerated doughs (e.g., Pillsbury refrigerated buttermilk biscuits). However, as mentioned earlier, there exist several inherent problems with respect to accomplishing this task (e.g., short cook time, etc.). One browning system examined employed pectin gels as the browning agent carrier. Although the gel system did brown microwave-prepared biscuit dough samples to a limited extent, the prepared biscuit dough samples in this study were found to have less than optimal crumb structure and surface texture.

Other food approved carrier systems were used in an attempt to improve the surface textural properties of the microwave prepared biscuit samples. Shortening was found to be preferred due to its ease of manipulation and broad product system applicability. Biscuit dough samples were coated with a mixture of reducing sugar, soy protein, and shortening; placed in a microwave oven; and cooked for a time sufficient to brown the surface. Unfortunately, it was observed that during the microwave cooking cycle, the biscuit samples became very dehydrated and overdone. In a further attempt to improve the textural properties of the biscuit samples, the samples were placed into a sealed plastic pouch prior to microwave treatment. Surprisingly, the pouched biscuit samples not only remained moist and soft, but also browned to a much greater extent in a much shorter time, when compared to biscuit samples prepared without a pouch.

The disclosure in U.S. patent application Ser. No. 213,013 to K. Anderson, et al., filed on June 29, 1988, now U.S. Pat. No. 4,842,876 is incorporated herein by reference.

These observations led to the conclusion that steam-containing packaging, and possibly other means of enhancing browning, in conjunction with microwave browning ingredient formulation, could be used as a means to control the browning reaction in such a manner as to allow product browning to coincide with product textural development.

The literature (e.g., Color Science Concepts and Methods, Quantitative Data and Formulae, G. Wyszecki and W. S. Stiles, John Wiley and Sons, Inc. 1982, this reference is incorporated by reference herein), indicates that the measurement of color is a very complicated subject.

A Pacific Scientific Gardner XL-20 Colorimeter and Milton Roy Visible Spectrophotometer were used throughout the research for this invention. The following discussion of the primary responses is based upon the instruction manual for the Gardner instrument (Gardner Laboratory Inc., 5521 Landy Lane, Bethesda, Md.).

Three responses were recorded for a routine color measurement. L corresponds to a scale defining a range from black (L=0) to white (L=100). Another value, $a_L$, defines the range from green ($a_L = -40$) to red ($a_L = +40$). Finally, $b_L$ defines a range from blue ($b_L = -40$) to yellow ($b_L = +40$). Subsequently, zero values for $a_{L\,pl\,and\,bL}$ correspond to white, grey, or black depending on the L value. Hue (type of color: orange, blue, etc.) and chroma (color intensity: vivid or dull) are defined by $a_L$ and $b_L$. FIG. 1, which is from the Gardner manual, illustrates the three dimensional space describing this system.

The L $a_L$ $b_L$ system is only one system of describing colors. Others include the L a* b* system and the Y x' y' system. Equations are available to convert from one system to another.

The L* a* b* system (FIG. 2) is very similar to the L $a_L$ $b_L$ system in that the same relative scales apply (L* is white to black, a* is green to red, and b* is blue to yellow). The Y x' y' system (FIG. 3), however, adopts a somewhat different form. The x' and y' coordinates define a point on an irregular portion of an x' y' plane that is composed of various colors. The perimeter of this area is graduated in nanometers corresponding to the wavelength of the corresponding hue. Both hue and chroma are defined by x' and y'. Y, a scale running perpendicular to x' and y', is a measure of lightness, somewhat analogous to L or L*.

SUMMARY OF THE INVENTION

The present invention involves a process for preparing a system for a microwave food product which browns during exposure to microwave radiation in a time sufficient to prepare a food for consumption. The process includes the steps of: selecting an appropriate carrier which is effective to inhibit browning during the manufacture, distribution, and shelf life of the product (if required), determining the microwave cook time for desirable texture or temperature, selecting particular browning agent(s) and controller(s) to yield the desired browned appearance in an appropriate microwave exposure time, preparing the browning system using these preselected components, and delivering the system to the desired or preselected region(s) of the food product.

The present invention further involves a process for browning a food product during exposure to microwave radiation for a time sufficient to prepare said food product for consumption. The invention encompasses alterations in color appearance. Consequently, application of the invention involves attaining acceptable textural characteristics of the target food product during microwave cooking. When the appropriate formulation and microwave recipe have been obtained, the invention described herein can be applied to attain a desirable browned appearance.

In accordance with one aspect of this invention, there is provided a food product having a browning region for developing a desired browning effect during preparation of the food product for consumption, the food product comprising:

(a) a starch based component;
(b) a browning system applied to the starch based component to provide the browning region; and
(c) the browning system comprising Maillard browning reactants for developing the desired browning effect during microwave irradiation, and a carrier system containing the Maillard browning reactants, the carrier system maintaining the Maillard browning reactants in a substantially reactively immobilized state on the food product prior to microwave irradiation and while the food product is at a temperature of about 40° F. (about 4° C.) for at least about two days.

The invention further extends to a process for making a food product which has a browning region for developing a desired browning effect during preparation of the food product for consumption by microwave irradiation, the process comprising:

(a) selecting a starch based component;
(b) applying a browning system to a browning surface area of the starch based component; and
(c) the browning system comprising Maillard browning reactants for developing a desired browning effect during microwave irradiation, and a carrier system containing the Maillard browning reactants, the carrier system maintaining the Maillard browning reactants in a substantially reactively immobilized state on the food product prior to microwave irradiation and while the food product is at a temperature of about 40° F. (about 4° C.) for at least about two days (about 48 hours).

The browning region is usually and preferably an external surface region or area of the food product.

However, where the browning region is within or extends to within the food product, it may be in selected areas or regions within the food product or may extend substantially throughout the food product.

In an alternative embodiment of the invention, only one of a pair of Maillard reactants may be contained in the carrier system in a substantially reactively immobilized state. Thus, in accordance with this embodiment of the invention, there is provided a food product having a browning surface region for developing a desired browning effect during preparation of the food product for consumption by microwave irradiation, the food product comprising:
(a) a starch based component:
(b) a first Maillard browning reactant applied to the browning surface area of the starch based component;
(c) a second Maillard browning reactant applied to the browning surface area, the second Maillard browning reactant being complementary to the first Maillard browning reactant for reacting therewith to develop the desired browning effect during microwave irradiation; and
(d) the second Maillard browning reactant being contained in a carrier system for maintaining that Maillard browning reactant in a substantially reactively immobilized state on the food product prior to microwave irradiation and while the food product is at a temperature of about 40° F. (about 4° C.) for at least about two days.

In accordance with this invention, the carrier system maintains at least one of the Maillard browning reactants in a substantially reactively immobilized state so that the reactants will not produce any significant browning effect during manufacture of the food product, during handling and storage of the food product under appropriate conditions, and preferably during the freeze/thaw cycles or cooling/heating cycles which are not unusual in frozen or refrigerated food products after manufacture of the food products and before they are heated for consumption by the consumer.

The carrier system is preferably such that the Maillard browning reactants will remain substantially reactively immobilized at temperatures of up to about 40° F. (about 4° C.) for periods of up to at least about two days, and preferably up to at least about four to six days.

Preferably, the carrier system is such that the Maillard browning reactants may be maintained in a substantially reactively immobilized state even at temperatures up to about 70° F. for at least about 2 days, and preferably for up to about four to six days.

In accordance with a further aspect of the invention, there is provided a process for making a food product which has a surface area developing a desired brown coloration during preparation of the food product for consumption by microwave irradiation for a predetermined period of time, the process comprising:
(a) preparing a suspension comprising substantially homogeneous coparticles of reducing sugar and proteinaceous substance in lipid to produce a browning suspension; and
(b) applying an amount of the browning suspension to an area of the surface of the food product, the amount being sufficient to develop the desired surface coloration during microwave irradiation of the food product for the predetermined period of time.

In accordance with yet a further aspect of the invention, there is provided a process for preparing a food product having a browning surface area for developing a desired browning effect during preparation of the food product for consumption, the process comprising:
(a) forming a solution comprising water, reducing sugar and proteinaceous substance, the reducing sugar and proteinaceous substance being in a ratio effective to produce Maillard browning to a desired degree;
(b) dehydrating said solution to produce a stable coparticulate browning composition which will brown when a food product to which it is applied is prepared for consumption by microwave irradiation for the predetermined period;
(c) suspending a quantity of the coparticulate browning composition in a lipid;
(d) applying the lipid to a browning surface area of a food product; and
(e) storing the food product at a temperature below about 40° F. (about 4° C.).

The Maillard browning reactants may be reactants of any appropriate type. The browning reactants may therefore include aldehyde or ketone-containing carbohydrates (for example, reducing sugars) capable of participating in Maillard browning, and amine-containing ingredients (for example, proteins, peptides, or amino acids) capable of participating in Maillard browning.

Embodiments of the invention may involve prereacting the Maillard browning reactants to yield substantially or generally colorless Maillard browning intermediates, or intermediates which generally match the color of the food product to which they are to be applied and which are therefore generally colorless in the context of their application to a manufactured food product. The reactants or intermediates may therefore be generally colorless, or may be "in situ colorless" where they generally match the color of the food product. These are the intended meanings of "colorless" and "in situ colorless" in the context of this application. The invention may further involve the formation of homogeneous coparticulates of the original reactants and any intermediates; may involve the formation of heterogeneous particles by the adsorption of the browning reactants onto particles (for example, silicates); and may involve the incorporation of browning controllers.

In some cases, the addition of browning controllers to affect the rate of subsequent Maillard browning in situ may be used. Browning controllers may include pH-adjusting ingredients (e.g., sodium bicarbonate, sodium hydroxide), phosphate salts (e.g., sodium or potassium phosphate salts), enzymes (e.g., mutarotase or a protease), metal ions (e.g., iron and copper salts), steam-retaining packaging, packaging susceptors, and ionizable salts capable of affecting the dielectric properties of the browning system in such a way that the temperature of the browning system is greater, upon exposure to microwave energy, than when salt is absent.

While this invention relates particularly to a food product having a browning external surface area to develop a desired brown coloration during preparation of the food product for consumption by microwave irradiation for a predetermined period of time, other regions of food products may likewise be treated with the browning system of this invention.

One aspect of the invention may involve preparing a suspension comprising substantially homogeneous coparticles of the Maillard browning reactants. The substantially homogeneous coparticles of aldehyde or ketone-containing carbohydrate and amine-containing substances capable of participating in Maillard browning reactions, may be formed, for example, by dehydrating an aqueous solution comprising a reducing sugar and a proteinaceous substance. Such dehydration can allow some prereaction and can lead to the formation of particles with the Maillard browning reactants and any subsequent substantially colorless intermediates, in what can be described as intimate integrated physical contact. Such coparticle formation can facilitate the later Maillard browning reaction by the proximity and/or prereaction of reactants in situ on the surface of a food product being prepared for consumption in a microwave oven.

The browning systems including the Maillard browning reactants, intermediates thereof and/or coparticles thereof, are preferably substantially colorless or the color of the food surface of the food product prior to preparation for consumption by microwave irradiation so that the browning surface area of the food product will develop a desired final browning coloration during microwave preparation and not before. Browning before microwave preparation can often lead to a lack of consumer acceptance. For this reason, the carrier system is designed to reactively immobilize or substantially reactively immobilize at least one of the components of the browning system (for example, the amino-containing substance, the aldehyde or ketone-containing carbohydrates, or water) from the remainder.

By "substantially reactively immobilized" is meant that the browning system, when stored for a period of up to two days, at a temperature of 40° F. (4° C.), will not produce any unacceptable or significant browning effect, and will generally provide substantially the same browning potential upon exposure to microwave radiation before storage as it will after storage.

In preferred embodiments of the invention, the Maillard browning reactants are substantially reactively immobilized so that they will not produce any unacceptable or significant browning effect when stored for periods of up to about four days, of up to about six days, or for longer periods under appropriate conditions, at temperatures of about 40° F., or at temperatures above 40° F. and up to about 70° F.

The aldehyde or ketone-containing carbohydrate capable of participating in Maillard browning used in preparing the browning agent of the present invention is preferably a reducing sugar, more preferably an aldose or ketose of 3-6 carbons, and most preferably glucose, fructose, or xylose. The amine-containing substance capable of participating in Maillard browning is preferably a proteinaceous substance and is more preferably a peptide or protein in native or denatured form. Most preferred proteins include soy protein, egg albumin, whey protein, and casein. When the protein is denatured to make more chemically accessible its amino groups, it is preferably denatured by heat, acid, physical manipulation, or proteolytic digestion. The aldehyde or ketone-containing carbohydrate and amine-containing substance capable of participating in Maillard browning may be present in a weight:weight ratio generally between about 1:10 and about 10:1 (more preferably between about 3:1 and 1:3) commensurate with a desired degree of Maillard browning.

The carrier system of this invention preferably includes a lipid. Where the food product can provide sufficient moisture for the Maillard reaction during microwave irradiation, the carrier system may be free of moisture to facilitate reactive immobilization of the Maillard browning reactants. Where the food product cannot provide sufficient moisture for the Maillard browning reaction during microwave irradiation of the food product, the carrier system may include water. In this aspect of the invention, the carrier system includes adsorptive materials (for example, silicate particles) to adsorb the water and/or the Maillard reactants to maintain them in a reactively immobilized state. In an alternative arrangement, the Maillard browning reactants may be maintained in a substantially reactively immobilized state within a hydrophobic carrier system, such as lipid, with the lipid separating the reactants from the moisture required during microwave irradiation to provide the browning effect. A preferred lipid is shortening of the type commonly used in food products, most preferably a shortening derived from a vegetable oil such as that from sunflower, corn, safflower, rape seed, soybean, or other plants.

The prereaction of an aldehyde or ketone-containing carbohydrate and amine-containing substance capable of participating in Maillard browning under conditions facilitating reactions leading to Maillard browning generally involves an aqueous environment, a neutral to alkaline pH, and sufficient heat (e.g., 50° C.–100° C.) to facilitate a Maillard reaction. The reaction should be halted before a noticeable difference in visible color is observed when the above said agents are applied to the product system. This halting of the reaction may be accomplished by lowering the temperature (e.g., to between 0° C. and 10° C.), but could also be done by other means such as removal of water.

Substantially colorless browning systems are preferred since they can be associated with any product. However, it is to be understood that "colorless" in situ is more important since the browning system should not change the appearance of the substrate when the system is in place prior to microwave cooking. As an example, a cookie dough or wheat bread dough system can have a prebrowned system applied that is "colorless" on the product.

Preferred carriers include lipids (shortenings, oils, and waxes), water, water-lipid emulsions or polyols such as glycerol, and emulsions of silicate particles to adsorb and thus isolate the reactants. The preferred carriers substantially reactively isolate the browning agents and thus prevent or retard development of a browned appearance prior to exposure to microwave radiation. Isolating the browning agents can also be attained by freezing a product coated with an aqueous slurry of browning agents and possibly controllers to yield an ice matrix as a carrier when used in a reliably controlled frozen distribution system. Another aspect of the carrier is that it may be selected to provide browning on a high or low moisture product.

This invention further extends to a method of producing a food product with a preselected color in a preselected region of the food product, said method comprising:

(a) selecting at least one parameter from a group comprising: color producing agent, heating time value, agent concentration value, final food color value, substrate color;

(b) inputting said selected parameter into computer means programmed with a functional relationship between said selected parameter and at least one of the other said parameters and operable to provide output information about at least one of the other said parameters;

(c) making a food product in accordance with said output information;
(d) heating said food product;
(e) and wherein said color producing agent assists in approximately producing said final food color value in a preselected region of said food product.

The output information may include a final food product color that includes hue and chroma and said selected parameter may be at least one of a color producing agent, heating time value and agent concentration value.

The selected parameter may include a final food product color value that includes hue value and chroma value and said output may include at least one of a parameter selected from a group comprising color producing agent, heating time value and agent concentration value.

In the method, the computer means may include color graphics output means, and the method may comprise adjusting the final food product color value on the color graphics output means until a desired color is achieved, and outputting information from said computer means relating to at least one of said parameters.

The method may comprise comparing a preselected colored sample to color on the color graphics display means and adjusting the color on said colored graphic display means to approximately match the color of said sample.

Further in accordance with the invention, a method for producing a food product having a desired color, comprises the steps of:
(a) using computer means to display color for a food product as a function of at least one of the following parameters: a browning agent selected from the group comprising proteins and reducing sugars or prereacted browning intermediates thereof, controllers selected from the group comprising metal ions, salts, enzymes, pH adjusting agents, steam retaining packaging, carriers, and microwave exposure time of the food product;
(b) selecting a desired color for the food product and adjusting one or more of said parameters, if necessary, to provide adjusted parameters which produce a computer color display of the desired color using said computer means; and
(c) preparing a food product in accordance with said adjusted parameters.

The invention further extends to a method of producing a food product with a desired color in a preselected region of the food product, said method comprising:
(a) selecting at least one parameter from a group comprising color producing agent, agent concentration value, hue value and chroma value;
(b) inputting the selected said parameter into an input means operatively associated with a programmed processor means having a program in memory means operatively associated therewith for computing an output parameter comprising at least one of the nonselected said parameters based upon a functional relationship between the selected parameter and the output parameter;
(c) outputting said output parameter from output means operatively associated with said programmed processor means; and
(d) making a food product in accordance with said selected parameter and said output parameter.

The invention further extends to a programmed computer means adapted to output food color information, said computer means including:
(a) a processor means operable for manipulating at least a portion of first color information and outputting second color information;
(b) input means operably connected to said processor means and operable for inputting information to said processor means;
(c) display means operably connected to said processor means and operable for displaying said second color information; and
(d) memory means operably connected to said processor means for storage of information used by the processor means, said memory means storing third information relating food preparation to food product color.

In an embodiment of the invention, the third information may include a portion of time a color agent is associated with a food product.

The color agent may include a browning agent, and the browning agent preferably includes Maillard browning reactants or intermediates.

The invention also extends to a programmed computer means for determining how to prepare a food product to produce a predetermined desired color, comprising:
(a) input means for receiving input signals which are indicative of parameters that determine the color of a food product when it is heated;
(b) programmed memory means which is programmed to functionally relate a desired color of a food product to parameters that determine the color of the food product when it is heated;
(c) processor means operatively associated with the input means, the processor means being operative to receive input signals which are indicative of parameters that determine the color of a food product when it is heated, the processor means being operatively connected to the programmed memory means, the processor means being operative to produce output signals indicative of the color of a food product when it is heated where the food product is made in accordance with such parameters; and
(d) output means operatively associated with the processor means, the output means being responsive to output signals from the processor means, the output means being operative to display information indicative of the color of the food product when it is heated.

BRIEF DESCRIPTION OF THE DRAWINGS

FIG. 15 shows surface or internal temperature profiles for biscuits heated by microwaves in an open or closed system.

FIG. 22 shows an example of the triplet patch browser computer display.

DETAILED DESCRIPTION

Figure 1:
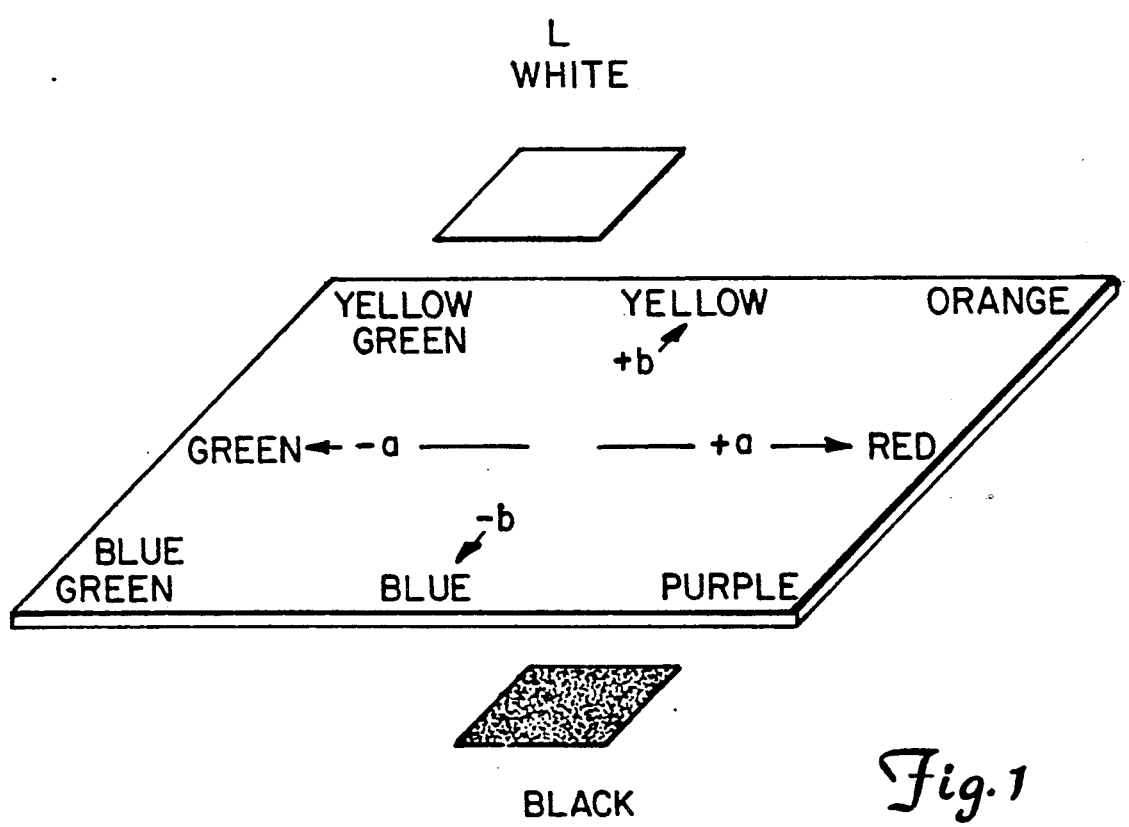
FIG. 1 schematically shows the three-dimensional space of the L $a_L$ $b_L$ system for color evaluation.
Figure 2:
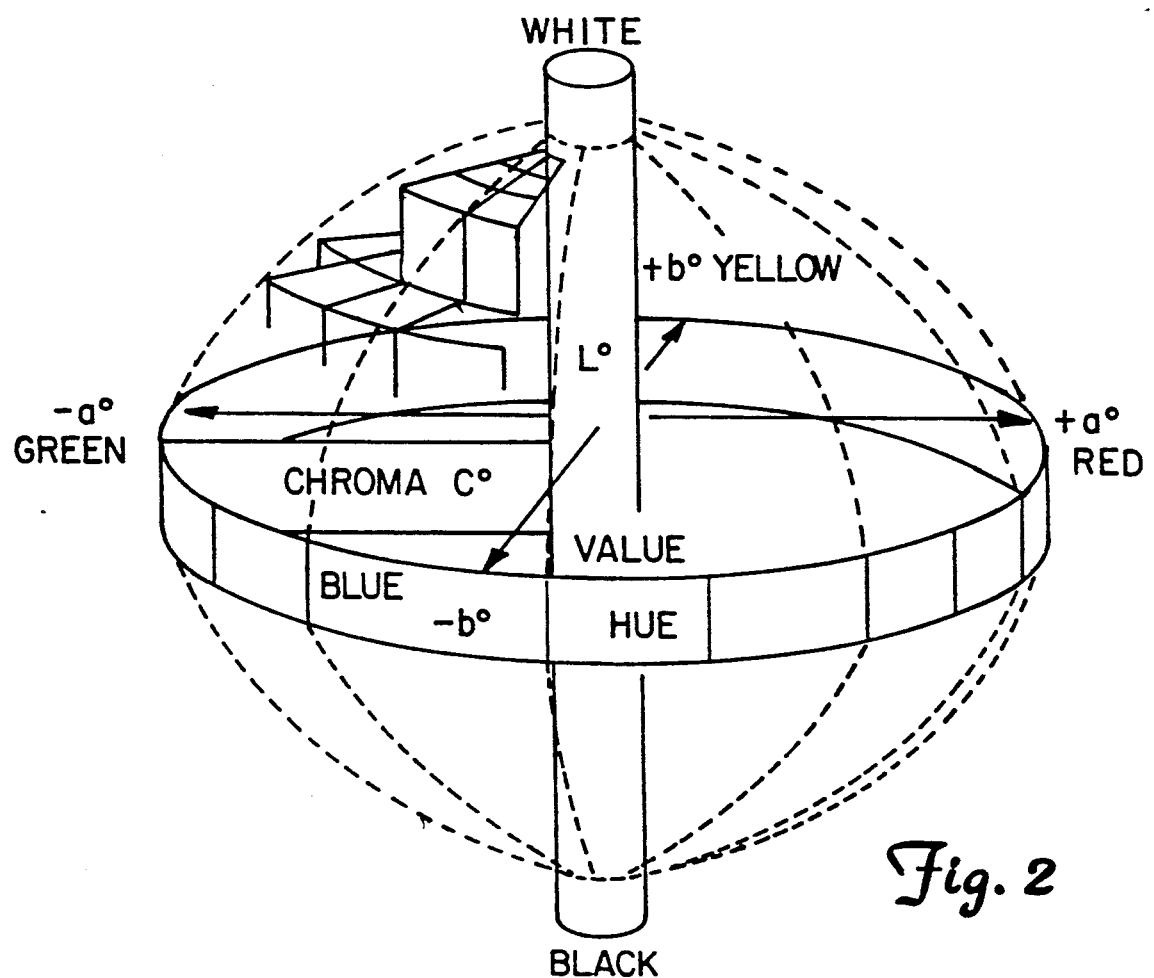
FIG. 2 schematically shows the three-dimensional space of the L* a* b* system for color evaluation.
Figure 3:
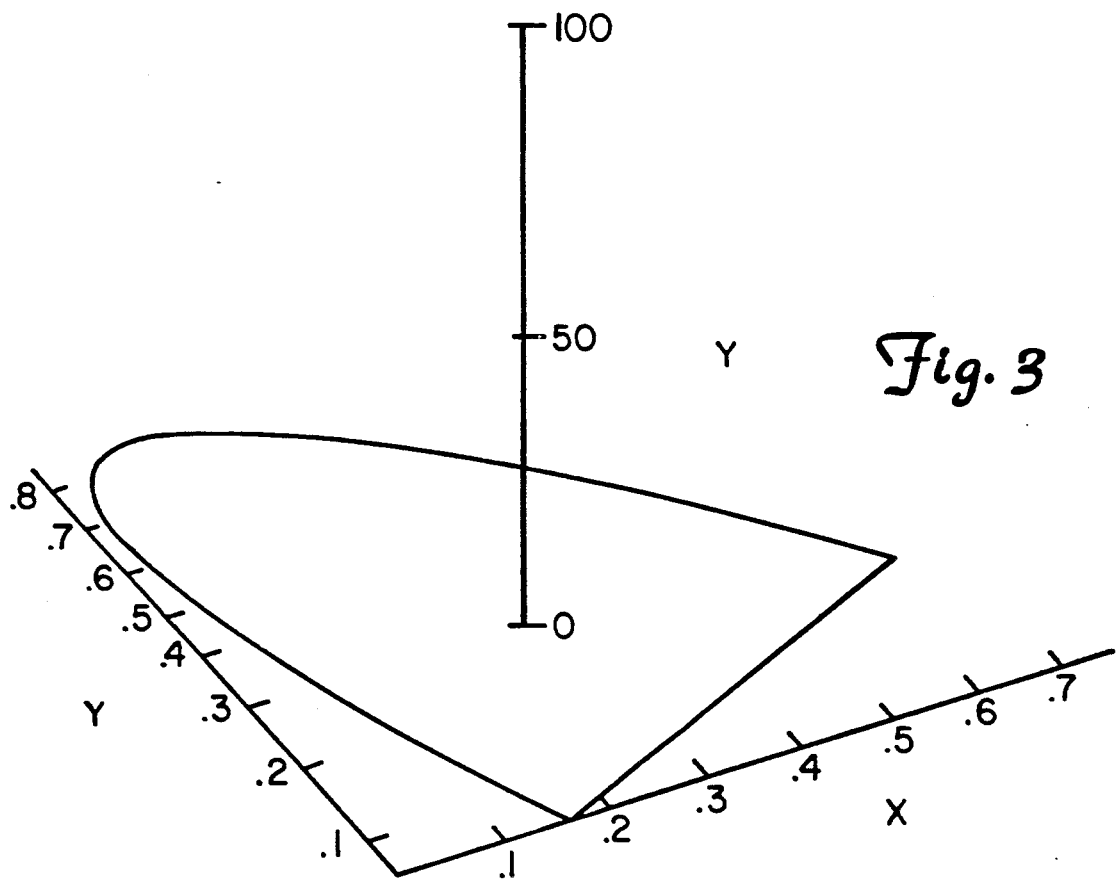
FIG. 3 schematically shows the three-dimensional space of the Y x' y' system for color evaluation.
Figure 4:
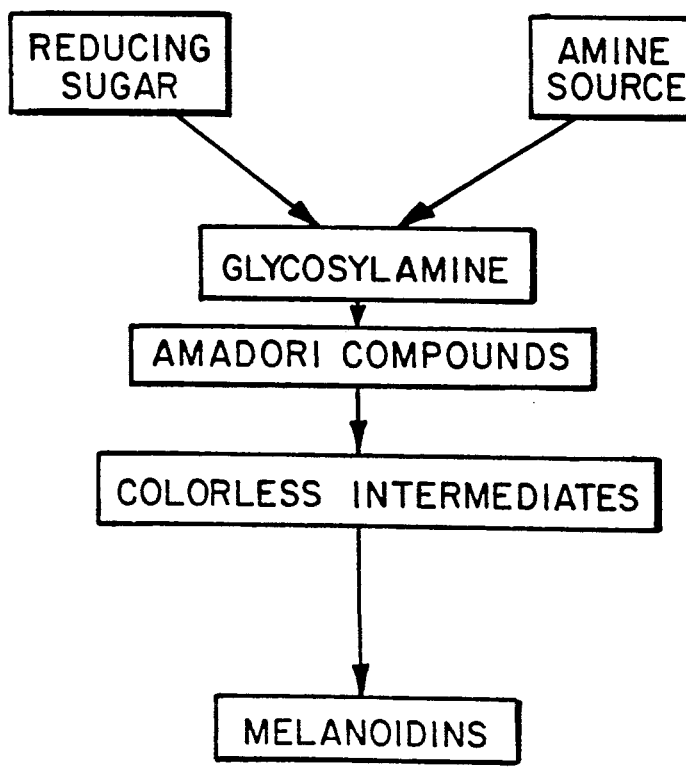
FIG. 4 schematically illustrates a simplified overall Maillard browning scheme.

Unless otherwise specified, all percents reported herein are by weight.

In one preferred embodiment of the present invention, a preferred preliminary step involves prereacting an aldehyde-containing or ketone-containing carbohydrate and an amine-containing substance capable of participating in Maillard browning under conditions initiating a Maillard reaction scheme. This prereaction involves the substantial completion of preliminary chemical reactions affecting the rate of Maillard browning, but most preferably does not result in the development of visually noticeable colors, or results in a substantially colorless product as defined. Amine loss can be measured by HPLC to indicate degree of reaction.

A preparation comprising reducing sugar and an amine-containing substance capable of participating in Maillard browning may also contain mutarotase to catalyze the formation of sugar forms more reactive in the Maillard reaction. A preparation comprising an aldehyde or ketone-containing carbohydrate and a protein may also contain a protease to increase the number of reactive amino groups thereby facilitating the Maillard reaction. The inclusion of phosphate or carbonate, for example as a potassium or sodium salt, may also be used to accelerate the Maillard reaction.

The invention thus involves a process for browning a food product during exposure to microwave radiation for a time sufficient to prepare said food product for consumption. This includes subjecting a food product, prepared as described above, to microwave heating for a time sufficient to prepare said food product for consumption. The process of the present invention may additionally involve storing the browning system or treated food product at temperatures low enough to inhibit a browning reaction in the applied browning system.

The aldehyde-containing or ketone-containing ingredient is generally an aldose or ketose having 3-6 carbons per molecule, most preferably is glucose, fructose, or xylose. The process of the present invention may, for example, involve a reducing sugar selected from the group consisting of glyceraldehyde, xylose, glucose, mannose, galactose, ribose, dihydroxyacetone, arabinose, and fructose. Although one or more amino acids may be used to react with the reducing sugar to facilitate Maillard browning, a protein or protein mixture is preferred. A protein, for example, may be egg albumin, cereal protein, whey, casein, soy protein, and/or mixtures thereof. Hydrolyzed proteins or peptides may also be used.

The carrier of the present invention may be any substance capable of delivering browning agents to the product system while preferably retaining them reactively immobilized, and preferably includes a lipid. Preferred lipids include shortening such as an animal, vegetable, synthetic fatty substance or wax used in foods but more preferably consists essentially of shortening and oils derived from a vegetable oil such as soy oil, cottonseed oil, safflower oil, corn oil, rapeseed oil, sunflower oil, or a combination thereof. The carrier system may also comprise a water-lipid emulsion, or a polyol such as glycerol.

Food products particularly usable with the present invention include imitation cheese, dairy products such as cheese, and starch-based products such as biscuits, sweet rolls, cake, bread, french toast, pizza crust, potatoes and products made from comminuted foods such as wheat flour and corn meal.

Most preferably, the food product is a dough-based product or dough-like product (hereinafter referred to as dough-based product) such as biscuits, cookies, breads, pastries, pie crusts and their precursors; or batter based products such as cakes, cookies, cupcakes, muffins, pancakes, and waffles. The present invention is usable with food products with any browning system-treated surface dimension, which surface increases by 20% or more sometime over the history of the product (e.g., during manufacturing, storage, cooking and heating).

Applicants have also found that food products in the form of biscuit dough samples, when treated with a browning system in accordance with this invention, also brown satisfactorily when cooked in a conventional oven.

Due to the broad application of the browning systems described herein, a model system was developed that could be used to rapidly screen variables with respect to color development. This model system allowed the effects of variables upon browning rates to be readily evaluated.

Filter papers with an applied browning formulation were used as a rapid screening tool and were found to correlate well to food product systems. Even better model system/product correlations could be obtained if color measurement backplates corresponding to a particular product's optical properties were identified and used, but are not required.

Using the model system and two food systems (biscuit dough and cake batter), statistical models were developed to aid in the selection of some preferred browning agents and enhancers.

For the model system, a browning system coating was spread over five water-wetted filter papers which were then microwaved for desired times. Their color was recorded with a Gardner colorimeter using a white background plate.

1.7 grams of browning coating was spread onto the top surface of each of nine biscuits (top surface area = 23 cm²/biscuit) which were then microwaved inside a steam-retaining pouch for 2 minutes. After completion of the microwave cycle, the biscuits were kept inside the pouch for 2 minutes. Gardner color measurements were made on all but the center biscuit.

For cakes, 7 grams of browning drys 1:1 (protein: reducing sugar) were dusted onto a pregreased (7 grams of Crisco shortening) microwave cake pan (surface area 531.4 cm²). Pillsbury Microwave Yellow Cake batter was deposited in the pan and microwaved for 6.5 minutes. Four color measurements per cake were then taken using a Gardner colorimeter.

A box-Behnken type design was chosen to study the effect of varying microwave time, albumin, soy, xylose, glucose, and sodium bicarbonate on the developed brown color of microwaved filter papers (measured by Gardner L $a_L$ $b_L$ values).

The variables and their limits are given below:

TABLE 1

| VARIABLE NAME | MW TIME (SECS) | SUGAR: PROTEIN (RATIO) | SOY: ALBUMIN (RATIO) | GLUCOSE: XYLOSE (RATIO) | SODA (%) |
|---|---|---|---|---|---|
| CODE | A | B | C | D | E |
| −1 | 40 | 0.2 | 0.0 | 0.0 | 0.0 |
| 0 | 80 | 1.0 | 1.0 | 1.0 | 2.5 |
| +1 | 120 | 5.0 | infinity | infinity | 5.0 |

1) Litton Generation II microwave oven.
2) Sugar(s) + Protein(s) = 50% of total formulation.
3) % Oil = 50% − % Soda.

The accuracy of the generated predictive model equations, as measured by the r-square value is:

| L = 0.91 | $a_L$ = 0.86 | $b_L$ = 0.78 | (n = 56 runs) |
|---|---|---|---|

The generated predictive equations for L, $a_L$, and $b_L$ for the model system are:

L = 73.7292 − 8.3927(A) − 4.4667(B) − 1.5982(C) + 2.1045(D) − 5.5469(E) − 5.4750(B)(E) + 4.3002(A)(D) + 2.7434(B)² − 2.3659(A)(E) + 3.1124(A)(C) − 2.5482(C)(D) + 1.2451(D)² + 1.6531(E)² − 1.4267(D)(E) + 1.8850(B)(C) − 1.8200(A)(B)
$a_L$ = 6.8605 + 4.1416(A) + 2.5350(B) − 0.2513(C) − 0.9071(D) + 2.8294(E) + 3.6075(B)(E) − 2.9141(A)(D) − 1.6313(B)² − 1.9742(A)(C) + 1.6255(C)(D) − 1.1568(E)² + 1.1257(D)(E) − 0.8210(D)² − 0.8087(C)(E)
$b_L$ = 26.3620 + 2.3819(A) + 0.7850(B) − 1.4763(C) − 2.2132(D) − 0.2482(E) + 4.2300(A)(B) − 2.8568(B)² + 2.1625(B)(E) − 2.4279(A)(E) + 2.4259(C)(D) − 2.0503(A)(C) − 2.6300(B)(D) − 1.8540(D)² − 1.8490(A)² + 1.3448

Where
A = microwave time (seconds)
B = sugar/protein ratio
C = soy protein/albumin ratio
D = glucose/xylose ratio
E = sodium bicarbonate (%).

Two statistical methods were used to incorporate model system information into product color predictive equations:

Method I: The slope and intercept of actual product color versus actual filter paper color is obtained for their corresponding browning formulations using the "error in both variables" method. This is a statistical method similar to the commonly used "least squares" method for fitting linear relationships. It includes, however, a treatment to incorporate variation in the x variable in addition to the y variable. This intercept and slope serve as the constants for an equation of the type $y = mx + b$ where x is the color value predicted from the model system design equation and y is the predicted product color.

Method II: The actual product color is incorporated into the model system design as a new independent variable. This new variable was designated F and takes the coefficient of −1 when it refers to the model system and +1 when it applied to the product.

Fifteen browning formulations were run on biscuit dough samples to study the browning reaction of variables B, C, D, and E previously studied in the model system. Variable A, time, was excluded due to the fact that the product system has a fixed microwave cook time.

Thirteen browning formulations were run on cake batter samples to study the browning reaction of variables B, C, and D previously studied in the model system. Variable A, time, was excluded for the reasons mentioned previously. Variable E, soda, was excluded because it creates brown specks in microwave cakes.

Both statistical methods (I and II) were used to incorporate the model system information as an aid in the development of product color predictive equations. The accuracy of the color predictions using the statistical methods (I and II) can be expressed as the overall standard deviation of the difference between the predicted product color and the actual product color. Table 2 below summarizes this information:

TABLE 2

COOKED BISCUITS

| | Gardner Values Standard Deviations | | | Number of Runs |
|---|---|---|---|---|
| | L | $a_L$ | $b_L$ | |
| Method I | 4.2 | 2.4 | 2.8 | 15 |
| Method II | 3.1 | 1.2 | 2.4 | 15 |

Method II also reports an r-square value for the complete design equation (n=73, 58 filter papers and 15 biscuits) as follows: L=0.96; $a_L$=0.90; $b_L$=0.72.

The generated predictive equations for L, $a_L$, and $b_L$ for the biscuit system are:

$$L = 65.1715 - 8.4162(A) - 7.5052(B) - 0.2301(C) + 4.8245(D) - 6.1878(E) - 8.4143(F) - 5.4750(B)(E) + 4.1348(A)(D) + 2.2306(D)(F) - 3.0385(B)(F) - 2.3307(A)(E) + 2.2960(B)^2 + 1.5160(D)^2 + 3.0317(A)(C) - 2.0016(C)(D) + 1.6427(C)(E) + 1.5150(E)^2 + 1.8850(B)(C) - 1.8200(A)(B) - 0.8322(D)(E)$$

$$a_L = 9.3443 + 4.1364(A) + 3.7612(B) - 0.4329(C) - 2.3756(D) + 2.8541(E) + 2.4114(F) + 3.6075(B)(E) - 2.7354(A)(D) - 1.3632(D)(F) + 1.0836(D)(E) - 1.9408(A)(C) - 1.2176(C)(E) - 1.2869(E)^2 - 1.3640(B)^2 - 0.9825(D)^2 + 1.0739(C)(D) + 1.2262(B)(F)$$

$$b_L = 26.5557 + 2.3494(A) + 0.4139(B) - 1.0559(C) - 1.6218(D) - 0.7297(E) + 0.3779(F) + 4.2300(A)(B) + 1.9762(D)(E) - 2.8372(B)^2 - 2.3792(A)(E) - 2.0822(A)^2 - 1.7320(D)^2 + 1.8841(B)(E) - 2.6300(B)(D) + 1.8205(C)(D) - 2.647(A)(C)$$

Where
- A = microwave time (seconds)
- B = sugar/protein ratio
- C = soy protein/albumin ratio
- D = glucose/xylose ratio
- E = sodium bicarbonate (%)
- F = +1 (for biscuits; an input of −1 will yield a prediction of model system values).

TABLE 3

COOKED CAKES

| | Gardner Values Standard Deviations | | | Number of Runs |
|---|---|---|---|---|
| | L | $a_L$ | $b_L$ | |
| Method I | 2.6 | 2.0 | 1.2 | 13 |
| Method II | 2.4 | 1.7 | 1.5 | 13 |

Method II also reports an r-square value for the complete design equation (n=71, 58 filter papers and 13 cakes) as follows: L=0.91; $a_L$=0.84; $b_L$=0.83.

The predictive equations for L, $a_L$, and $b_L$ and for the cake system are:

$$L = 67.9230 - 8.3560(A) - 4.3888(B) - 1.5775(C) + 2.1958(D) - 5.6057(E) - 6.3698(F) - 5.5917(B)(E) + 4.1804(A)(D) + 2.5173(B)^2 - 2.4211(A)(E) + 2.8752(A)(C) - 1.3210(C)(D) + 1.5362(B)(C) + 0.9396(D)^2 - 1.8200(A)(B) + 1.2811(E)^2 - 1.1212(D)(E)$$

$$a_L = 8.5680 + 4.0798(A) + 2.4954(B) - 0.3304(C) - 1.1262(D) + 2.8549(E) + 1.8608(F) + 3.6670(B)(E) - 2.7477(A)(D) - 1.7792(B) - 1.9441(A)(C) + 0.9318(C)(D) + 1.0565(D)(E) - 1.0105(C)(E) - 1.0610(E)^2 - 0.8462(B)(C) - 0.5450(D)^2$$

$$b_L = 30.1557 + 2.3504(A) + 1.9159(B) - 0.7553(C) - 0.6540(D) - 0.1255(E) + 3.9003(F) + 4.2300(A)(B) - 2.6023(B)^2 + 1.5747(D)(F) - 2.3806(A)(E) - 1.8550(A)_2 - 1.5176(D)_2 + 2.1625(B)(E) + 1.1309(B)(F) - 1.9772(A)(C) + 1.3757(C)(D) + 1.2645(D)(E) - 1.1994(B)(D) + 0.5272(C)(F)$$

Where

- A = microwave time (seconds)
- B = sugar/protein ratio
- C = soy protein/albumin ratio
- D = glucose/xylose ratio
- E = sodium bicarbonate (%)
- F = +1 (for cakes, an input of −1 will yield a prediction of model system values).

For both product systems studied, Method II was chosen over Method I because it generated predictive equations with better accuracy. Other product systems might yield better predictive equations with Method I.

The statistical approach described above is very flexible with respect to incorporating other browning agents and browning controllers. It is also very adaptable to other product systems. This can be accomplished using either Method I or Method II described above.

The equations developed using the statistical procedure described herein are not limited to the examples given above and can be used with other food products and browning system components. In addition, these equations can be used in conjunction with a computer program and the appropriate computer hardware, to display the predicted brown color of a selected browning system on a computer screen. This enables the actual visual perception of the predicted color. This is more useful to those unskilled in color science who design microwave food products than the values associated with color measurement (e.g., L $a_L$ $b_L$).

For example, the equations above developed for the model system, biscuits, and cakes were incorporated into a computer program that enables the color of the resultant browning formula to be displayed on a computer monitor.

The computer used was an Apple MacIntosh ™-II with 5 megabytes of main memory, a Spectrum ™ display (1024×768×8) board and 19" Spectrum ™ monitor.

The computer software was ParcPlac ™ Smalltalk-80 V12.2/VM1.1 with Knowledge Systems Corporation Pluggable Gauges ™ package. Various software fragments supplied by ParcPlace as "Goodies" were incorporated in the "Color" section of the program.

These software packages running on the above hardware provide basic systems functions to which are added the See Lab functions which provide interactive color synthesis capability.

The computer program is Smalltalk code. The listings for the Smalltalk code that comprises See Lab are provided at the end of this specification.

For best results, the computer monitor should be calibrated and adjusted for ambient lighting to generate light psychophysically equivalent to the actual color. This is accomplished by methods outlined by William Cowan and Colin Ware in their Tutorial: "Color Perception" of SIGGRAPH '84 conference (available through the Association of Computing Machinery).

As described herein, the color system used was the Gardner L $a_L$ $b_L$ system. However, it is to be understood that other tri-stimulus value color measuring systems can also be utilized and can be easily accommodated in the computer system or the method as described herein. These other color systems include Yx'y', CIE L a b, XYZ and RGB. These different color measuring systems can be correlated to one another as set forth in *Color Science* discussed herein. The systems are interchangeable. Further, the method of making a colored food product and the computer system can be used for other desired food colors in addition to browning.

A food product can be made with a preselected color in a preselected region of a food product by including the following steps:

(a) using a food preparation parameter which can include either food formula information, for example, the component parts of the food; color producing agent; agent concentration value; carrier type; final food color value, which may include one or more of the three tri-stimulus values e.g. L $a_L$ $b_L$, hue and chroma; substrate color; color controller information; and can include food processing conditions, for example, heating time, mixing conditions, pretreatment agent/controller, particle sizing and coating parameters;

(b) inputting information about one or more of the above-described parameters into a computer means that is programmed with a functional relationship between the selected parameter(s) and one or more of the other parameters. The computer means is operable to provide output information about at least one of the other said parameters;

(c) displaying output information from the computer means by a color graphic display means e.g. a CRT or print output, for example the L $a_L$ $b_L$ numbers or actual colors;

(d) adjusting the color graphic display means to compensate or to calibrate the screen for the particular computer system and color graphic display means so that uniformity of color from system to system can be accomplished; and (e) utilizing output information from the computer means in making a food product in accordance with the output information.

While the process of this invention is particularly suitable for use in preparing food products for consumption by subjecting them to microwave irradiation, the process can also be applied to food products which are to be prepared for consumption by cooking or baking in conventional ovens and systems.

Further adjustings in the process can be done in accordance with the one or more of the preceding steps until a final color which is desired or preselected is achieved on the food product. The parameters need not necessarily be adjusted if they were properly preselected initially. The thus made food product is heated or otherwise processed to achieve the desired or preselected color. The color producing agent assists in producing the approximate preselected color in the final food product in a preselected region of the food.

The computer means includes a processor means which is operably connected to an output means, for example a color graphics display means or a printer or the like for providing output color information. An input means is operably connected to the processor means. An input means is can be a keyboard or the like or a color measuring device.

Generally, the processor means and the memory means are a suitable digital computer such as an Apple MacIntosh-II ™, and the color graphic means can be a color CRT and controller.

The processor means is operable for manipulating input color information from the memory means. It can by selection of the operator manipulate one or more of the food preparation parameters. The memory means stores information which can include a functional relationship between one or more of the above-described food processing parameters and formula parameters and preferably receives information from the input means.

Any of the above-described parameters can be utilized as input in order to provide output color information.

Functional relations can be determined by using the statistical approach as discussed.

The computer system is particularly useful with Maillard browning agents and/or intermediates.

The information stored in the memory means can include color information about a food product prior to heating or formation and after heating.

The processor interprets the input from the memory means or the input means and uses an algorithm and stored data to produce output information.

A feature of the present invention is that in the browning system and other color systems, food coloring builds pigments in situ during formation and/or heating of the food product. A paint system, for example, has a pigment formed prior to introducing into a carrier system. Further, food substrate color, before and/or after heating, should be included in the evaluation because of the somewhat transparent nature of the formed color. The food substrate can affect the final food product color. Further, another important feature of the present invention is that it can predict color of a food product as it changes with time or time and temperature or perhaps more accurately total heat input. Current color predicting computers (like those used for paint) do not concern themselves with how color changes with time or temperature. Further, the present invention can also accommodate pigments and dyes as color agents. Another complication for food systems is that a color agent can migrate into or from an initial position in the food product substrate;

In order to facilitate the more rapid development of browning, the use of prereacted typical browning ingredients was studied and found to be feasible. It is well documented that the complex Maillard browning reaction proceeds through many steps prior to color development. When a prereacted but substantially colorless mixture of reducing sugar and amino acid and their reaction products, prepared as described below, was applied to a surface and subjected to microwaves, it was determined that browning was achieved sooner than when the same ingredients, but not prereacted, were analogously used.

Figure 7:
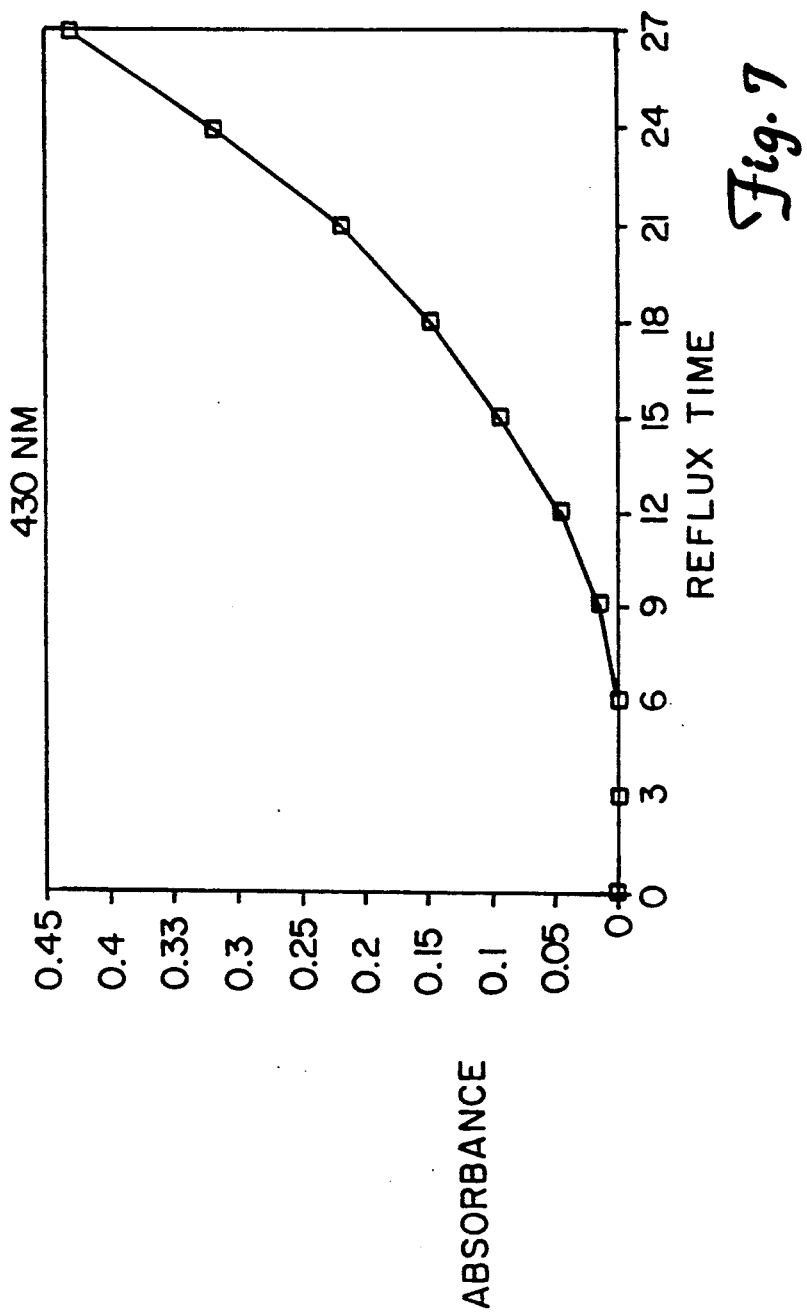
FIG. 7 illustrates a lag phase for color development in the Maillard reaction.
Figure 8:
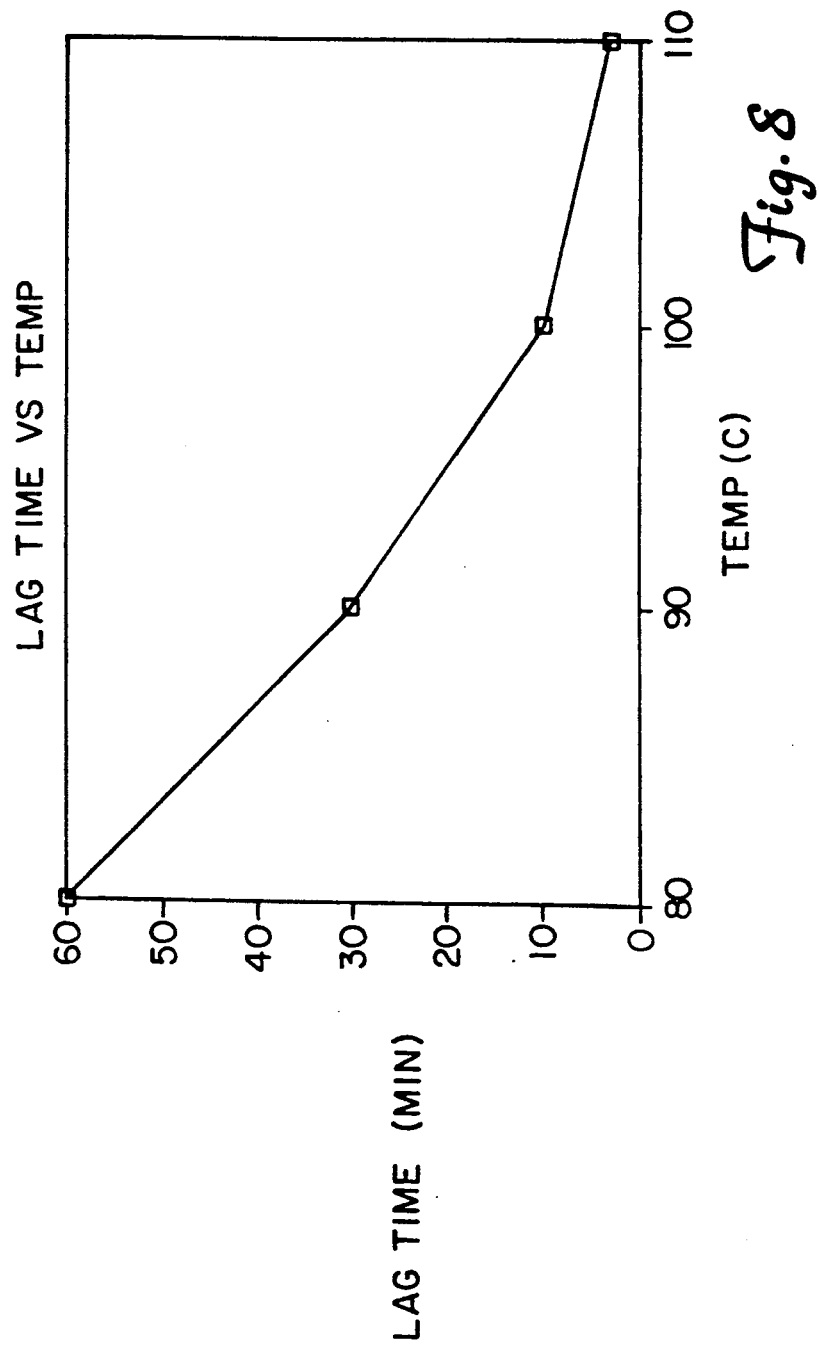
FIG. 8 shows that the lag phase in the Maillard reaction is temperature dependent.
Figure 9:
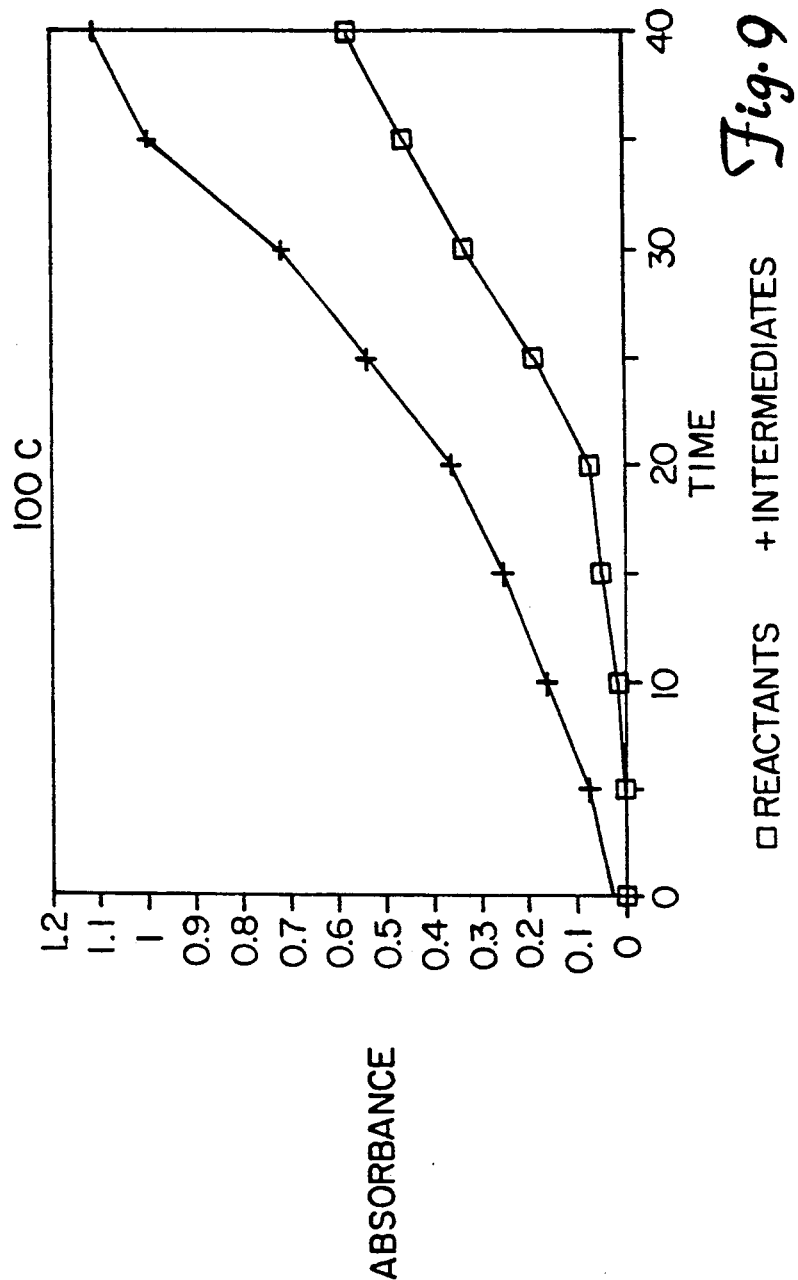
FIG. 9 shows that prereaction of Maillard reactants substantially reduces the lag phase in color development.

A study of a model system with glutamine and glucose was conducted. Through reaction of these two compounds in solution, it was observed that a lag phase in color development occurred (FIG. 7). In this system, at 100° C., the colorless lag phase was about 6 minutes. It was determined, by running this reaction at various temperatures, that the lag phase was temperature dependent (FIG. 8). More important to the objectives of this invention, the lag phase could be eliminated for in situ browning. A sample of the reactant solution was heated to a point just prior to development of measurable browning. The reaction was then radically slowed by rapid cooling. This prereacted solution was compared to a dissolved reactant solution by spectrophotometrically measuring color development with time at 100° C. The results clearly indicated that the lag phase was eliminated in this manner (FIG. 9).

The reduction of lag time in color development with prereacted as compared to non-prereacted systems was noted. A precipitate formed when ethanol was added to a prereacted solution. Comparing the browning development of these precipitates to the browning development of the relative initial reactants under controlled microwave conditions indicated significantly higher browning for the prereacted samples.

To determine whether prereacted solutions could aid in the microwave browning of specific food products, tortillas and pizza crusts were evaluated. Prereacted solutions of glutamine and glucose were applied to surfaces of the products. Solutions of the initial reactants were similarly applied to control products. Objective color evaluations of the two types of samples showed significantly higher browning for the prereacted samples for both pizza crusts and tortillas. See Tables 4 and 5 below.

TABLE 4

| TORTILLA SAMPLES | | | |
|---|---|---|---|
| | Prereacted Reactants | Initial Reactants | Untreated Control |
| L | 72.9 | 78.9 | 81.6 |
| $a_L$ | −0.5 | −1.8 | −1.6 |
| $b_L$ | 15.6 | 13.2 | 12.1 |

All scores are statistically different with a confidence level of 99.99%

TABLE 5

| PIZZA CRUST SAMPLES | | | |
|---|---|---|---|
| | Prereacted Reactants | Initial Reactants | Untreated Control |
| L | 51.9 | 57.0 | 64.3 |
| $a_L$ | 5.3 | 4.1 | 2.0 |
| $b_L$ | 17.3 | 17.1 | 19.4 |

All scores are statistically different with a confidence level of 99.999% (except $b_L$ value prereacted versus initial reactants).

The term "coparticulates" as used herein describes formation of uniform particles containing two or more browning agents. Such coparticulates may be prepared by first dissolving or suspending the Maillard browning reactants in water. After such reactants, for example, albumin and glucose, are dissolved or suspended, the mixture is then substantially dehydrated, for example, by lyophilization or spray drying. The dry matter left after lyophilization or spray drying is preferably ground to produce a fine powder. This fine powder, which contains the protein and reducing sugar in an intimate physical relationship and/or prereacted state, is then usable to provide Maillard browning in a desired period of time. Such coparticulates may be suspended in a carrier and applied to a food product. The carrier serves to substantially reactively isolate the coparticulate reactants from water so that Maillard browning does not immediately ensue. When the suspension of coparticulates is applied to a food product and microwave energy is applied, the coparticulates are exposed to water from the food product and undergo Maillard reactions leading to browning. Such coparticles contain the reactants in an intimate physical relationship and/or prereacted state so that they may further react upon exposure to heat and moisture. When the reactants are present but are not intimately associated and/or prereacted, the in situ Maillard browning reactions are hampered even though moisture may be present. Many of the components of the present invention (e.g., the various proteinaceous substances and reducing sugars) may be utilized as coparticulates to control browning of microwave-prepared food products. It may be viewed that the protein acts as a "sponge" for reducing sugar in aqueous solution during as well as after lyophilization. Polarized light microscopy of coparticles indicates a homogeneity of structure.

Browning "drys" are individual particles of Maillard reactants which have never been mixed in liquid form. These dry particles may be suspended in a lipid and applied to a food product. Upon microwaving, the "drys" brown more slowly than corresponding prereacted intermediates or coparticles. This may make such a system useful where long periods of microwave exposure are required to prepare a product. The use of coparticulates is more effective than the application of "drys" for food products requiring more rapid browning.

Another similar embodiment of the present invention involves the formation of particles of browning agents and browning system insoluble adsorptive particles such as heterogeneous silicate particles to which browning agents have been adsorbed. Specifically, said browning particles may be formed by blending an aqueous solution of browning controller (e.g., potassium phosphate), protein (e.g., whey), and reducing sugar (e.g., xylose) with calcium silicate until a smooth paste is produced. The above paste can then be suspended in a carrier system, such as shortening and glycerol, and applied to a food product. By adsorbing the browning agents or reactants onto a particle, the local concentration of browning agents is effectively increased. Adsorbed water promotes browning agent solubilization during microwave heating, thereby increasing the rate of Maillard browning. The silicate particles, by adsorbing the Maillard browning reactant and the water, have the effect of retaining them substantially reactively immobilized in the carrier system so that no significant browning effect will occur prior to microwave irradiation. Browning may be adjusted by varying the amounts of reducing sugar, protein, and water adsorbed to the silicate particle. Several other support particles were found suitable to effect browning, including silicon dioxide (such as Cabosil, Zeosyl, and Zeothix) and sodium aluminum silicate (such as Zeolex).

The coparticulate and silicate approaches to browning have proven to be superior to the application of drys. Many of the components of the present invention (e.g., the various proteinaceous substances and reducing sugars) may be utilized in a particle containing system to effect browning of microwave heated food products.

It was observed that browning reaction rates were increased in the presence of phosphates, independent of the pH of the system. This observation was confirmed in a microwave environment using model systems. The results indicated that the addition of phosphates significantly increased the browning color intensity of a xylose:albumin:shortening (1:1:2) system after 90 seconds of microwave time. Table 6 indicates that the phosphate effect was significant despite decreases in pH ($KH_2PO_4$ was the phosphate source used).

TABLE 6

| MODEL SYSTEM PHOSPHATE EVALUATION | | |
|---|---|---|
| Sample | pH | Average L Value* |
| Control | 7.5 | 67.1 |
| PO$_4$/NaOH | 6.7 | 54.6 |
| PO$_4$ | 5.8 | 64.8 |
| PO$_4$ (2X) | 5.5 | 61.7 |

*Number of samples equals 5.

There is support in the literature for the observed effect of phosphates (J. Sci. Fd. Agric., 17:245, 1966). Citrates and carbonates have also been observed to enhance browning.

As described earlier, increasing the amount of open chain from of the sugar enhances the browning reaction rate. This is especially significant because, in most of the systems studied, sugar levels were browning rate limiting. Mutarotase was evaluated with the model system procedure. Mutarotase was obtained from Sigma Chemical Company, St. Louis, Mo. Mutarotase (aldose-1-epimerase) catalyzes the interconversion of alpha-D-glucose and beta-D-glucose involving an open-chain form. Results indicate a significant increase in brown color when mutarotase was present in the glucose:albumin:shortening system. The concentration of mutarotase employed was 50 units/0.69 g of a 1:1:2 albumin:-glucose:shortening browning formula where one unit increases the spontaneous mutarotation of alpha-D-glucose to beta-D-glucose by 1.0 micromole per minute at pH 7.4 at 25° C. The average L values (n=5) after 120 seconds of microwave exposure was equal to 68.7 for mutarotase-supplemented samples and 73.8 for unsupplemented control samples.

The degree of isolation and protection afforded the browning agent(s) by the carrier system can be modified to fit the distribution needs of the product. The invention described herein provides a method of making a microwave surface browning formula capable of performing in any food distribution system (e.g., frozen, refrigerated, or shelf stable) by selecting an appropriate carrier.

The following experiment was conducted to demonstrate the effect of distribution temperature and carrier composition on browning system stability and reactivity. The examined temperature ranges reflect the three most common distribution temperatures encountered in the food industry, namely frozen ($-18°$ C.), refrigerated ($4°$ C.), and shelf stable ($21°$ C.). The carriers evaluated were chosen to reflect a wide range of ability to protect and isolate the browning reagents under the three distribution temperatures mentioned above. The three carriers evaluated were shortening, oil, and water. In addition, dry browning reagents were applied directly to the product surface in an attempt to evaluate the effect of no carrier. The browning system used in this study consisted of a 1:1 soy protein:xylose mixture dispersed into an equal amount (by weight) of shortening, oil, or water. In the case of the dry ingredients, an equivalent amount of soy protein and xylose to that used in the carrier based systems was applied.

The experiment consisted of applying the various browning systems described above to the surface of unleavened dough. Treated biscuit dough samples were then placed into plastic pouches, flushed with $CO_2$, sealed and stored under the three temperature ranges mentioned earlier. The L, $a_L$, $b_L$ values of the sample surfaces were evaluated after 1, 3, and 6 days storage for each distribution temperature prior to and after microwave preparation.

Figure 19:
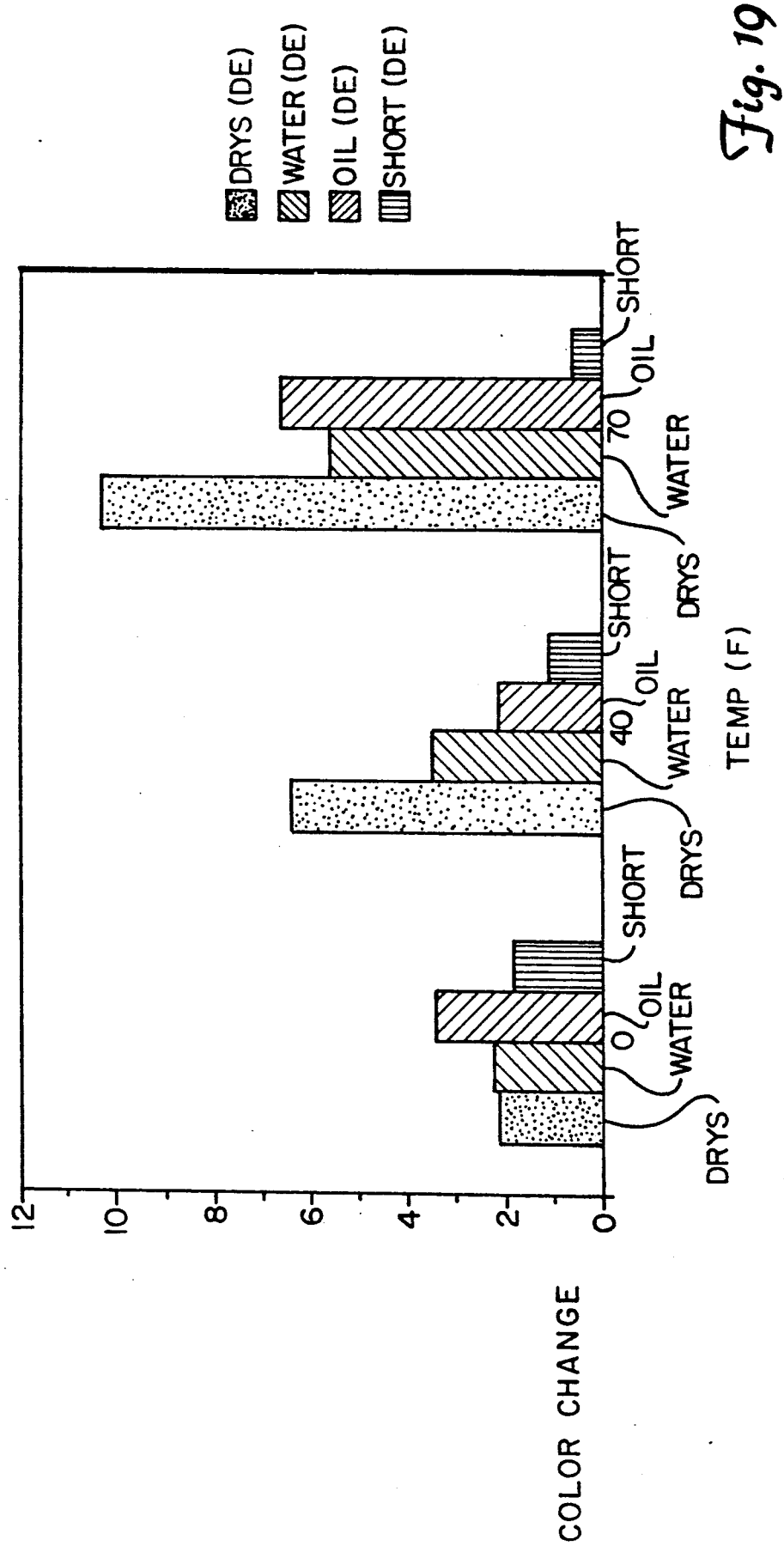
FIG. 19 shows changes in biscuit surface color between storage day 1 and 6 at 0° F., 40° F. and 70° F. prior to microwave preparation.

FIG. 19 graphically depicts the change in surface color between storage day one and six prior to microwave preparation. Color change is defined as the square root of $((L1-L6)^2+(a_L1-a_L6)^2+(b_L1-b_L6)^2)$; where L1, $a_L1$, $b_L1$ and L6, $a_L6$, $b_L6$ are equal to the L, $a_L$, $b_L$ values recorded after storage day one and six respectively. FIG. 19 shows at $-18°$ C. all four carriers to provide about the same degree of browning agent protection as evidenced by the relatively small extend to color change over the six-day storage period. However, at $4°$ C., a discernible trend in browning system color stability was observed. At refrigeration temperatures, the extent of ingredient stability and protection provided by the different systems varies as follows (listed from most to least stable): shortening oil water no carrier system. Lastly, at $21°$ C. in this test, the only carrier capable of preventing the browning reagents from pre-reacting over the six-day study period was very hydrophobic (e.g., shortening).

Figure 20:
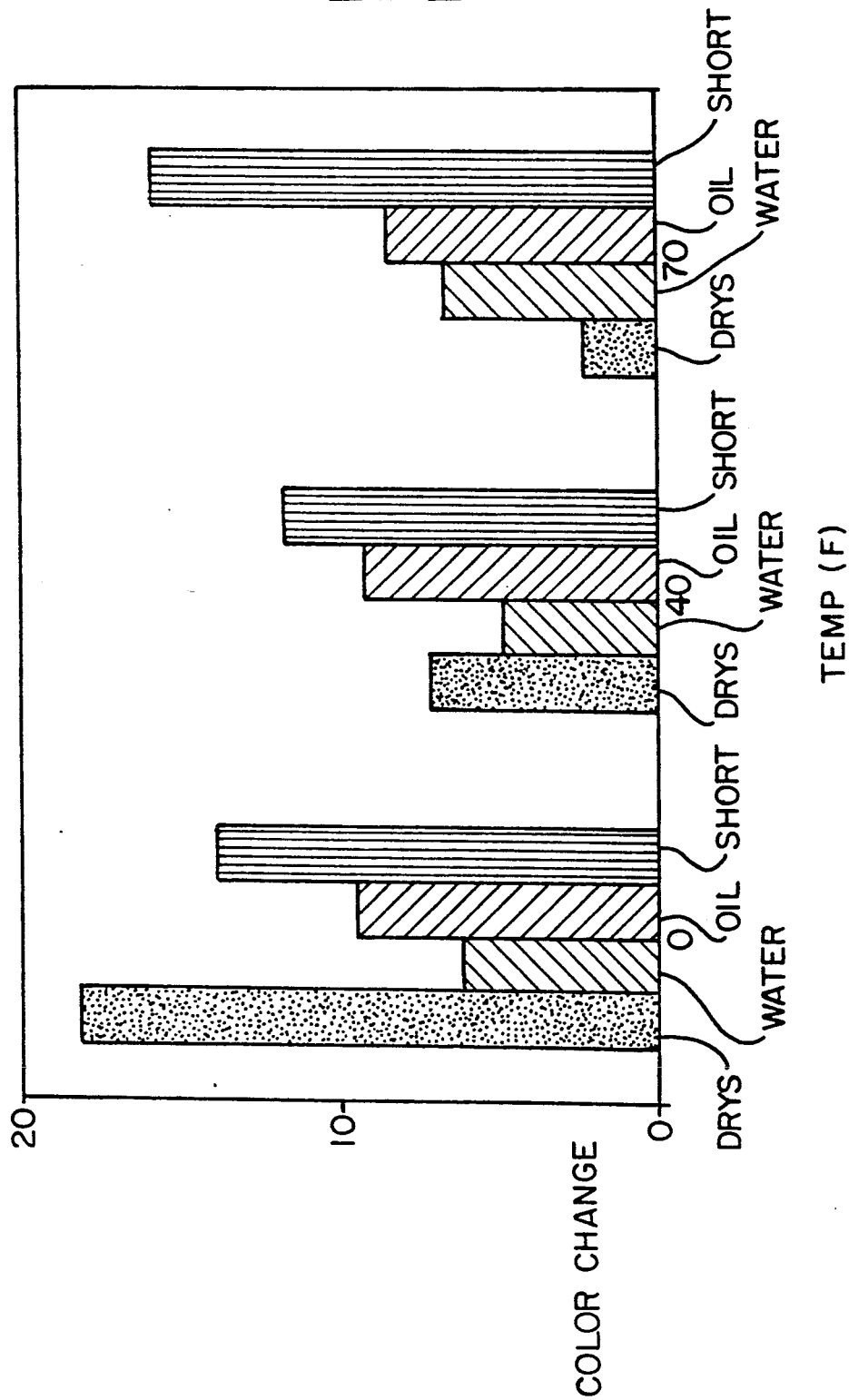
FIG. 20 depicts pre-to-post microwave change in biscuit surface color after 6 days storage.

FIG. 20 graphically depicts the pre-to-post microwaving change in biscuit sample surface color after six days storage. The greater the degree of protection provided the product, either by carrier system selection or distribution temperature, the greater the extent of microwave color development as evidenced by larger pre-to-post microwaving color differences. Hence, shortening, which provides the same extent of protection, displays the same relative amount of microwave color development at all three distribution temperatures. More temperature sensitive browning systems (e.g., dry browning ingredients) display an inverse relationship between storage temperature and microwave heating color development (i.e., the lower the storage temperature, the greater the microwave color development and vice versa).

The findings of this study indicate that it is possible to produce a microwave browning system capable of performing over a wide range of distribution temperatures by selecting an appropriate carrier system.

Another means of browning system control is that of product and browning system moisture contents. In an attempt to evaluate the relationship between product and browning system moisture contents and microwave browning, a series of experiments were conducted in which low and high moisture product systems were treated with low, medium, and high moisture browning systems. The "moist product" system used was Pillsbury biscuit dough samples (total moisture=42%) while the "dry product" system used was microwave precooked Pillsbury buttermilk biscuit samples (total moisture=16%). The formulations of the low, medium, and high moisture browning systems evaluated are given below:

| Low Moisture | Medium Moisture | High Moisture |
|---|---|---|
| 25% xylose | 25% xylose | 25% xylose |
| 25% soy protein | 25% soy protein | 25% soy protein |
| 50% shortening | 35% shortening | 20% shortening |
| | 15% water | 30% water |

Figure 5:
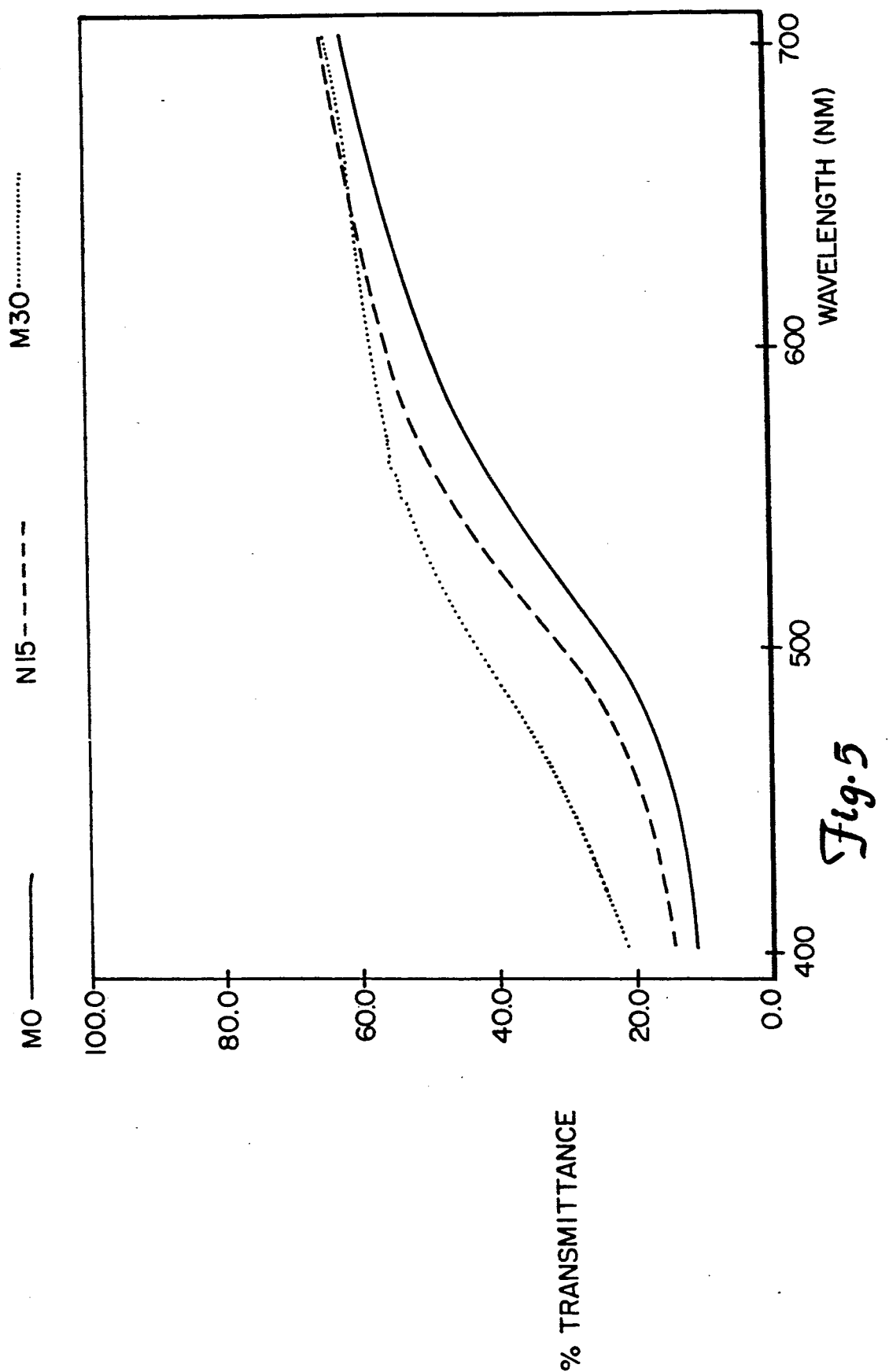
FIG. 5 depicts the changes in transmittance (from 400 to 700 nm) for moist biscuit samples after treatment with low (M0), medium (15), and high (M30) moisture browning systems.
Figure 6:
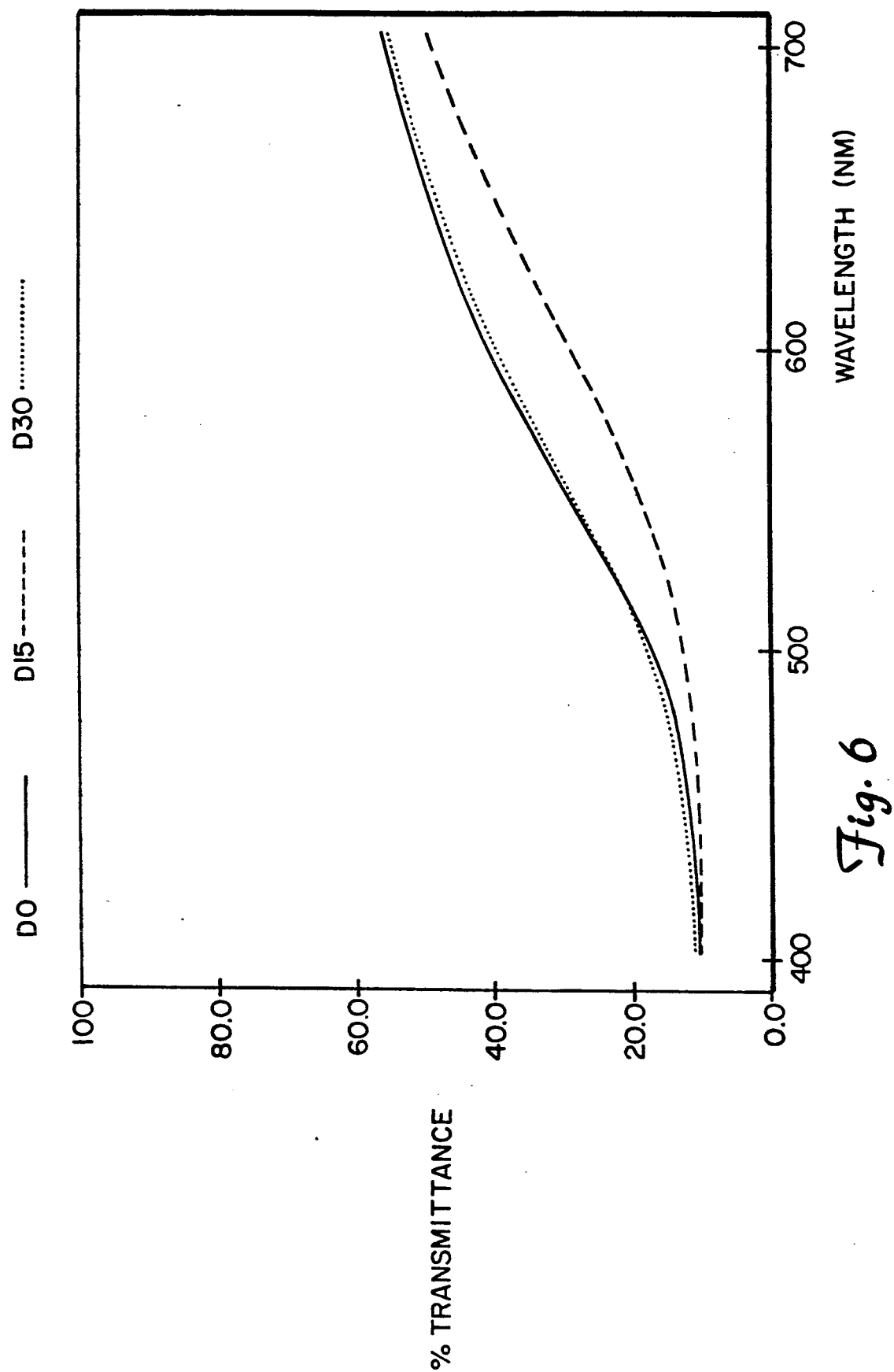
FIG. 6 depicts the changes in transmittance (from 400 to 660 nm) for dry biscuit samples after treatment with low (D0), medium (D15), and high (D30) moisture browning systems.

The moist and dry samples were coated with the browning systems as prepared in Example 1. FIG. 5 graphically depicts the changes in transmittance (from 400 to 700 nm) for the biscuit samples after treatment with low, medium, and high moisture browning systems. As FIG. 5 shows, as the moisture content of the browning system is increased, there is a corresponding increase in light transmitted over the visible spectrum. As the moisture content of the browning system was increased, less microwave browning occurred. However, when the dry samples were treated and prepared in a similar fashion, the results were different. FIG. 6 graphically depicts the changes in transmittance (from 400 to 700 nm) for dry samples treated with low, medium, and high moisture browning systems. Upon close examination of FIG. 6, it would appear that for the dry system, the medium moisture browning system was the better of those tested for microwave browning color development. Although the high and low moisture browning systems browned generally to the same extent on the dry biscuit samples, as evidenced by their similar transmittance spectra; neither browned to the extent that the medium moisture browning system did. Hence, by varying the moisture content of either the product or browning system, it is possible to control microwave browning.

A particularly effective and widely applicable microwave browning system is comprised of three basic ingredients: a reducing sugar, an amino compound (protein), and lipid. A browning system composed of xylose and proteins suspended in a shortening matrix has been used thus far to brown the surfaces of biscuit dough, cake batter, pastry dough, roll dough, coffee cake batter, bread dough, pizza crust dough, and french toast. Advantages of this system include its simplicity, adaptability to existing products and processes, ability to be adjusted to coincide with product textural development, stability through shelf life, and dual applicability to microwave and conventional preparations. Several means of controlling the development of color have been identified. These include adjusting the concentrations of the reactants, as well as the use of pH level, phosphates, intermediates, coparticulates, mutarotase, protease, steam-retaining packaging, and the use of dielectric affecting salts. Reducing sugars and amino compounds are reactants required for Maillard browning while the lipid serves as a carrier that suppresses Maillard browning for a required shelf life but allows rapid reaction on exposure to microwave radiation. A third component required for Maillard browning, water, can be provided by the food system itself as a result of exposure to microwave energy and/or may be supplied by the carrier in certain applications. The ratios of the three components relative to one another play an important role in overall system performance as does the amount of browning coating applied to the surface. A system composed, by weight, of one part sugar to one part protein to two parts vegetable shortening has performed very effectively in many systems.

Although the mode of incorporation of the browning system to various products can vary, the general operating principle of the browning system does not change. In most product systems, the browning coating was applied to the surface of the product as a thin layer. Such a coating may comprise browning agents in various forms such as drys (previously unmixed and unreacted), coparticulates from reactants previously mixed in a solution and the solvent removed, or intermediates.

An important advantage of a browning system described herein is that during refrigerated storage, the browning agents (sugar and protein or intermediates) are held, reactively immobilized in a lipid environment of extremely low water content. Such a system effectively retards the Maillard reaction rate to the extent that browning does not appreciably occur during storage. Reactive isolation is not needed when there is a very short shelf life, for example, in a commercial setting. Water can be used as a carrier for a product when it is to be microwave heated immediately after application. This system is particularly useful in batter and dough-based systems.

Maillard browning reactions between various amino compounds (e.g., amino acids and proteins) and a given reducing sugar source have been shown to develop different observable brown hues under identical reaction conditions. Similarly, Maillard Browning reactions between various sugar sources (e.g., glucose, fructose, and xylose) and a given protein source have been shown to develop different observable brown hues under identical reaction conditions.

The reason different proteins produce various brown hues under identical reaction conditions is a function of the reactivities, and accessibility, of their component amino acids. The more reactive and accessible the component amino acids of a given protein source, the greater its browning potential.

The reactivity of the protein used in the browning systems has an important effect on the final hue and color intensity observed in the product systems. The brown color produced by the browning system upon exposure to microwave energy appears to be, in part, a function of the type and reactivity of protein employed.

The effect of protein on color formation was examined for microwave-prepared biscuit dough samples treated with lipid browning systems containing various food proteins. The results were evaluated by Gardner colorimetric analysis. The hue values of the frowning systems evaluated varied from 578.90 nm (nanometer) for gluten to 588.25 nm for sodium caseinate with chroma ranging from 42% for gluten up to 64.7% for albumin. The results of this study indicated that chroma and hue are functions of both individual protein amino acid composition and the overall extent of Maillard browning.

Figure 18:
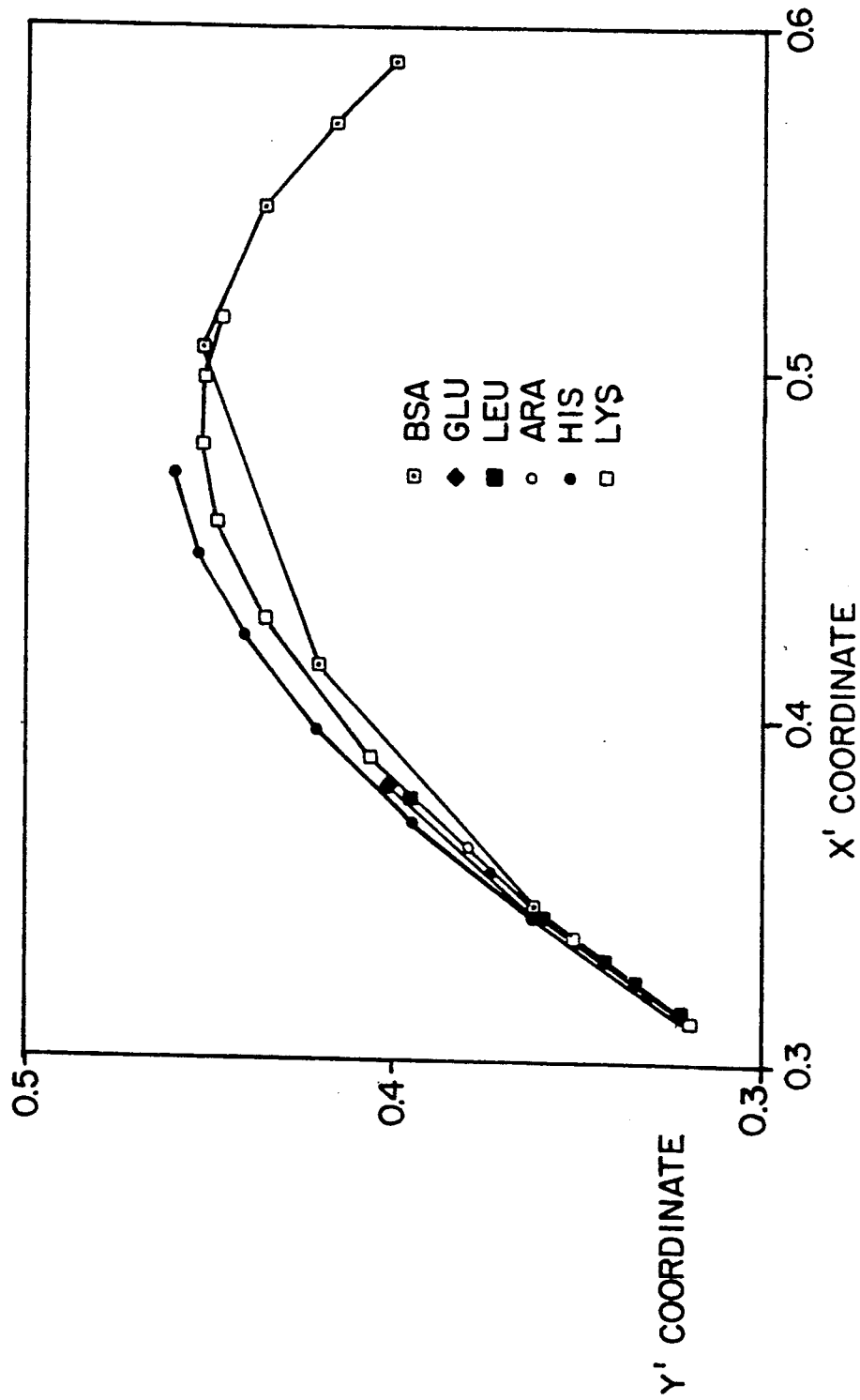
FIG. 18 shows a 1931 chromaticity diagram of bovine serum albumin (BSA) and various amino acids at different stages of Maillard browning with glucose.

Experiments examining the color development pathway of various amino acid and protein sources have shown that regardless of the amino compound employed in the browning system, all follow the same general color development trajectory when plotted on an x', y' 1931 chromaticity diagram, differing only in overall magnitude after a given reaction time (see FIG. 18). The effect of amino acid/protein type on Maillard browning color development appears to be a scalar function with directional coordinates fixed and magnitude a function of the reactivity of the amino acid/protein source used and reaction time.

This provides another means of browning control, for example, a product requiring a relatively long microwave cooking time could use a protein of lower reactivity.

Figure 10:
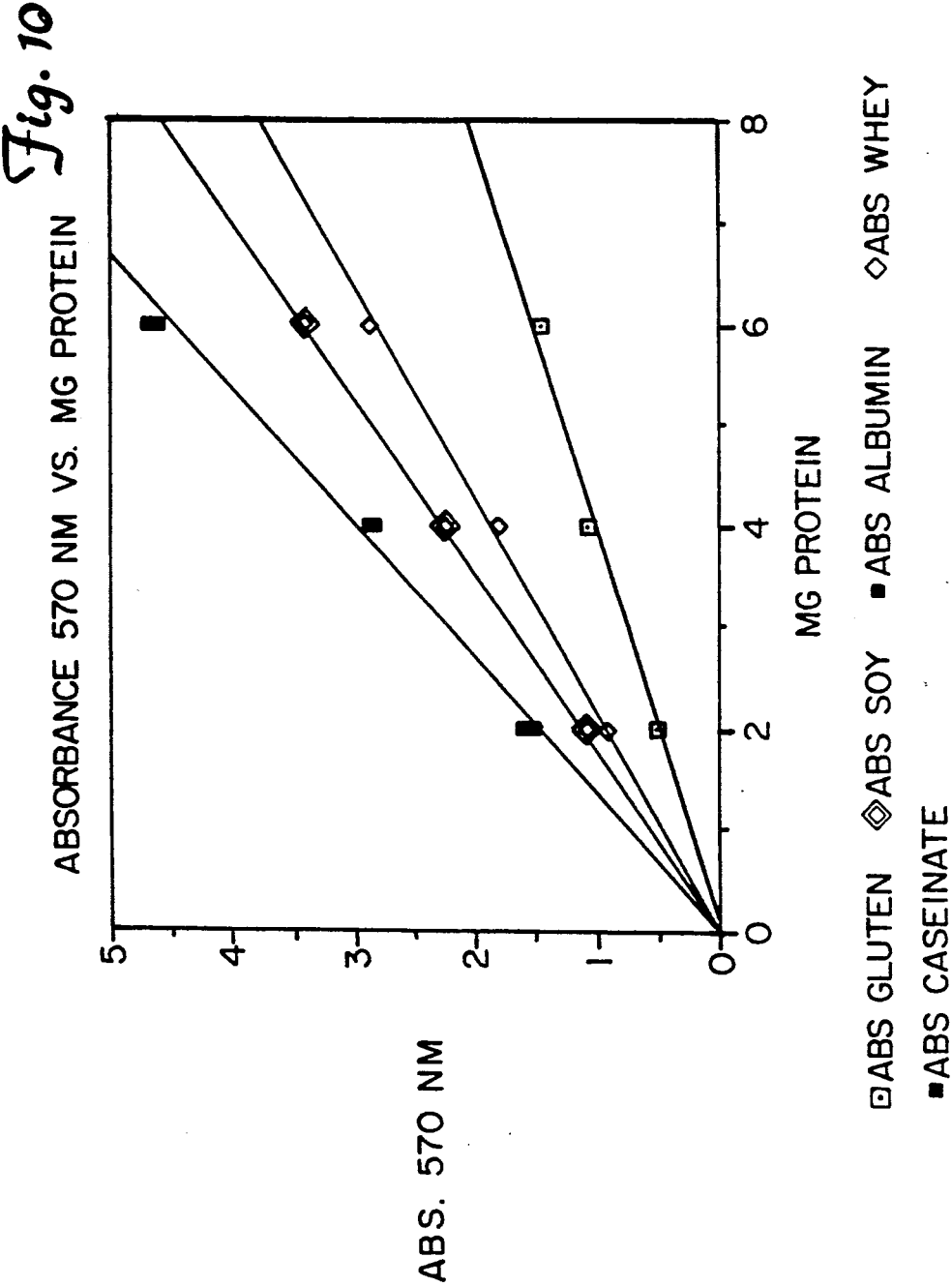
FIG. 10 illustrates the linear relationship between concentration of protein sample and ninhydrin color development.
Figure 11:
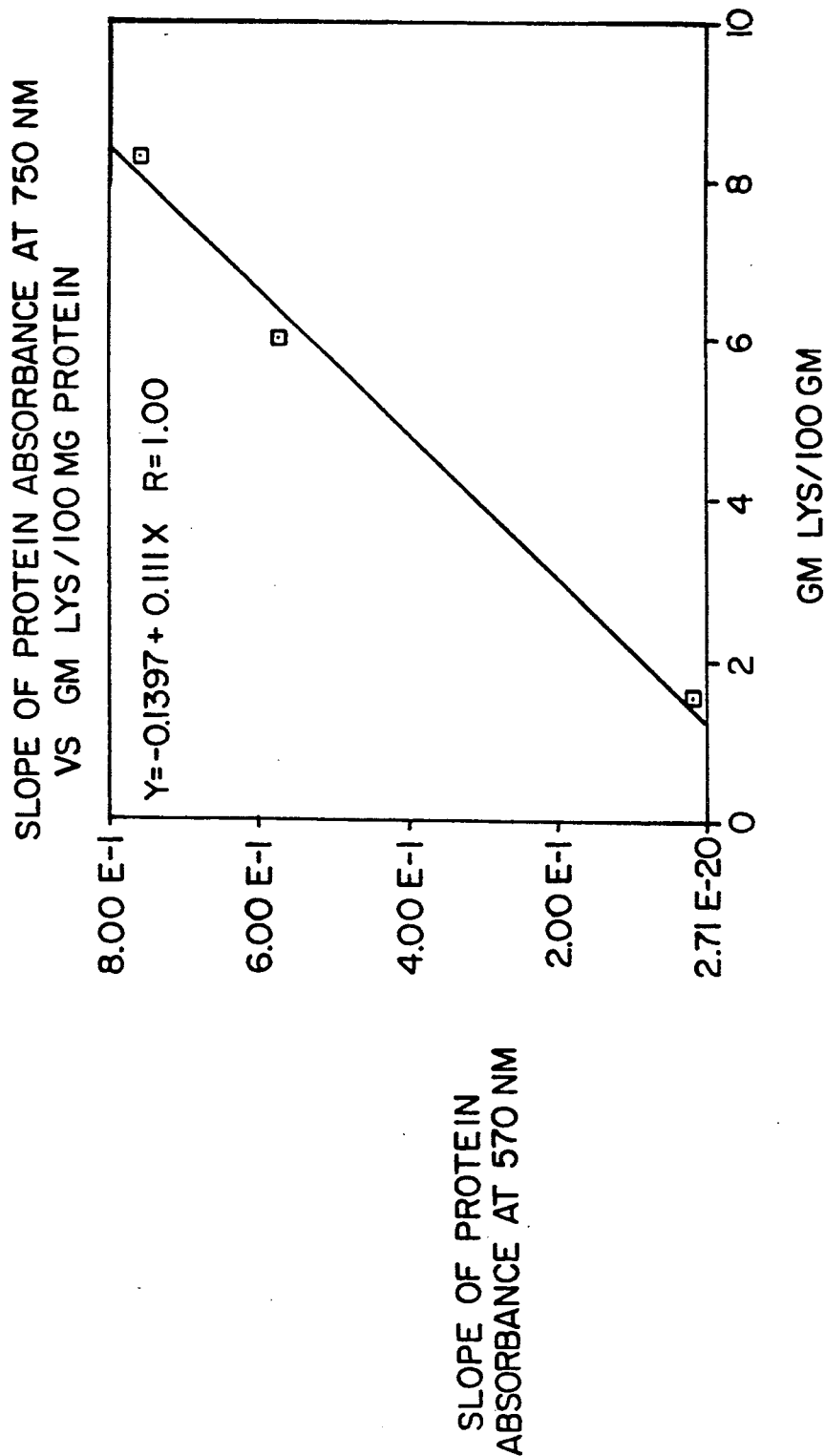
FIG. 11 shows a linear relationship of protein lysine content and ninhydrin color development.

A study was conducted in which the amount of ninhydrin-reactive lysine present in a series of food proteins was experimentally determined. The lysine content was correlated with Gardner colorimetric values obtained from biscuit dough samples treated with the microwave browning system containing these proteins. A linear relationship was found between the absorbance of the ninhydrin chromophore and concentration of protein sample (see FIG. 10). The extent of absorbance (slope of the linear relationship) was a linear function of the lysine content of each protein sample (see FIG. 11).

Figure 12B:
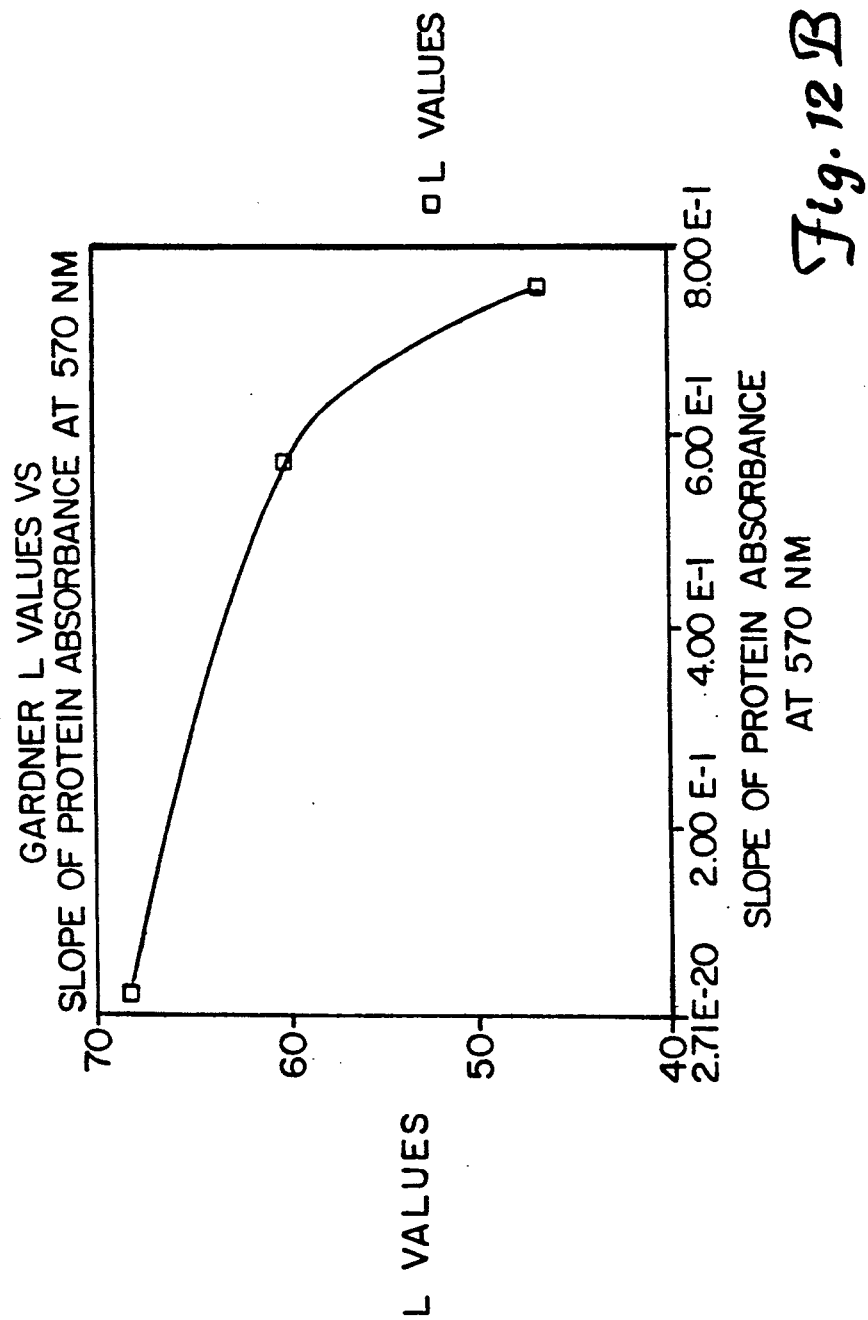
FIG. 12 shows relationships between Gardner L and $a_L$ values from biscuit samples and 1) protein lysine content; and 2) slope of the linear relationship between ninhydrin chromphore absorbance and protein concentration.
Figure 12D:
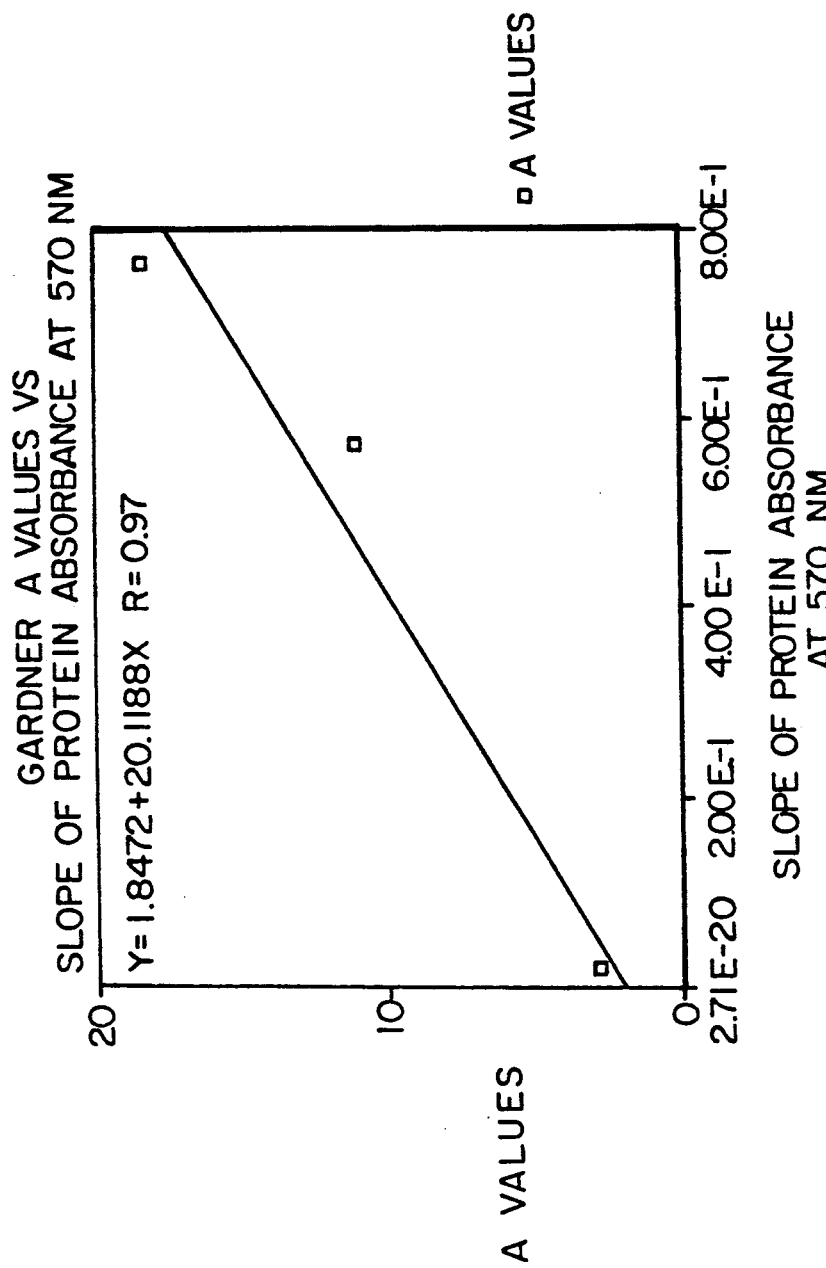

Gardner L and a values obtained from biscuit dough samples exposed to microwaves after treatment with microwave browning formulas incorporating the various proteins showed a linear relationship when plotted against gm Lys/100 gm protein and extent of chromophore absorbance (e.g., the slope of the linear relationship between ninhydrin chromophore absorbance versus mg protein, see FIG. 12).

A direct relationship was observed between the amount of lysine per given amount of protein, ninhydrin chromophore absorbance, and extent of Maillard browning (as reflected by lower Gardner L values and higher Gardner a values). The determination of ninhydrin chromophore absorbance values could be a quick and efficient screening method for predicting the performance level of a given protein in a Maillard-based microwave browning system. One could specifically choose a protein source of a given reactivity such that the product could brown to an appropriate extent upon completion of the microwave cooking cycle. In addition, the ninhydrin evaluation could also be an effective test to assure uniform performance of a given protein (e.g., a quality assurance tool in a manufacturing facility).

In addition to protein reactivity, the physical condition of the protein employed in the browning system was found to have an effect on browning color development. Physical shearing (denaturation) of proteins increased the rate of Maillard browning. Gardner colorimetric analysis of biscuit samples treated with browning compounds which had been sheared in an electric mixer prior to product application resulted in lower Gardner L values and higher Gardner $a_L$ values as compared to those values obtained with unsheared control samples.

TABLE 7
BISCUIT SURFACE L, $a_L$, $b_L$ VALUES VERSUS BROWNING SYSTEM SHEAR TIME[1]

| | MIX TIME | | |
|---|---|---|---|
| | 0 (min.) | 7.5 (min.) | 15 (min.) |
| L | 60.0 | 58.9 | 56.1 |
| $a_L$ | 11.9 | 13.1 | 13.8 |
| $b_L$ | 28.2 | 28.2 | 27.3 |

[1] Used a Hamilton Beach Scovill electric mixer (mixing speed set on 5)

By shearing the protein browning system prior to product application, an increased number of primary and secondary amino groups were likely exposed and created via the disruption of the proteins quaternary, tertiary, secondary, and primary structure. Increasing the total number of possible Maillard reaction sites effectively increased the overall extent of Maillard browning. Denaturing the protein through other means may have a similar effect.

Figure 24:
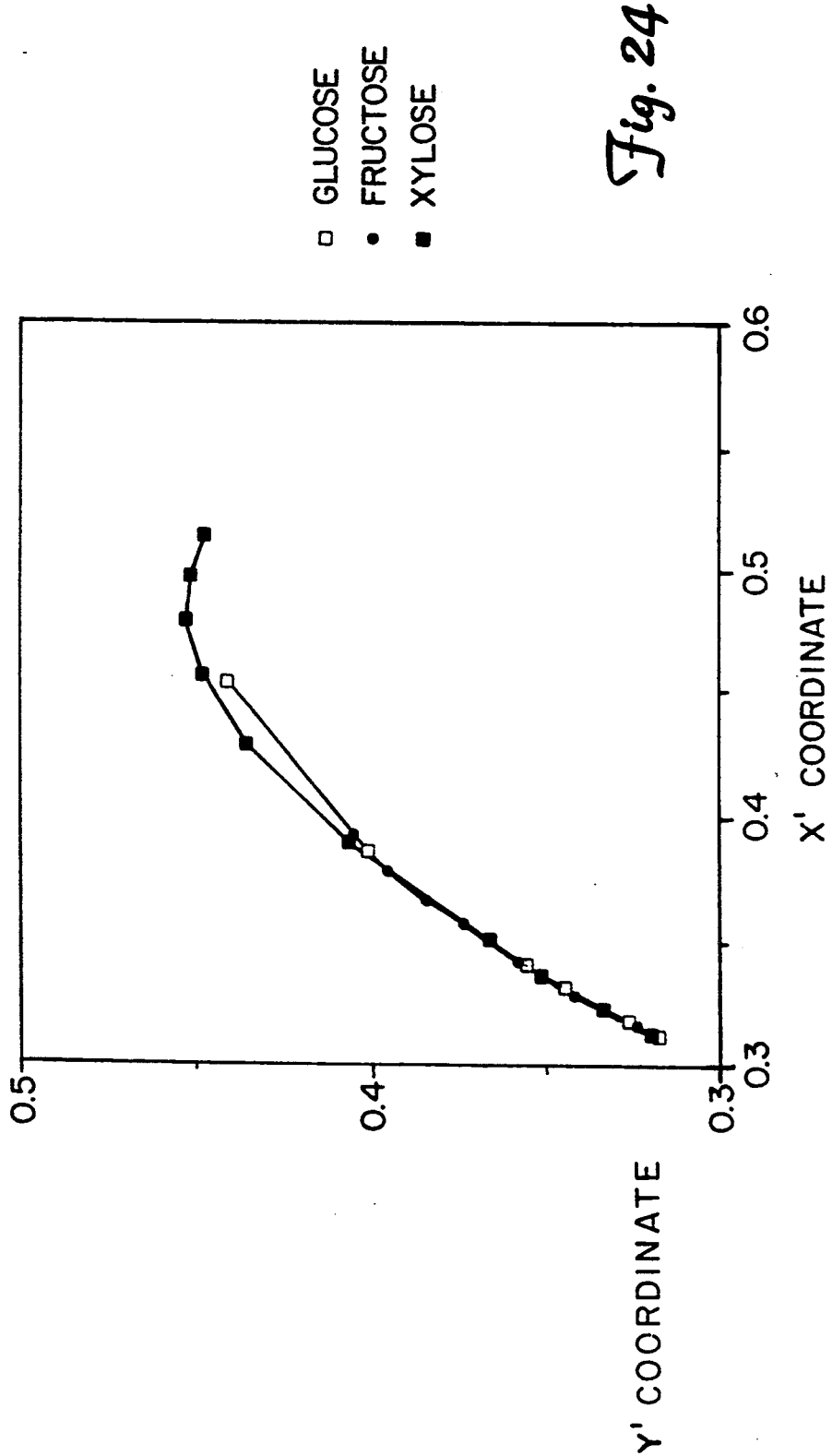
FIG. 24 shows a 1931 chromaticity diagram of various reducing sugars at various stages of Maillard browning in reaction with lysine.

Experiments examining the color development pathway of various reducing sugars have shown that regardless of the sugar employed in the browning system, all follow the same general color development pathway when plotted on an x', y' 1931 chromaticity diagram, differing only in overall magnitude after a given reaction time (see FIG. 24). The effect of reducing sugar type on Maillard Browning color development appears to be a scalar function with directional coordinates fixed and magnitude a function of the inherent reactivity of the reducing sugar used and reaction time.

In general, the greater the amount of microwave browning system applied to a given product, the more extensive color develops. The relationship between quantity of browning system applied and color developed in a biscuit model system was examined. The top surface of Pillsbury buttermilk biscuit dough samples were coated with various amounts of a 1:1:2, by weight, soy protein:xylose:shortening browning system ranging from 0 to 2.5 grams. Upon completion of microwave heating, biscuit surface color was evaluated via Gardner colorimetric analysis.

Figure 13:
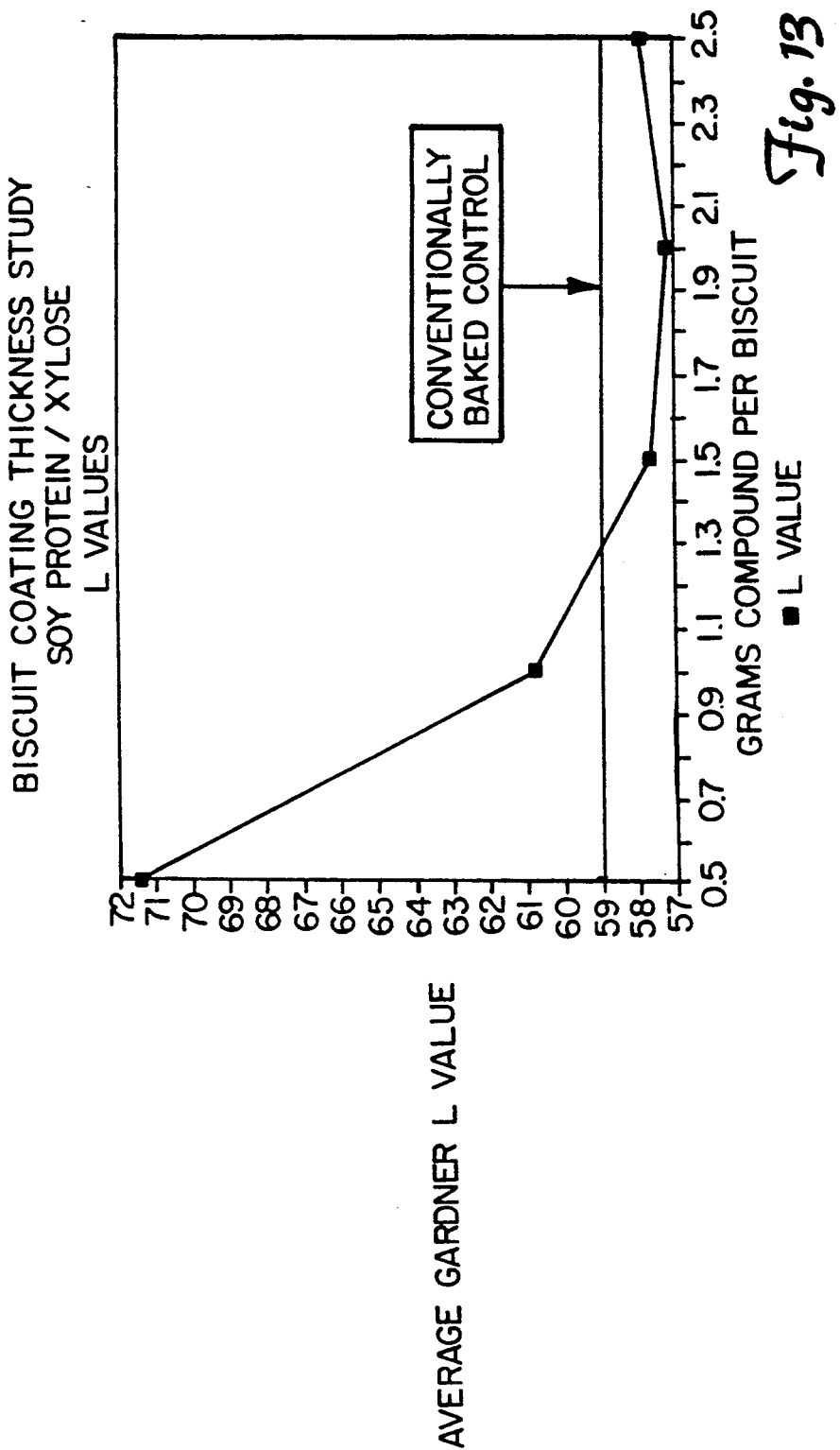
FIG. 13 shows the relationship of Gardner L values and biscuit coating thickness.
Figure 14:
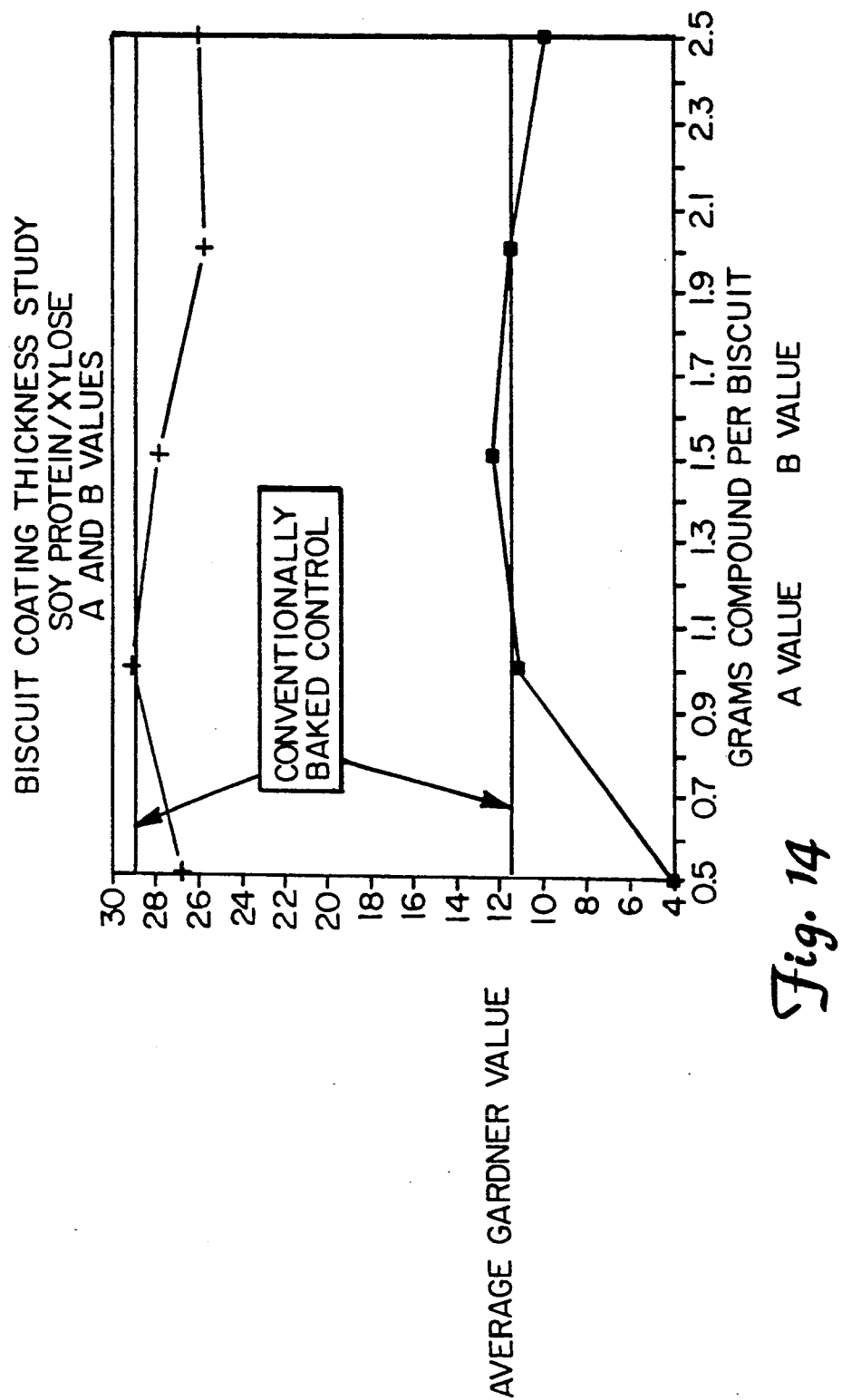
FIG. 14 shows the relationship of Gardner $a_L$ and $b_L$ values and biscuit coating thickness.

The findings of this study are graphically depicted in FIG. 13 and 14. The plot of "average Gardner L values versus grams browning system applied per biscuit" clearly shows that biscuit surface color darkens quite rapidly (reflected by the rapid drop in observed L values from 71.4 to 57.7) as the amount of the browning system applied to the biscuit sample surface increased from 0 to 1.5 grams. Browning system applied in excess of 1.5 grams produced little, if any, further effect on the observed L value of the biscuit sample surface.

Gardner $a_L$ values, which quantify the amount of green to red coloration, were observed to increase (i.e., become more "red") as the amount of applied browning system increased from 0.5 to 1.5 grams. Amounts of applied browning system in excess of 1.5 grams resulted in a slight decrease in observed Gardner $a_L$ values.

Gardner $b_L$ values, which measure the extent of blue to yellow coloration, were not significantly affected by the quantity of applied browning system.

The results of this study also showed that the hue and chroma of microwave prepared biscuit samples coated with about $1.5+/-0.2$ grams browning system most closely approximate the hue and chroma of a conventionally baked biscuit control (see FIGS. 13 and 14).

Different reducing sugars are known to have an effect on the rate of Maillard browning. Of the reducing sugars studied, xylose has been found to brown most effectively. However, glucose, particularly in conjunction with inorganic phosphate catalysts, pH-affecting controllers, intermediate formation and/or coparticulate formation, is also useful. Table 8 shows the Gardner L, $a_L$, $b_L$ values obtained from biscuit dough samples treated with a browning system employing glucose in conjunction with sodium bicarbonate (a pH affecting controller). Note that as % soda and pH increases, Gardner L values decrease while $a_L$ values increase.

TABLE 8
1:1:2 GLUCOSE:SOY PROTEIN:SHORTENING SYSTEM

| | ave. Gardner values | | | |
|---|---|---|---|---|
| % Soda | L values | $a_L$ values | $b_L$ values | pH |
| 0.00 | 71.5 | 3.7 | 23.0 | 6.58 |
| 1.96 | 65.4 | 6.1 | 24.2 | 7.25 |
| 3.85 | 61.0 | 7.6 | 23.7 | 7.48 |
| 5.66 | 59.7 | 8.7 | 24.1 | 7.56 |
| 9.10 | 57.4 | 9.3 | 23.5 | 7.72 |

Color development is directly proportional to the amount of time the microwave browning system is exposed to microwave energy and, when applicable, the steam environment created thereby. Luxtron temperature studies of biscuit dough browning systems show that the longer the system is exposed to microwave energy, the greater the observed temperature (surface and ambient) and subsequent color (browning) development.

EXAMPLE 1

BISCUITS

A biscuit dough microwave browning system was designed to utilize browning chemistry and packaging technology.

1.78 grams of a browning system comprising one part soy protein, one part xylose, and two parts solid vegetable shortening was applied with a spatula to the top surface of Pillsbury Buttermilk Biscuit dough samples (top surface area = 23 cm$^2$). The browning system was pliable enough for smooth application.

Nine coated samples were placed into a pregreased plastic pan. The pan of samples was subsequently sealed in a plastic pouch (9¾"×11⅜") to retain product moisture and to protect against atmospheric contamination.

Prior to microwave heating, the pouch was punctured four times (two punctures at each end) to allow for steam venting during the microwave cooking cycle. The samples were subjected to 2 minutes of microwave heating in a Litton Generation II microwave oven, oven power set on "high". Upon completion of the microwave cooking cycle, the biscuit sample package was removed from the microwave oven and allowed to rest undisturbed for approximately 2 to 3 minutes. During this 2-to-3 minute post-microwave exposure period, a significant amount of browning occurred. Upon completion of the post-microwave resting period, the outer plastic package was removed, thereby releasing the entrapped steam and arresting the browning process. The microwave prepared biscuits appeared golden brown similar in appearance to conventionally baked biscuit products.

Results obtained from temperature studies of pouched versus nonpouched package systems showed significantly lower surface and atmosphere temperatures recorded for the nonpouched system when compared to the pouched system (see FIG. 15). This indicates that in the pouched system there was sufficient energy and/or moisture available to facilitate the browning reaction mechanism with this particular selection of browning agents and controllers.

EXAMPLE 2

BISCUIT SILICATE APPLICATION

A silicate based microwave browning system was tested.

Whey protein (32.64 g) and xylose (16.76 g) were dissolved in 100 ml of water. Calcium silicate (29.92 g) was placed in a Oster blender and blended on a high setting for 10–15 seconds to fluff the silicate. The protein/xylose solution was added in two equal aliquots and blended after each addition for 30–35 seconds on high to make a smooth paste. Melted Crisco shortening (61.92 g) and glycerol (30.76 g) were added to the water silicate paste and blended for 30–35 seconds on high. The paste was scraped into the center of the bowl and blended for an additional 30–35 seconds. Upon completion of blending, the silicate based browning system was stored at 5° C. until use.

2 g of refrigerated silicate based browning system was spread evenly onto the surface of Pillsbury Buttermilk Biscuit dough samples (see Example 1). A total of eight biscuit dough samples were prepared as described above and placed into a hard plastic tray and sealed in a plastic pouch with the corners perforated to permit steam venting. The biscuit dough samples were baked in a Litton Generation II microwave oven on high for 2 minutes. After the 2-minute cooking cycle and a subsequent 2-minute room temperature cooling period, the microwave browned biscuit samples were removed from the pouch. After the microwave cooking cycle and room temperature cooling period, the biscuits appeared golden brown, similar in appearance to conventionally baked biscuit products.

EXAMPLE 3

CAKE

Because Pillsbury microwave yellow cake is a batter system, the browning system (a 1:1:2, by weight, soy protein:xylose:shortening mixture) was applied to the cooking vessel such that it would be in contact with the outer surface of the batter throughout the microwave cooking cycle. This was accomplished in two manners: 1) By manually applying browning system to the interior of the microwave cake pan (surface area=531.4 cm$^2$) prior to the addition of cake batter, and 2) By dusting a dry 1:1 mixture of browning ingredients (e.g., soy protein and xylose) to a cake pan pregreased with shortening.

After the cake batter was prepared (per the instructions on the package), it was poured directly into a pretreated cake pan, and microwaved for 7 minutes (oven power set on "high"). A litton Generation II microwave oven Model #2492 (power step 1) was used in all of the cake experiments described herein. Upon completion of the microwave cooking cycle, the cake was immediately inverted and removed from its pan.

The color and textural properties of the microwave prepared browned cake closely approximated those of a conventionally prepared cake. A golden brown dehydrated crust developed.

EXAMPLE 4

SHELF LIFE

Figure 16:
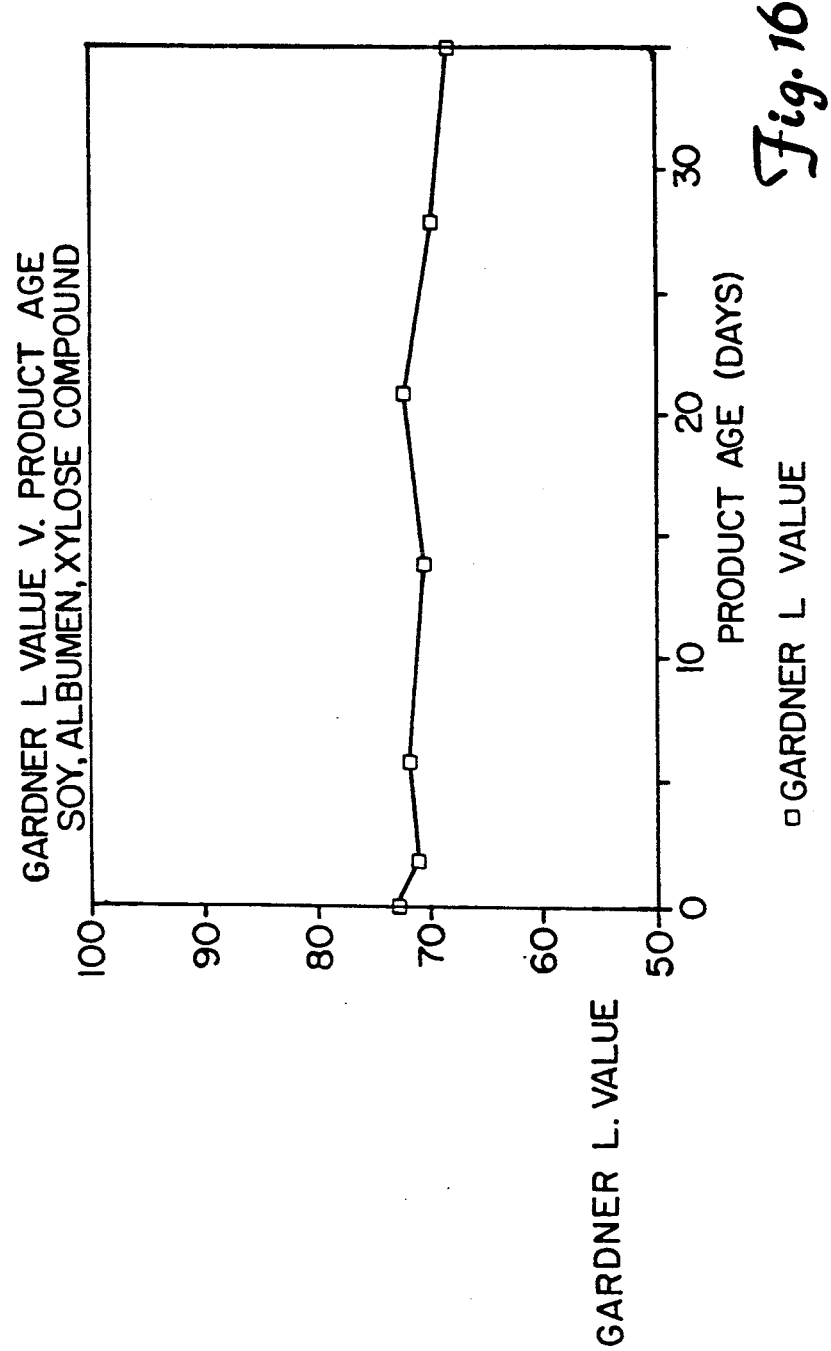
FIG. 16 shows shelf life performance in terms of resultant Gardner L values of the browning coating on refrigerated biscuits.
Figure 17:
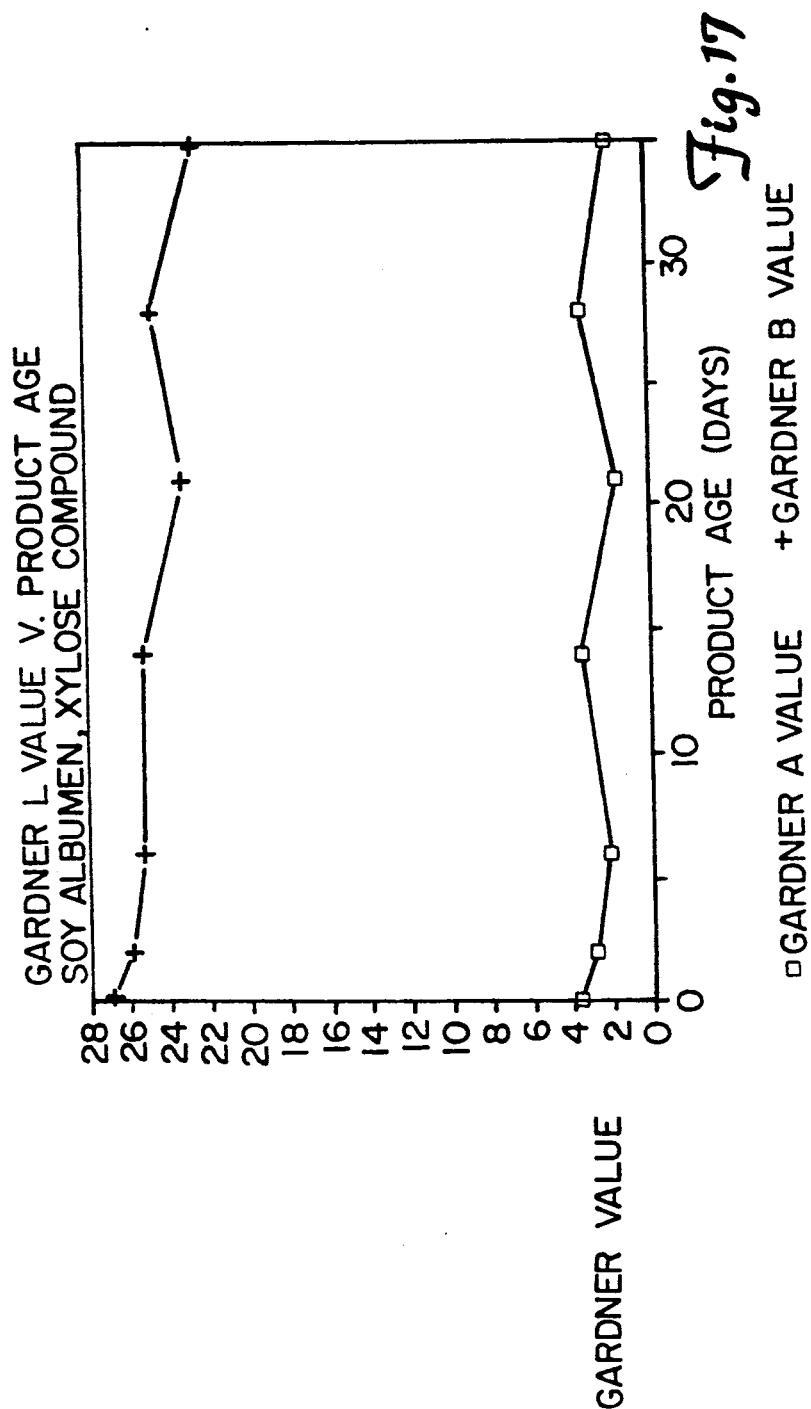
FIG. 17 shows shelf life performance in terms of resultant Gardner $a_L$ and $b_L$ values of the browning coating on refrigerated biscuits.

The shelf life performance of the microwave browning system of the present invention was evaluated in the buttermilk biscuit dough model system as described in Example 1. Throughout a seven-week study period, biscuit dough sample packages were periodically removed from refrigerated storage, microwaved, and evaluated via Gardner colorimetric analysis. Gardner L and $a_L$ values remained virtually unchanged while $b_L$ values varied slightly (no more than 15%) throughout the seven-week study (see FIGS. 16 and 17). In addition, the browning system browned to the same relative extent upon microwave preparation regardless of refrigeration storage time.

EXAMPLE 5

COPARTICULATE

Enhancing browning through prereaction may be accomplished by suspending the browning agents in water and drying them in such a manner as to yield dry solids (coparticulates). For example, a suspension was made by mixing 25 grams of albumin and 25 grams of xylose in 100 grams of water. This suspension was freeze dried for three days in a small laboratory freeze drier and the resultant coparticulate was evaluated versus the initial reactants in a shortening matrix on microwave biscuits. In each evaluation, nine samples were each coated with 1.7 grams of the browning system, placed in a microwaveable baking vessel inside a steam retaining pouch, and cooked on high in a Litton Generation II microwave oven for 2 minutes. The system was allowed to sit an additional 2 minutes after microwaving prior to opening the pouch. Eight of the nine biscuits microwaved in each run were evaluated using a Milton Roy spectrophotometer. Table 9 shows the averages of the resultant L $a_L$ $b_L$ color values:

TABLE 9

| Sample Type | Solids/Shortening Ratio | Gardner Color Value | | |
|---|---|---|---|---|
| | | L | $a_L$ | $b_L$ |
| xylose/albumin control 1 | 1:2 | 81.1 | −2.0 | 34.2 |

TABLE 9-continued

| Sample Type | Solids/Shortening Ratio | Gardner Color Value | | |
|---|---|---|---|---|
| | | L | $a_L$ | $b_L$ |
| xylose/albumin control 2 | 1:1 | 70.1 | 7.4 | 53.2 |
| xylose/albumin coparticulate | 1:2 | 70.7 | 7.6 | 54.7 |

The data indicated that by producing the coparticulate, the reactivity of the system has been enhanced, as compared to using non-coparticulate starting materials.

EXAMPLE 6

INCORPORATION OF BROWNING SYSTEM INTO THE CRUMB OF A BREAD PRODUCT BY BLITZING

Two small loaves of microwave bread-like products were made as follows to demonstrate interior browning. For each loaf, the dry ingredients (see formulas below) were premixed by hand. The shortening and water was then added and mixed in briefly with a spoon. The resultant dough was hand kneaded for 5 minutes and shaped into small loaves. The dough was allowed to proof for 10 minutes and then baked in a Litton Generation II microwave oven for 4 minutes. After this time, the loaves were cut in half and the color of the crumb was compared. The test loaf, containing the browning agents xylose and soy protein, had a browned crumb color whereas the control was white.

| Control | | Test | |
|---|---|---|---|
| flour | 100 grams | flour | 100 grams |
| shortening | 7 grams | shortening | 10 grams |
| sucrose | 7 grams | xylose | 10 grams |
| GDL | 1.5 grams | soy protein | 10 grams |
| soda | 1 gram | soda | 1 gram |
| water | 60 grams | GDL | 1.5 grams |
| | | water | 65 grams |

EXAMPLE 7

INCORPORATION OF BROWNING SYSTEM INTO THE INTERIOR OF A PRODUCT SYSTEM BY LAMINATION

Approximately 70 g of a 1:1:2, by weight, soy protein:xylose:shortening mixture was spread onto one side of an unraveled 152 g piece of Pillsbury Pipin'Hot ® Loaf dough using a butter knife. The treated loaf was rerolled in such manner that the coated surface remained in the interior of the product. The prepared loaf was then microwave heated in a Litton Generation II microwave oven set on high for 4 minutes. Upon completion of the microwave cooking cycle, browning for the load interior had occurred. The browning coating did not diffuse to any significant extent into the crumb structure of the load. Rather it remained isolated on the surface to which it was applied. As a result of laminated application, a brown swirl pattern developed within the treated loaf. No observable browning occurred in an untreated control sample.

EXAMPLE 8

ELECTROLYTE BROWNING ENHANCEMENT

A browning system comprising of 90% weight basis the formula described in Example 2 and 10% NaCl was prepared as outlined in Example 2. Approximately 2.5 g of the browning system described above was applied to two separate Pillsbury Buttermilk Biscuit dough samples. The samples were covered with Saran Wrap and baked in a Litton Generation II microwave oven on high for 90 seconds. Upon completion of the microwave cooking cycle, the samples were allowed to cool for 2 minutes after which time the Saran wrap was removed and Gardner colorimetric values taken. Two control samples were prepared, as described above, using the silicate based browning formula outlined in Example 2 (without the addition of NaCl). Table 10 shows the Gardner L, $a_L$, and $b_L$ values observed for biscuit samples treated with the two browning systems described above.

TABLE 10

| GARDNER L, $a_L$, AND $b_L$ VALUES CONTROL VERSUS 10% NaCl BROWNING SYSTEM | | |
|---|---|---|
| | CONTROL | 10% NaCl |
| L | 62.3 | 48.9 |
| $a_L$ | 7.5 | 8.5 |
| $b_L$ | 22.6 | 17.8 |

As the Gardner values show, the samples coated with 10% NaCl browning system browned to a greater extent than control browning system treated biscuits.

Infrared camera analysis of the surface temperature of the 10% NaCl browning system-treated biscuit samples showed an increase in surface temperature upon exposure to microwave energy when compared to the control browning system-treated biscuit dough samples. One of the advantages of electrolyte (NaCl) addition is that a desired degree of browning may be achieved in a shorter amount of time using smaller amounts of browning agents (e.g., reducing sugars, proteins, and controllers).

EXAMPLE 9

COMPARATIVE SHELF LIFE STUDY AT VARYING STORAGE TEMPERATURES

Comparative studies were conducted with a browning system in accordance with the present invention and a browning system falling within the scope of U.S. Pat. No. 4,448,791 to Fulde, et al., and assigned to Campbell's Soup Company.

The browning system selected from the '791 Campbell patent comprised yeast extract 12.5%, xylose 12.5%, shortening 30%, flour 25%, water 20% (all by weight).

The browning system in accordance with the instant invention, comprised soy protein 25%, xylose 25%, shortening 50% (all by weight).

Figure 26:
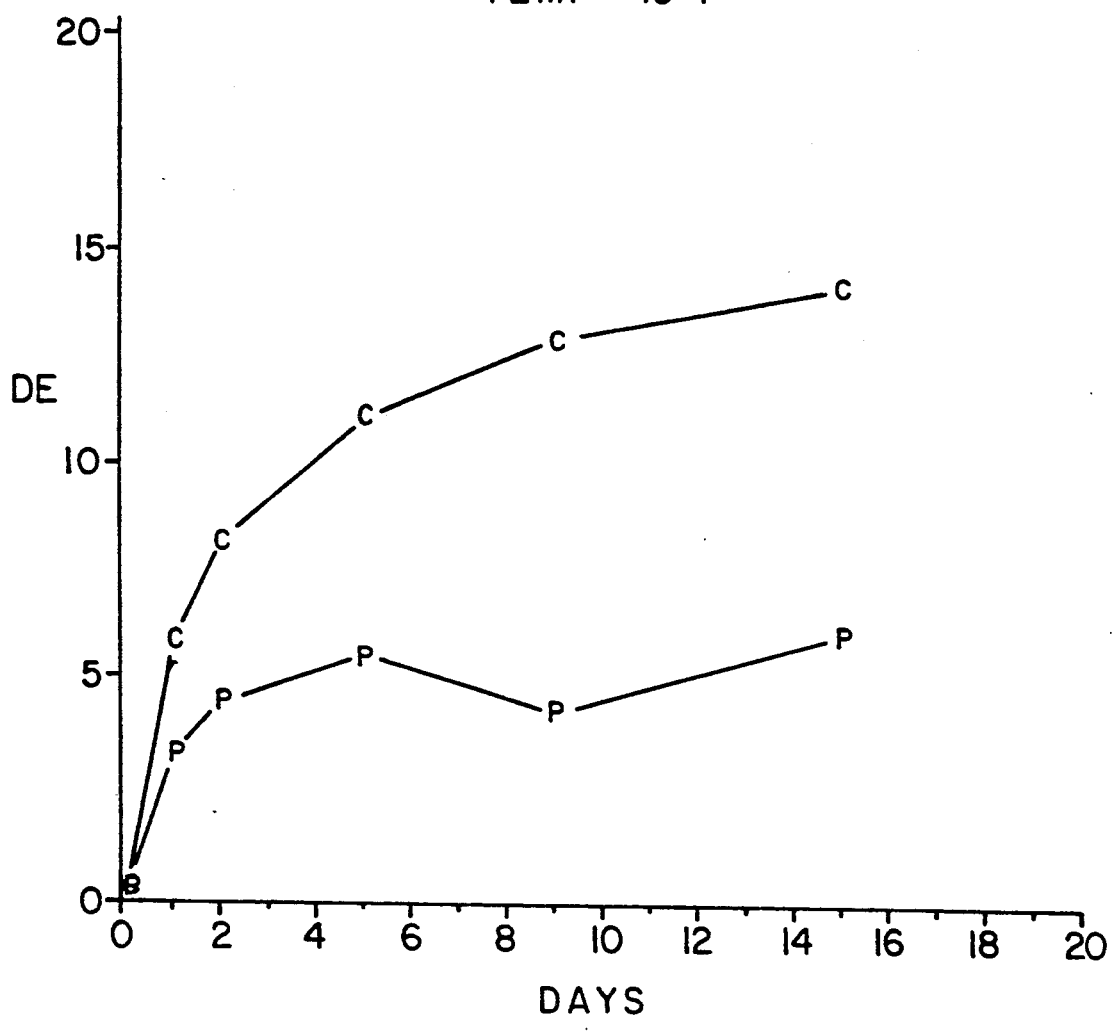
Figure 27:
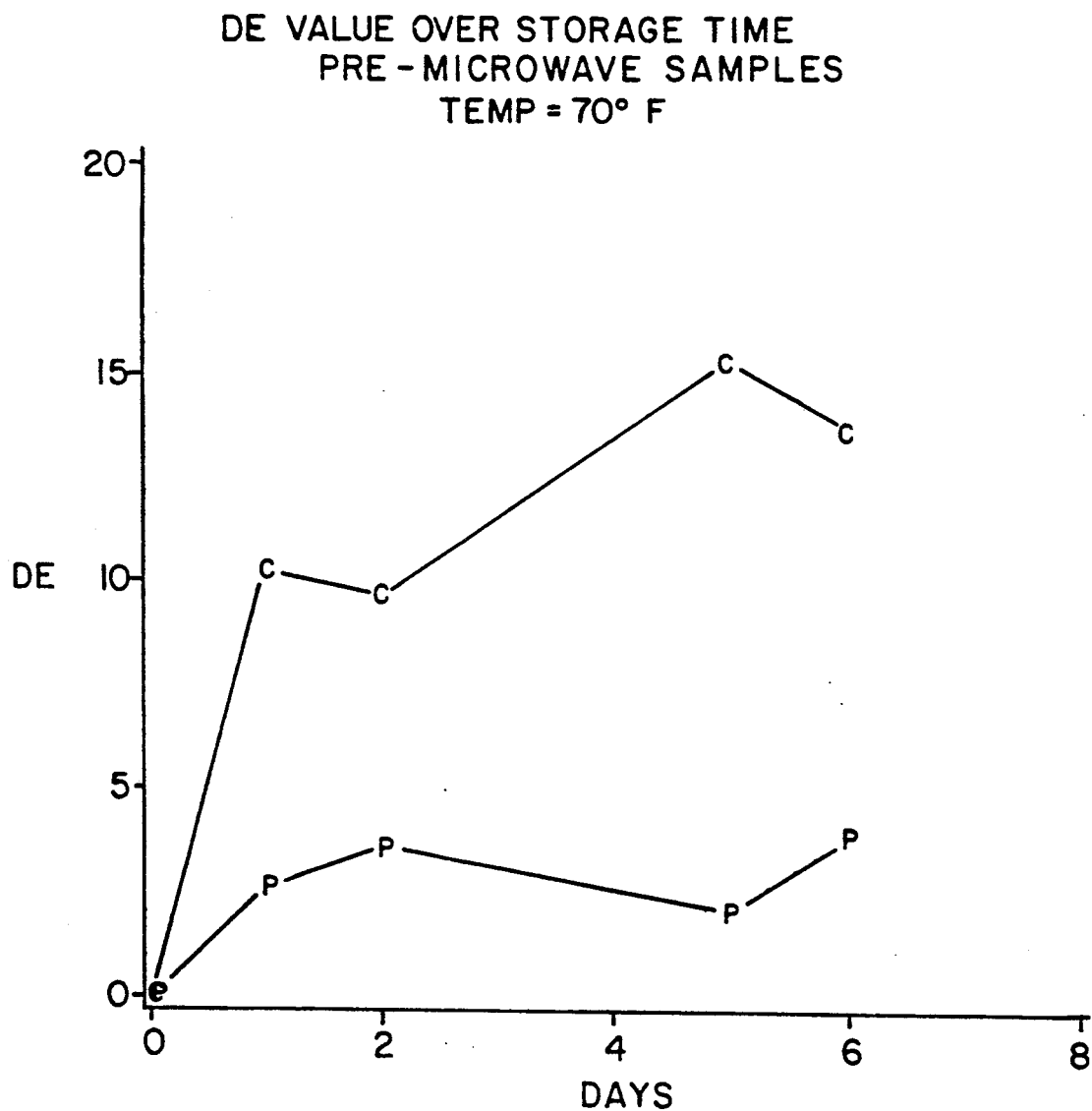

These two formulations were spreadable formulations and were used to coat the top surface of biscuits. Each biscuit was coated with 1.7 grams of the formulation. Nine biscuits were put into microwave brownie trays and placed in a pouch. The pouch was evacuated and flushed with carbon dioxide to avoid color changes in the dough due to oxidation. The biscuits stored at room temperature were unleavened. The biscuits were then placed in storage at three different temperatures (0°, 40°, and 70° F.). Colorimetric analysis was performed on eight of the nine biscuits in the tray at various time intervals (see FIGS. 25, 26, and 27) before microwaving. In these figures, the biscuits treated with the formulation in accordance with this invention, are indicated on the graphs as "P". The biscuits treated with a browning formulation in accordance with the '791 Campbell's patent, are indicated as "C".

Figure 25:
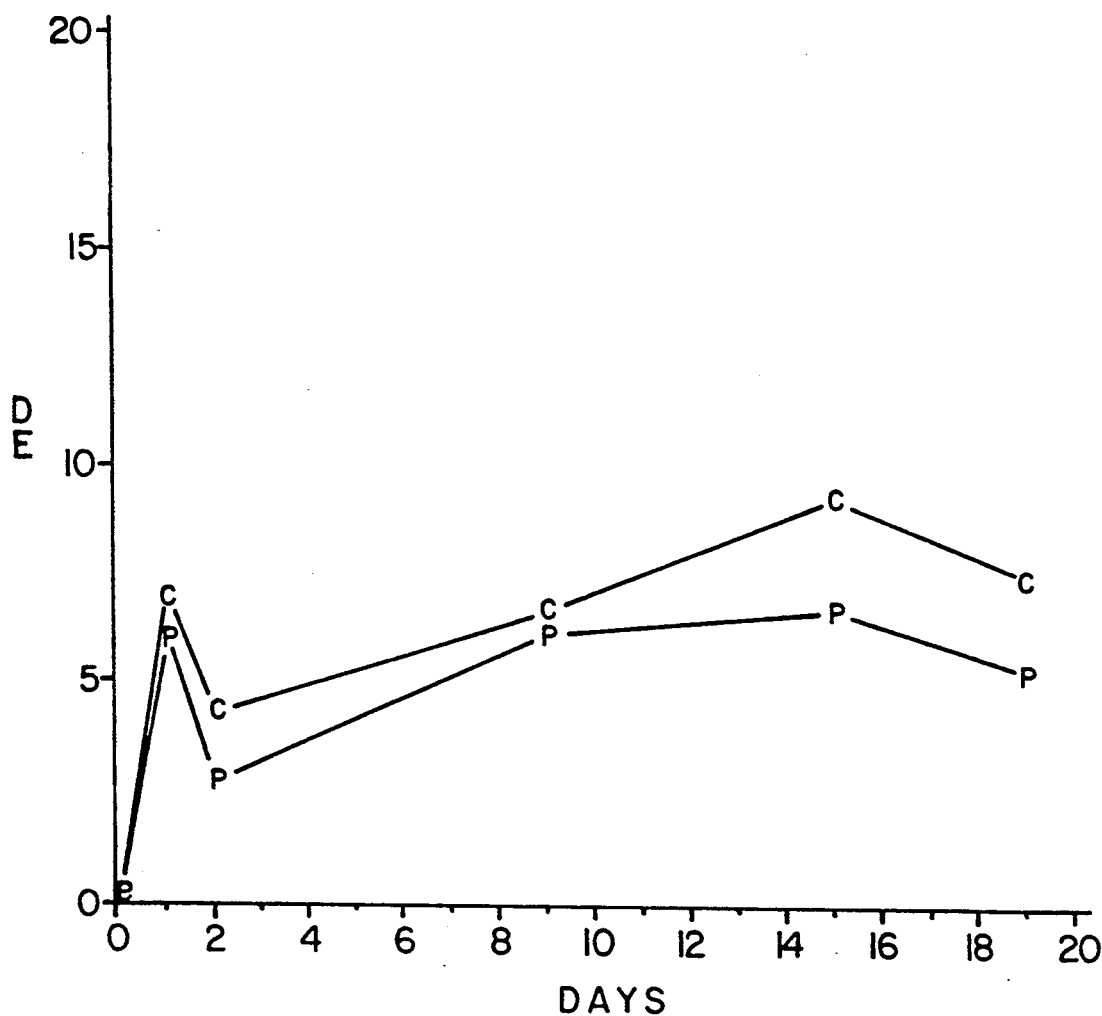
FIGS. 25, 26, and 27 compare certain shelf life studies performed with a food product treated in accordance with this invention (identified as "P"), and a food product prepared in accordance with an embodiment selected from U.S. Pat. No. 4,448,791 (identified as "C"), when stored at 0° F. (−18° C.)—FIG. 25, when stored at 40° F. (4° C.)—FIG. 26, and when stored at 70° F. (21° C.)—FIG. 27. The graphs of FIGS. 25-27 plot DE vs. days. DE is a parameter which is identified as the "color change" and describes the magnitude of the difference between the color of the brown surface area of the food product at day 0 and any given day.

These results show that the color of the biscuit samples treated with the '791 Campbell's formulation changed color more than the biscuits treated with formulations in accordance with this invention, over time at 40° F. and at 70° F. Both formulations were pretty close at 0° F. (as shown in FIG. 25). The graphs show DE vs. days. DE is a parameter which shows "color change" and describes the magnitude of the difference between the color of the biscuits at day 0 and any given day.

At 0° F. there is very little difference in DE between the two samples. Both are frozen, and the reactants should be reactively immobilized in both cases. The change in the first day for both samples appears to indicate that there was some residual oxygen which may have caused the dough to gray slightly. That would normally take about a day. The curves after day 1 for both samples are fairly flat. At 40° F. there seems to be a significant difference in DE at day 1 between the two formulations. The formulation in accordance with the '791 Campbell's patent has a definite positive slope, while the formulation in accordance with this invention seems to be unchanging after the second say. The formulations in accordance with the '791 Campbell's patent are browning slightly.

The difference is more significant at 70° F. The formulations in accordance with this invention show the same type of curve as at the other two temperatures. The formulation in accordance with the '791 Campbell's patent is changing much more and shows that the browning reactants are not reactively immobilized.

Embodiments of this invention can provide the advantage of control of color development in a browning system prior to microwave heating, thereby allowing distribution of the treated food products at standard food distribution temperatures, particularly frozen and refrigerated. Embodiments of this invention can also provide for quantitative control of the browning reaction to allow the end point of browning and textural development of the food product to coincide. Embodiments of the invention also allow for the predictability of the development of a coloring effect, and for means of displaying predicted colors using computer technology and color science.

SEE LAB

SeeLab is an interactive computer color display system which allows an operator to invoke:

1. A Triplet Patch Browser which allows one to view colors and colorimetric coordinates within a measured space.

2. A Gauged Browser which allows one to view predicted food product color by selecting and setting browning ingredient variables for a desired product system; based on linear regression of experimental color measurements on actual product.

3. An N by N Color Patch Browser which allows one to view an N by N grid of predicted product color patches generated by: a) selecting a product system; and b) fixing all but two browning system ingredient variables, allowing the remaining two variables to vary over their respective ranges; based on linear regression of experimental color measurements on actual product.

1. The Triplet Patch Browser

The triplet patch browser consists of two main areas: the gauge panel on the left and the color patch on the right. The gauge panel consists of three labeled gauges, each with a label, digital, and analog section. The color patch panel consists of a surround region and a central color display rectangle.

By changing the values of the gauges (e.g., L $a_L$ and $b_L$ values), the displayed color patch is recomputed and displayed. The gauged values can be changed by "dragging" the analog bar which results in a corresponding change in the digital readout or by using the popup menu in the digital gauge to type in a value. Dragging of an analog gauge is accomplished by placing the cursor in the analog display rectangle, pressing the mouse button and moving the cursor.

Figure 21:
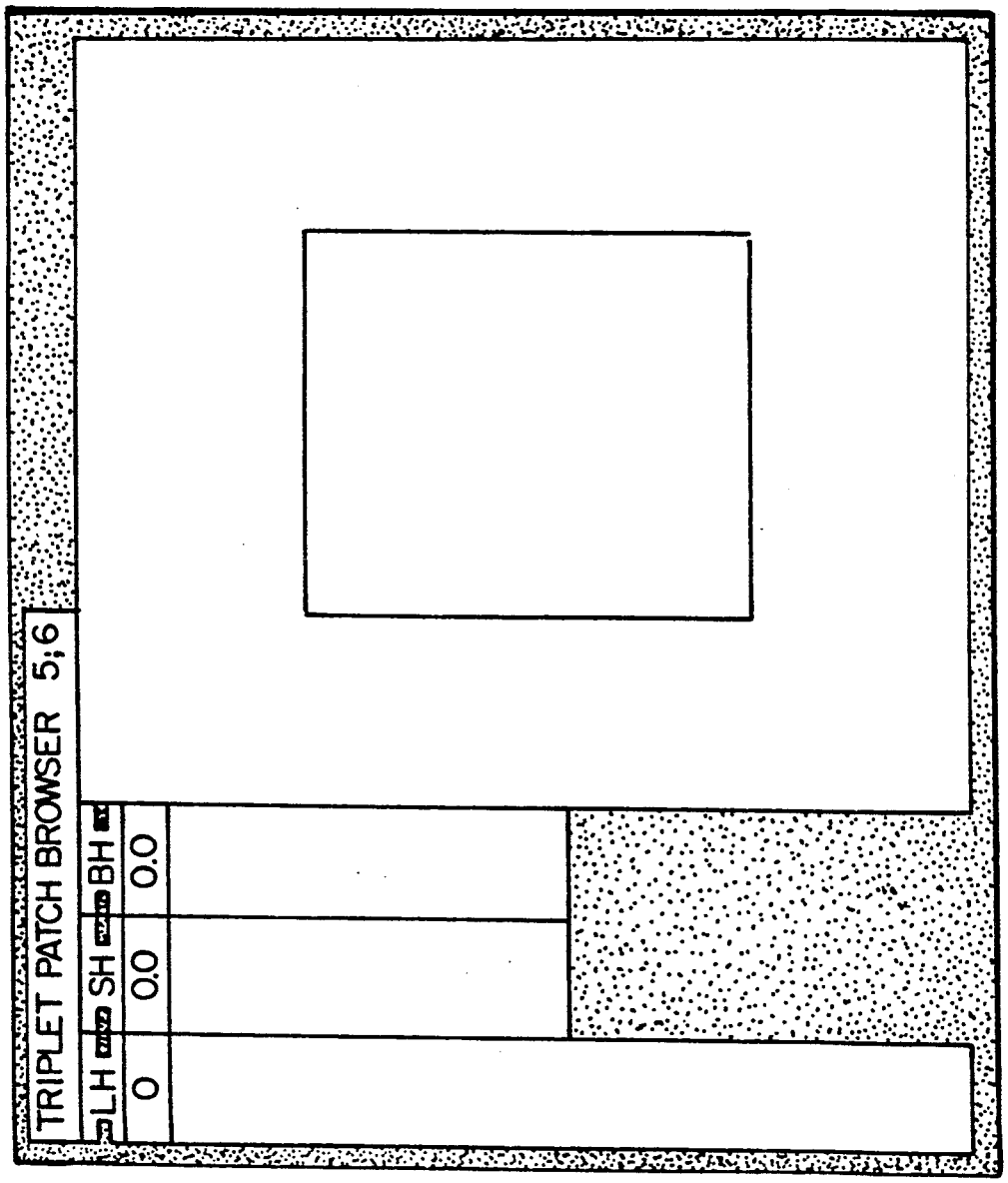
FIG. 21 shows an example of the triplet patch browser computer display.

An example of the triplet patch browser is shown in FIG. 21.

2. The Gauged Browser

The gauged patch browser consists of two main areas: the gauge panel on the top and the color patch panel on the bottom. The gauge panel consists of labeled gauges, one for each independent browning system variable in the regression on the experimental data, each with a label, digital, and analog section. The color patch panel consists of a surround region and a central color display rectangle.

By changing the values of the gauges (e.g., microwave time, sugar to protein ratio, soy protein to albumin ratio, glucose to xylose ratio, and % soda), the displayed color patch is recomputed and displayed. Dragging of an analog gauge is accomplished by placing the cursor in the analog display rectangle, pressing the mouse button and moving the cursor.

An example of the gauge browser on regression is shown in FIG. 22.

3. The N by N Color Patch Browser

The N by N color patch browser consists of a single labeled grid of colored rectangles. The number of horizontal and vertical divisions are the same and determined at invocation time. The horizontal and vertical independent browning system variables are labeled at the bottom and left edges of the grid while the fixed variables and their values are indicated on the top edge of the grid.

By selecting various values for the nondisplayed independent browning system variables, a plane in n-dimensional space is selected for display. After identifying a color region or browning system of interest, a color contour of that system or region can readily be generated using this browser.

Figure 23:
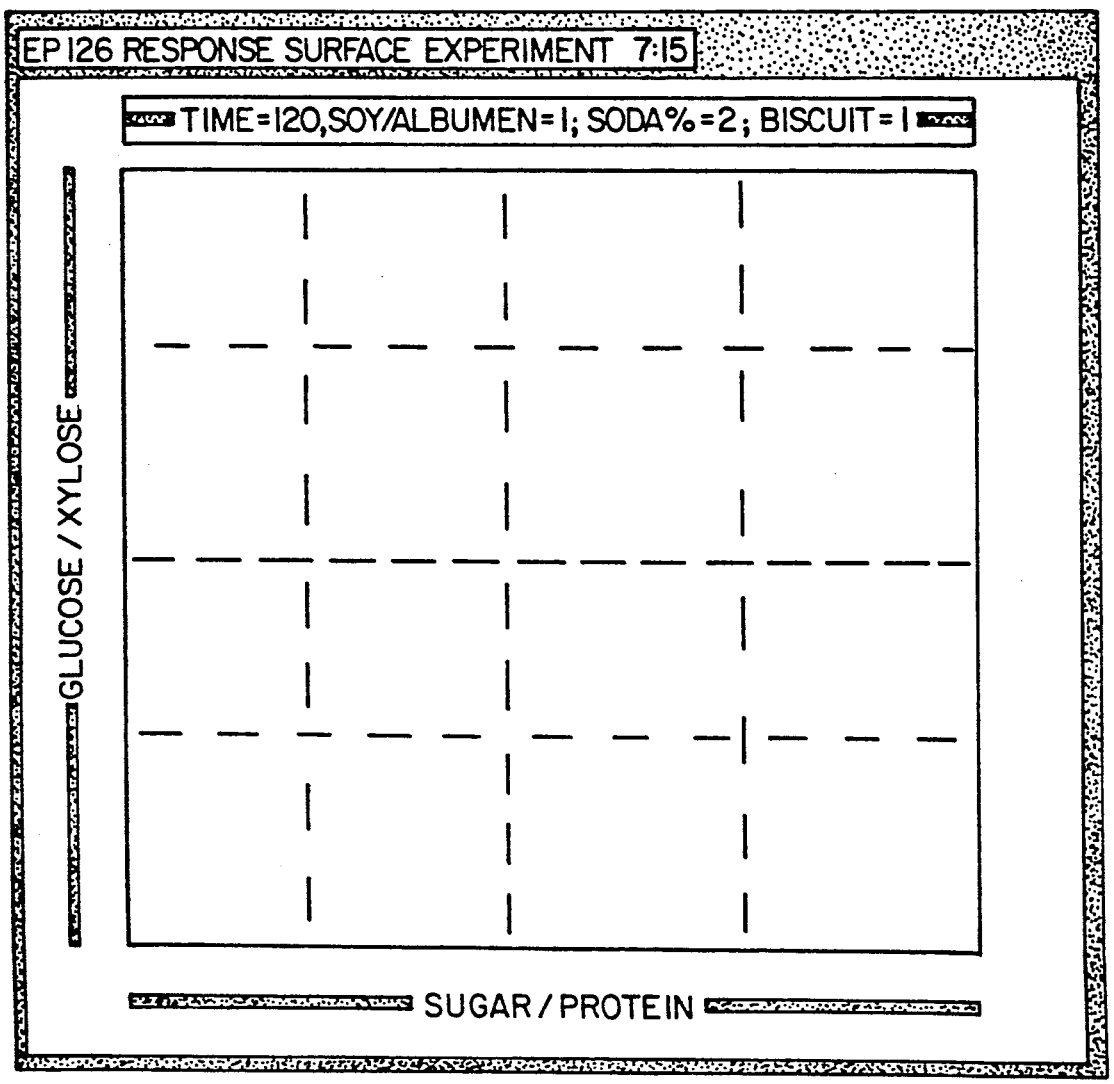
FIG. 23 shows an example of the N by N color patch browser computer display.

An example of the N by N color patch browser on regression is shown in FIG. 23.

Changes may be made in the components and assemblies described herein or in the steps or the sequence of steps of the method described herein without departing from the concept and scope of the invention as defined in the following claims.

SeeLab Assembly Notes

This section describes the steps required to assemble the SeeLab system on top of a commercially available release of Smalltalk-80. SeeLab is assembled on top of this release of Smalltalk-80:

"Smalltalk-80 Programming System Version VI 2.2 Macintosh II Oct. 15, 1987, ParcPlace Systems, Palo Alto, Calif.".

Using the 'do it' operation on the commands in double quotes below, load the additional components of the system in. Note that these fileIn operations are order sensitive and will not operate properly if the order is changed. They assume that the Pluggable Gauges TM resides on directory "PG FILES v 1.1" and that the SeeLab files reside on directory "SeeLabBuild".

1. Execute to enlarge display space for Spectrum display: "(DisplayScreen displayExtend: 1024@768. "H-P 9000")"
2. To install Pluggable Gauges: 37 (FileStream oldfileNames: 'PG FILES v 1.1:Pluggable Gauges V1.1.st') fileIn."
3. To fileIn the data types for SeeLab execute: "(FileStream oldfileNames: 'SeeLab.Build:SeeLab Data.st') fileIn."
4. Filing in the ExcelTextStream class: "(FileStream oldFileNames: 'SeeLab.Build:ExcelTextStream.st') fileIn."
5. Filing in the needed ColorFormView: "(FileStream oldFileNamed: 'SeeLab.Build:ColorFormView.st') fileIn."
6. Now we'll go for the ColorFormView.st file "(FileStream oldFileNamed: 'SeLab.Build:ColorInterface.st') fileIn."
7. Filing in the color spaces now: "(Filestream oldFileNamed: 'Seelab.Build:Color Spaces.st') fileIn."
8. Now, file in the triplet browser: "(FileStream oldFileNamed: 'SeeLab.Build:SLColorTripletBrowser.st') fileIn."
9. Now the tools: "(FileStream oldFileNamed: 'SeeLab.Build:Color Science Tools.st') fileIn."

Examples of the Use of SeeLab

Below are examples of the use of the tools in SeeLab. Selection and the 'doit' operation are part of the Smalltalk-80 environment. See Documentation for descriptive details.

1. To install experimental description as global variable EP120 select the text between quotes and 'doit': "EP120 _(SLCExperiment fromUserExcelTextFile: 'Paul''s Reality:EP120.ex.txt')."

The required format of the Excel Text File to build an experiment can be found in the method 'fromUserExcelTextFile'. Note that this is not the only acceptable way to deal with SLCExperiment creation. See that class's methods and comments for details. Also notice that creation of a Global variable in the system is also not required to use the tools. It does, however, make garbage collection for the system easier.

2. To open a Triplet Patch Browser on a Hunter Lab color triplet, select the text between quotes and 'doit': "SLCTripletPatchBrowser openNewOn: (SLLabHunterColor new)."
3. To open a Gauged Browser on the global experimental description created in 1., select the text between quotes and 'doit': "SLCGaugedPatch openOn: EP120." 'EP120' in this and 4. below only needs to evaluate as a instance of class SLCExperiment and may be expressed as another message or object reference.
4. To open a N by N Color Patch Browser on the global experimental description created in 1., select the text between quotes and 'doit'. "SLCNByNBrowser startupOn: EP120".

LISTINGS OF SEE LAB FILE IN FILES

The information in the following listings is copyrighted by The Pillsbury Company. ©1989, The Pillsbury Company (17 U.S.C. 401).

Note: Due to discrepancies in the glyphs associated with the ASCII character 95 decimal, the Smalltalk character represented by an arrow directed towards the left appears as '_' in the listings. Also, ASCII character 94 decimal, the Smalltalk character represented by an arrow directed upwards appears as '^'.

```
Below is the listing for file 'SeeLab Data.st' in standard
fileIn/fileOut format:

Object subclass: #SLObject
    instanceVariableNames: ''
    classVariableNames: ''
    poolDictionaries: ''
    category: 'SeeLab Data'!

!SLObject methodsFor: 'functions'!

penAngleFrom: firstPoint to: lastPoint
    | offset x y deg |
    "return the angle of the vector in Pen degrees (0 = north)."

offset _ lastPoint - firstPoint.
```

```
x _ offset x .
y _ offset y.
x = 0 ifTrue:[ x _ 0.0001].
deg _ (y / x) arcTan radiansToDegrees.
x positive & y positive ifTrue:[ deg _ 90 + deg].
x positive & y negative ifTrue:[ deg _ 90 + deg].
x negative & y positive ifTrue:[ deg _ 270 + deg].
x negative & y negative ifTrue:[ deg _ 270 + deg].

^deg!

rotate: thisPoint by: anAngle around: aPoint
     | point  x y xn yn theta |
     "rotate thisPoint by anAngle around aPoint"
theta _ (0-anAngle) degreesToRadians.

"homogenize point"
point _ thisPoint - aPoint.

"rotate point"
     x _ point x.
     y _ point y.
     xn _ x * theta cos - (y * theta sin).
     yn _ x * theta sin + (y * theta cos).
point _     xn @ yn.

"un-homogenize point"
point _ point _ aPoint.

^point! !

!SLObject methodsFor: 'notifying'!

inform: aString
     "display aString inside a bordered box on the screen until
     the user presses the mouse inside the box"

"SLObject new inform:
'Now is the time for all good men
to come to the aid of their country''s
``` deficit by sending in 1/2 of their
yearly earnings!!'"

| viewCenter continue continueBox continueFormBox continueForm
text textBox formBox screenBox screenUnderFormBox form cPoint targetBox
point delta |

"THE FOLLOWING CODE WILL PLACE THE INFORMATION VIEW IN THE CENTER OF THE
CURRENT STANDARDSYSTEMVIEW"
 "viewCenter _ ScheduledControllers activeController view
insetDisplayBox center."
"THIS CODE WILL CENTER THE VIEW AROUND THE CURRENT MOUSE LOCATION"
.viewCenter _ Sensor cursorPoint.

continue _ 'click here to continue' asDisplayText.
    continueBox _ continue boundingBox.
    continueFormBox _ Rectangle origin: 0 @ 0 extent: continueBox
extent + (4 @ 4).
    continueForm _ Form extent: continueFormBox extent.
    continueForm borderWidth: 2.
    continue displayOn: continueForm at: continueFormBox center -
continueBox center.
    text _ aString asDisplayText.
    textBox _ text boundingBox.
    formBox _ Rectangle origin: 0 @ 0 extent: (textBox extent x + 60
max: continueFormBox extent x) @ (50 + textBox extent y).

formBox _ formBox align: formBox center with: viewCenter.
    delta _ formBox amountToTranslateWithin: Display boundingBox.
    formBox moveBy: delta.

screenBox _ formBox.
    screenUnderFormBox _ Form fromDisplay: screenBox.
    form _ Form extent: formBox extent.
    form borderWidth: 3.
    text displayOn: form at: formBox extent //2 - textBox center - .0
@ 10).
    continueForm displayOn: form at: (cPoint _ formBox extent x //2 -
continueFormBox center x @ (form boundingBox bottomCenter y - 30)).

```
        targetBox _ continueFormBox translateBy: cPoint + screenBox
origin.
        form displayAt: screenBox origin.
        Sensor cursorPoint: screenBox center.
        10 timesRepeat: [Display reverse: screenBox].
        Cursor normal showWhile: [
                [point _ Sensor cursorPoint.
                (screenBox containsPoint: point)
                        ifFalse: [Display reverse: screenBox; reverse:
screenBox].
                (targetBox containsPoint: point)
                        & Sensor anyButtonPressed] whileFalse].
        Display reverse: targetBox.
        Sensor waitNoButton.
        49 timesRepeat: [Display reverse: targetBox].
        screenUnderFormBox displayAt: screenBox origin! !

"-- -- -- -- -- -- -- -- -- -- -- -- -- -- -- -- -- -- "!

SLObject class
        instanceVariableNames: ''!

!SLObject class methodsFor: 'notifying'!

inform: aString
        "display aString inside a bordered box on the screen until
        the user presses the mouse inside the box"

"SLObject inform:
'Now is the time for all good men
to come to the aid of their country''s
deficit by sending in 1/2 of their
yearly earnings!!'"

| viewCenter continue continueBox continueFormBox continueForm
text textBox formBox screenBox screenUnderFormBox form cPoint targetBox
point delta |

"THE FOLLOWING CODE WILL PLACE THE INFORMATION VIEW IN THE CENTER OF THE
CURRENT STANDARDSYSTEMVIEW"
```

"viewCenter _ ScheduledControllers activeController view insetDisplayBox center."

"THIS CODE WILL CENTER THE VIEW AROUND THE CURRENT MOUSE LOCATION"
viewCenter _ Sensor cursorPoint.

continue _ 'click here to continue' asDisplayText.
    continueBox _ continue boundingBox.
    continueFormBox _ Rectangle origin: 0 @ 0 extent: continueBox extent + (4 @ 4).
    continueForm _ Form extent: continueFormBox extent.
    continueForm borderWidth: 2.
    continue displayOn: continueForm at: continueFormBox center - continueBox center.
    text _ aString asDisplayText.
    textBox _ text boundingBox.
    formBox _ Rectangle origin: 0 @ 0 extent: (textBox extent x - 60 max: continueFormBox extent x) @ (50 + textBox extent y).

formBox _ formBox align: formBox center with: viewCenter.
    delta _ formBox amountToTranslateWithin: Display boundingBox.
    formBox moveBy: delta.

screenBox _ formBox.
    screenUnderFormBox _ Form fromDisplay: screenBox.
    form _ Form extent: formBox extent.
    form borderWidth: 3.
    text displayOn: form at: formBox extent //2 - textBox center - (0 @ 10).
    continueForm displayOn: form at: (cPoint _ formBox extent x //2 - continueFormBox center x @ (form boundingBox bottomCenter y - 30)).
    targetBox _ continueFormBox translateBy: cPoint + screenBox origin.
    form displayAt: screenBox origin.
    Sensor cursorPoint: screenBox center.
    10 timesRepeat: [Display reverse: screenBox].
    Cursor normal showWhile: [
        [point _ Sensor cursorPoint.
        (screenBox containsPoint: point)

```
                ifFalse: [Display reverse: screenBox; reverse:
screenBox].

(targetBox containsPoint: point)
            & Sensor anyButtonPressed] whileFalse].
    Display reverse: targetBox.
    Sensor waitNoButton.
    49 timesRepeat: [Display reverse: targetBox].
    screenUnderFormBox displayAt: screenBox origin! !

!SLObject class methodsFor: 'functions'!

penAngleFrom: firstPoint to: lastPoint
    | offset x y deg |
    "return the angle of the vector in Pen degrees (0 = north)"

offset _ lastPoint - firstPoint.

x _ offset x.
y _ offset y.
x = 0 ifTrue:[ x _ 0.0001].
deg _ (y / x) arcTan radiansToDegrees.
x positive & y positive ifTrue:[ deg _ 90 + deg].
x positive & y negative ifTrue:[ deg _ 90 + deg].
x negative & y positive ifTrue:[ deg _ 270 + deg].
x negative & y negative ifTrue:[ deg _ 270 + deg].

^deg!

rotate: thisPoint by: anAngle around: aPoint
    | point x y xn yn theta |
    "rotate thisPoint by anAngle around aPoint"
theta _ (0-anAngle) degreesToRadians.

"homogenize point"
point _ thisPoint - aPoint.

"rotate point"
    x _ point x.
    y _ point y.
    xn _ x * theta cos - (y * theta sin).
```

```
        yn _ x * theta sin + (y * theta cos).
point _    xn @ yn.

"un-homogenize point"
point _ point _ aPoint.

^point! !
SLObject subclass: #SLCRegression
    instanceVariableNames: 'coefficients baseValue mixedEffects
foundationMatrix valueMatrix variableDefinitions '
    classVariableNames: ''
    poolDictionaries: ''
    category: 'SeeLab Data'!

!SLCRegression methodsFor: 'building'!

coefficientsFromExcelText: aTextStream
    "builds the ordered collection of the coefficients of the
experiment from
    aTextStream that has already been opened and digested for its
trajectory.
    This expects (n*n + 3*n + 2)/2 coefficients of fit for each of the
color values."

| n expectedNumber actualNumber thisCo |
    n _ self variableDefinitions size.
    expectedNumber _ ((n * n) + (3 * n) + 2) / 2.
    self coefficients: (OrderedCollection new: 3).
    1 to: 3 do: [:i | coefficients add: (OrderedCollection new:
expectedNumber)].
    actualNumber _ 0.

[thisCo _ aTextStream nextStream contents asString.
    (thisCo sameAs: '...')
        | aTextStream atEnd]
        whileFalse:
            . [actualNumber _ actualNumber + 1.
            (coefficients at: 1)
                add: thisCo asNumber.
            (coefficients at: 2)
```

```
                add: aTextStream nextNumber.
        (coefficients at: 3)
                add: aTextStream nextNumber.
        aTextStream getToEndOfRow].
    actualNumber = expectedNumber ifFalse: [self error: 'Coefficient
count error!!!!!!']! !

!SLCRegression methodsFor: 'accessing'!

baseValue
        "return the value of baseValue.
        For a description of this instance variable, see the comment
        in the accessing method 'baseValue:'."

^baseValue!

baseValue: aParameter
        "set the value of baseValue.
        aParameter is expected to be of the class aClass.
        This instance variable is used to <explanation>."

baseValue _ aParameter!

coefficients
        "return the value of coefficients.
        For a description of this instance variable, see the comment
        in the accessing method 'coefficients:'."

^coefficients!

coefficients: aParameter
        "set the value of coefficients.
        aParameter is expected to be of the class aClass.
        This instance variable is used to <explanation>."
coefficients _ aParameter!

foundationMatrix
        "return the value of foundationMatrix.
        For a description of this instance variable, see the comment
        in the accessing method 'foundationMatrix:'."
```

^foundationMatrix!

foundationMatrix: aParameter
	"set the value of foundationMatrix.
	aParameter is expected to be of the class aClass.
	This instance variable is used to <explanation>."

foundationMatrix _ aParameter!

mixedEffects
	"return the value of mixedEffects.
	For a description of this instance variable, see the comment
	in the accessing method 'mixedEffects:'."

^mixedEffects!

mixedEffects: aParameter
	"set the value of mixedEffects.
	aParameter is expected to be of the class aClass.
	This instance variable is used to <explanation>."

mixedEffects _ aParameter!

valueMatrix
	"return the value of valueMatrix.
	For a description of this instance variable, see the comment
	in the accessing method 'valueMatrix:'."
^valueMatrix!

valueMatrix: aParameter
	"set the value of valueMatrix.
	aParameter is expected to be of the class aClass.
	This instance variable is used to <explanation>."

valueMatrix _ aParameter!

variableDefinitions
	"return the value of variableDefinitions.
	For a description of this instance variable, see the comment
	in the accessing method 'variableDefinitions:'."

^variableDefinitions!

variableDefinitions: aParameter
    "set the value of variableDefinitions.
    aParameter is expected to be of the class aClass.
    This instance variable is used to <explanation>."

variableDefinitions _ aParameter! !
SLObject subclass: #SLTrajectory
    instanceVariableNames: 'colorSamples variableDefinitions name description colorSpace '
    classVariableNames: ''
    poolDictionaries: ''
    category: 'SeeLab Data'!

!SLTrajectory methodsFor: 'building'!

buildAnExtendedTrajectoryFrom: anExcelTextStream
    "builds a trajectory from a ExcelTextStream passed as a parameter".
    "The receiver of this message is an instance of SLTrajectory"
    "Setup a reference to the TextStream and set it to the beginning"

| ts bldspace ivLast tripletClass thisIV newSample varTable newColor r |
    ts _ anExcelTextStream.
    ts reset.
    self setNameFrom: ts.
    self setDescriptionFrom: ts.
    self setColorSpaceFrom: ts.
    r _ self buildExtendedVariableDefinitionsFrom: ts.
    ivLast _ r at: 1.
    varTable _ r at: 2.
    "Now we plug in the samples."
    "Figure out what class the Triplets should belong to."
    tripletClass _ SLColorTriplet allSubclasses detect: [:each | each new colorSpace = self colorSpace]
                    ifNone:
                        [self inform: 'What in the world are you trying to do.....

imagine, sending me a color space that doesn''t exist.
Where do you think we are anyway, Melmac???'.
^nil].

(thisIV _ ts nextStream contents asString.
(thisIV sameAs: '...')
        | ts atEnd]
            whileFalse:
                [newSample _ SLColorSample new.
                newSample trajectory: self.
                "put in the independent variable values"
                1 to: ivLast do:
                    [:n |
                    newSample addVariable: ((varTable at: n)
                            at: 1)
                        value: thisIV asNumber.
                    thisIV _ ts nextStream contents asString].
                newColor _ tripletClass new.
                newColor value1: thisIV asNumber.
                newColor value2: ts nextNumber.
                newColor value3: ts nextNumber.
                newSample color: newColor.
                self addSample: newSample.
                ts getToEndOfRow].
    "Get top the end of the row if this isn't the end of file to get
ready for
    coefficient building"
    ts atEnd ifFalse: [ts getToEndOfRow].!

buildAOldTrajectoryFrom: anExcelTextStream
    "builds a trajectory from a ExcelTextStream passed as a parameter"

| ts bldspace varTable temp varElement n ivLast varDef
tripletClass newSample newColor thisIV |
    ts _ anExcelTextStream.
    ts reset.
    ts nextCellAsStringOfMax: 75.
    self name: ts currentObject.
    ts getToEndOfRow.
    "Don't care about the rest of the row."

ts acquireMultiLineText.

"Reads until three dots. 1st column only."

" Positions at last column of last row."

self description: ts currentObject.

"Now get the color space"

ts nextCellAsStringOfMax: 20.

bldspace _ ts currentObject asSymbol.

"first, figure out which color triplet class corresponds to my color space"

SLColorTriplet allSubclasses detect: [:each | each new colorSpace = bldspace]

ifNone:

[self inform: 'What in the world are you trying to do.....

imagine, sending me a color space that does not exist.
Where do you think we are anyway, Melmac???'.

^nil].

self colorSpace: bldspace.

ts getToEndOfRow.

"First set of columns are the names of the IVs until 'color' occurs"

"Buzz down through rows with column 1 as blank."

varTable _ OrderedCollection new.

[temp _ ts nextCellAsStringOfMax: 35.

temp = '']

whileTrue: [ts getToEndOfRow].

(temp sameAs: 'color')

ifTrue: [self error: 'A trajectory Must have at least one Independent Variable!!!!'].

n _ 1.

"build the table with only the names"

[temp sameAs: 'color']

whileFalse:.

[varElement _ OrderedCollection new: 3.

varElement add: temp.

varTable add: varElement.

temp _ ts nextCellAsStringOfMax: 35.

n _ n + 1].

ts getToEndOfRow.

```
ivLast _ n - 1.
"Now add the units"
ts getToEndOfRow.
temp _ ts nextCellAsStringOfMax: 35.
1 to: ivLast do:
    [:n |
    varElement _ varTable at: n.
    varElement add: temp.
    varTable at: n put: varElement.
    temp _ ts nextCellAsStringOfMax: 35.
    n _ n + 1].
ts getToEndOfRow.
temp _ Compiler evaluate: (ts nextCellAsStringOfMax: 35).
"Now use the default values to set up the variable definitions for the trajectory."
1 to: ivLast do:
    [:n |
    varElement _ varTable at: n.
    varDef _ SLVariableDefinition
                name: (varElement at: 1)
                units: (varElement at: 2)
                defaultValue: temp.
    self addVariableDefinition: varDef.
    temp _ Compiler evaluate: (ts nextCellAsStringOfMax: 35).
    n _ n + 1].
ts getToEndOfRow.
"Now we plug in the samples."
"Figure out what class the Triplets should belong to."
tripletClass _ SLColorTriplet allSubclasses detect: [:each | each
new colorSpace = self colorSpace]
            ifNone:
                [self inform: 'What in the world are you
trying to do.....
imagine, sending me a color space that doesn''t exist.
Where do you think we are anyway, Melmac???'.
                ^nil].

[thisIV _ ts nextStream contents asString.
(thisIV sameAs: '...')
    | ts atEnd]
```

```
whileFalse:
    [newSample _ SLColorSample new.
    newSample trajectory: self.
    "put in the independent variable values"
    1 to: ivLast do:
        [:n |
        newSample addVariable: ((varTable at: n)
                            at: 1)
            value: thisIV asNumber.
        thisIV _ ts nextStream contents asString].
    newColor _ tripletClass new.
    newColor value1: thisIV asNumber.
    newColor value2: ts nextNumber.
    newColor value3: ts nextNumber.
    newSample color: newColor.
    self addSample: newSample.
    ts getToEndOfRow]!

buildARevisedOldTrajectoryFrom: anExcelTextStream
    "builds a trajectory from a ExcelTextStream passed as a parameter"
    | ts bldspace varTable temp varElement n ivLast varDef
tripletClass newSample newColor thisIV r |
    ts _ anExcelTextStream.
    ts reset.
    self setNameFrom: ts.
    self setDescriptionFrom: ts.
    self setColorSpaceFrom: ts.
    r _ self buildVariableDefinitionsFrom: ts.
    ivLast _ r at: 1.
    varTable _ r at: 2.

"Now we plug in the samples."
    "Figure out what class the Triplets should belong to."
    tripletClass _ SLColorTriplet allSubclasses detect: [:each | each
new colorSpace = self colorSpace]
                ifNone:
                    [self inform: 'What in the world are you
trying to do.....
imagine, sending me a color space that doesn''t exist.
Where do you think we are anyway, Melmac???'.
                ^nil].
```

```
            [thisIV _ ts nextStream contents asString.
            (thisIV sameAs: '...')
                    | ts atEnd]
                whileFalse:
                        [newSample _ SLColorSample new.
                        newSample trajectory: self.
                        "put in the independent variable values"
                        1 to: ivLast do:
                            [:n |
                            newSample addVariable: ((varTable at: n)
                                        at: 1)
                                value: thisIV asNumber.
                            thisIV _ ts nextStream contents asString].
                        newColor _ tripletClass new.
                        newColor value1: thisIV asNumber.
                        newColor value2: ts nextNumber.
                        newColor value3: ts nextNumber.
                        newSample color: newColor.
                        self addSample: newSample.
                        ts getToEndOfRow]!

buildATrajectoryFrom: anExcelTextStream
    | ts bldspace ivLast tripletClass thisIV newSample varTable
newColor |
        "builds a trajectory from a ExcelTextStream passed as a parameter"

ts _ anExcelTextStream.
        ts reset.
        ts nextCellAsStringOfMax: 75.
        self name: ts currentObject.
        ts getToEndOfRow.
        "Don't care about the rest of the row."
        ts acquireMultiLineText.
        "Reads until three dots.  1st column only."
        "   Positions at last column of last row."
        self description: ts currentObject.
        "Now get the color space"
        ts nextCellAsStringOfMax: 20.
        bldspace _ ts currentObject asSymbol.
```

"first, figure out which color triplet class corresponds to my color space"

SLColorTriplet allSubclasses detect: [:each | each new colorSpace = bldspace]

ifNone:

[self inform: 'What in the world are you trying to do.....
imagine, sending me a color space that does not exist.
Where do you think we are anyway, Melmac???'.

^nil].

self colorSpace: bldspace.

ts getToEndOfRow.

"Build the variable definitions from the stream. This method returns the number of independent variables found in the textstream."

ivLast _ self buildVariableDefinitionsFrom: ts.

"Now we plug in the samples."

"Figure out what class the Triplets should belong to."

tripletClass _ SLColorTriplet allSubclasses detect: [:each | each new colorSpace = self colorSpace]

ifNone:

[self inform: 'What in the world are you trying to do.....
imagine, sending me a color space that doesn''t exist.
Where do you think we are anyway, Melmac???'.

^nil].

[thisIV _ ts nextStream contents asString.
(thisIV sameAs: '...')
    | ts atEnd]
    whileFalse:
        [newSample _ SLColorSample new.
        newSample trajectory: self.
        "put in the independent variable values"
        1 to: ivLast do:
            [:n |
            newSample addVariable: ((varTable at: n)
                at: 1)
                value: thisIV asNumber.
            thisIV _ ts nextStream contents asString].
        newColor _ tripletClass new.

```
        newColor valuel: thisIV asNumber.
        newColor value2: ts nextNumber.
        newColor value3: ts nextNumber.
        newSample color: newColor.
        self addSample: newSample.
        ts getToEndOfRow]!
``` buildExtendedVariableDefinitionsFrom: aTextStream

"First set of columns are the names of the IVs until 'color' occurs"

"varTable is an OrderedCollection of the IV names for later use"

"Buzz down through rows with column 1 as blank."

```
| temp n varElement ivLast varDef varTable returned |
varTable _ OrderedCollection new.
[temp _ aTextStream nextCellAsStringOfMax: 35.
temp = '']
        whileTrue: [aTextStream getToEndOfRow].
(temp sameAs: 'color')
        ifTrue: [self error: 'A trajectory Must have at least one
Independent Variable!!'].
        n _ 1.
        "build the table with only the names"
[temp sameAs: 'color']
        whileFalse:
                [varElement _ OrderedCollection new: 6.
                varElement add: temp.
                varTable add: varElement.
                temp _ aTextStream nextCellAsStringOfMax: 35.
                n _ n + 1].
aTextStream getToEndOfRow.
ivLast _ n - 1.
"Now add the units"
aTextStream getToEndOfRow.
temp _ aTextStream nextCellAsStringOfMax: 35.
1 to: ivLast do:
        [:n |
        varElement _ varTable at: n.
```

```
        varElement add: temp.
        varTable at: n put: varElement.
        temp _ aTextStream nextCellAsStringOfMax: 35.
        n _ n + 1].
"Now add the default"
aTextStream getToEndOfRow.
temp _ aTextStream nextCellAsStringOfMax: 35.
1 to: ivLast do:
        [:n |
        varElement _ varTable at: n.
        varElement add: temp.
        varTable at: n put: varElement.
        temp _ aTextStream nextCellAsStringOfMax: 35.
        n _ n + 1].
"Now add the center"
aTextStream getToEndOfRow.
temp _ aTextStream nextCellAsStringOfMax: 35.
1 to: ivLast do:
        [:n |
        varElement _ varTable at: n.
        varElement add: temp.
        varTable at: n put: varElement.
        temp _ aTextStream nextCellAsStringOfMax: 35.
        n _ n + 1].
"Now add the range"
aTextStream getToEndOfRow.
temp _ aTextStream nextCellAsStringOfMax: 35.
1 to: ivLast do:
        [:n |
        varElement _ varTable at: n.
        varElement add: temp.
        varTable at: n put: varElement.
        temp _ aTextStream nextCellAsStringOfMax: 35.
        n _ n + 1].
"Now add the min"
        aTextStream getToEndOfRow.
        temp _ aTextStream nextCellAsStringOfMax: 35.
        1 to: ivLast do:
                [:n |
```

```
            varElement _ varTable at: n.
            varElement add: temp.
            varTable at: n put: varElement.
            temp _ aTextStream nextCellAsStringOfMax: 35.
            n _ n + 1].
    aTextStream getToEndOfRow.
    temp _ aTextStream nextCellAsStringOfMax: 35.
    "Now use the max values to set up the variable definitions for the
trajectory."
    1 to: ivLast do:
        [:n |
        varElement _ varTable at: n.
        varDef _ SLCExtendedVariableDefinition
                        name: (varElement at: 1)
                        units: (varElement at: 2)
                        defaultValue: (varElement at: 3)
                        center: (varElement at: 4)
                        range: (varElement at: 5)
                        min: (varElement at: 6)
                        max: temp.
        self addVariableDefinition: varDef.
        temp _ aTextStream nextCellAsStringOfMax: 35.
        n _ n + 1].
    aTextStream getToEndOfRow.
    returned _ OrderedCollection new: 2.
    returned add: ivLast.
    returned add: varTable.
    ^returned!

buildVariableDefinitionsFrom: aTextStream

"First set of columns are the names of the IVs until 'color'
occurs"
    "Buzz down through rows with column 1 as blank."

| varTable temp n varElement ivLast varDef returned |
    varTable _ OrderedCollection new.

[temp _ aTextStream nextCellAsStringOfMax: 35.
    temp = '']
            whileTrue: [aTextStream getToEndOfRow].
```

```
(temp sameAs: 'color')
        ifTrue: [self error: 'A trajectory Must have at least one
Independent Variable!!'].
    n _ 1.
    "build the table with only the names"
    [temp sameAs: 'color']
        whileFalse:
            [varElement _ OrderedCollection new: 3.
            varElement add: temp.
            varTable add: varElement.
            temp _ aTextStream nextCellAsStringOfMax: 35.
            n _ n + 1].
    aTextStream getToEndOfRow.
    ivLast _ n - 1.
    "Now add the uniaTextStream"
    aTextStream getToEndOfRow.
    temp _ aTextStream nextCellAsStringOfMax: 35.
    1 to: ivLast do:
        [:n |
        varElement _ varTable at: n.
        varElement add: temp.
        varTable at: n put: varElement.
        temp _ aTextStream nextCellAsStringOfMax: 35.
        n _ n + 1].
    aTextStream getToEndOfRow.
    temp _ Compiler evaluate: (aTextStream nextCellAsStringOfMax: 35).
    "Now use the default values to set up the variable definitions for
the trajectory."
    1 to: ivLast do:
        [:n |
        varElement _ varTable at: n.
        varDef _ SLVariableDefinition
                    name: (varElement at: 1)
                    units: (varElement at: 2)
                    defaultValue: temp.
        self addVariableDefinition: varDef.
        temp _ Compiler evaluate: (aTextStream
nextCellAsStringOfMax: 35).
        n _ n + 1].
    aTextStream getToEndOfRow.
```

```
returned _ OrderedCollection new.
returned add: ivLast.
returned add: varTable.
^returned!
``` setColorSpaceFrom: anExcelTextStream

```
    | ts bldspace |
    "Get the color space, verify that it's valid and set it in the
Trajectory"
    ts _ anExcelTextStream.
    ts nextCellAsStringOfMax: 20.
    bldspace _ ts currentObject asSymbol.
    SLColorTriplet allSubclasses detect: [:each | each new colorSpace
= bldspace]
            ifNone:
                    [self inform: 'Color space does not exist'.
                    ^nil].
    self colorSpace: bldspace.
    ts getToEndOfRow.
    ^bldspace!
``` setDescriptionFrom: anExcelTextStream

```
    "Read and insert the description from multiple lines of text in
column A"
    "Reads until three dots. 1st column only. Positions at last
column of last row."

| ts |
    ts _ anExcelTextStream.
    ts acquireMultiLineText.
    self description: ts currentObject.
    ^description!
``` setNameFrom: anExcelTextStream

```
    "Read and insert the name of the Trajectory from column A and skip
to the end
    of the row."

| ts |
    ts _ anExcelTextStream.
    ts nextCellAsStringOfMax: 75.
```

```
        self name: ts currentObject.
        ts getToEndOfRow.
        ^self name! !

!SLTrajectory methodsFor: 'accessing'!

colorSamples
        "return the value of colorSamples.
        For a description of this instance variable, see the comment
        in the accessing method 'colorSamples:'."

colorSamples isNil ifTrue: [self colorSamples: OrderedCollection
new].
        ^colorSamples!
colorSamples: anOrderedCollection
        "set the value of colorSamples.
        anOrderedCollection is expected to be of the class
OrderedCollection.
        This instance variable is used to hold a collection of instances
of SLColorSample."

colorSamples _ anOrderedCollection!

colorSpace
        "return the value of colorSpace.
        For a description of this instance variable, see the comment
        in the accessing method 'colorSpace:'."
colorSpace isNil ifTrue:[self colorSpace:#LabHunter].
^colorSpace!

colorSpace: aSymbol
        "set the value of colorSpace.
        aSymbol is expected to be of the class Symbol.
        This instance variable is used to hold a symbol that denotes the
color space used in this trajectory.  All color samples taken in this
experiment should be recorded as LabColorSamples."

colorSpace _ aSymbol!

description
```

```
    "return the value of description.
    For a description of this instance variable, see the comment
    in the accessing method 'description:'."
description isNil ifTrue:[self description: 'not defined yet'].
^description!

description: aString
    "set the value of description.
    aString is expected to be of the class String.
    This instance variable is used to the verbose description of this
trajectory."

description _ aString!

name
    "return the value of name.
    For a description of this instance variable, see the comment
    in the accessing method 'name:'."
name isNil ifTrue:[self name: 'not defined yet'].
^name!

name: aString
    "set the value of name.
    aString is expected to be of the class String.
    This instance variable is used to hold the name of this
trajectory."

name _ aString!

variableDefinitions
    "return the value of variableDefinitions.
    For a description of this instance variable, see the comment
    in the accessing method 'variableDefinitions:'."
variableDefinitions isNil ifTrue:[self variableDefinitions:
OrderedCollection new].
^variableDefinitions!

variableDefinitions: anOrderedCollection
    "set the value of variableDefinitions.
``` anOrderedCollection is expected to be of the class anOrderedCollection.

~~This instance variable~~ is used to hold a collection of instances of SLVariableDefinition."
variableDefinitions _ anOrderedCollection! !

!SLTrajectory methodsFor: 'color sample access'!

addColorSample
    "create the proper color sample with the right independent variables and add it
    to my collection of samples"

| colorSample |
    colorSample _ self newColorSample.
    self colorSamples add: colorSample.
    colorSample trajectory: self.
    ^colorSample!

addColorSampleBefore: anSLColorSample
    | colorSample |
    "create the proper color sample with the right independent variables and add it to my collection of samples"

colorSample _ self newColorSample.

self colorSamples add: colorSample before: anSLColorSample.
    colorSample trajectory: self.
    ^colorSample!

addSample: aSample
    | colorSample |
    self colorSamples add: aSample.!

blankColorSample
    | ~~tripletClass colorTriplet~~ colorTriplet colorSample |
    "create the proper color sample with the right independent variables and return it"

```
colorSample _ SLColorSample new.

"first, figure out which color triplet class corresponds to my color
space"
tripletClass _ SLColorTriplet allSubclasses detect:[:each| each new
colorSpace = self colorSpace] ifNone:[self inform:
'What in the world are you trying to do.....
imagine, sending me a color space that doesn''t exist.
Where do you think we are anyway, Melmac???'. ^nil].

colorTriplet _ tripletClass new.

colorSample color: colorTriplet.

^colorSample!

newColorSample
    "create the proper color sample with the right independent
variables and return
    it "

| tripletClass colorTriplet colorSample | colorSample _ SLColorSample new.
    "first, figure out which color triplet class corresponds to my
color space"
    tripletClass _ SLColorTriplet allSubclasses detect: [:each | each
new colorSpace = self colorSpace]
                ifNone:
                    [self inform: 'Color sample space does not
exist'.
                    ^nil].
    colorTriplet _ tripletClass new.
    colorSample color: colorTriplet.
    self variableDefinitions do:
        [:varDef |
        colorSample addVariable: varDef name.
        colorSample atVariable: varDef name put: varDef
defaultValue].
```

```
^colorSample! !

removeColorSample: anSLColorSample
    "remove this sample"

self colorSamples remove: anSLColorSample.

anSLColorSample trajectory: nil.! !

!SLTrajectory methodsFor: 'IV value range access'!

maxMinOfIV: aString
    "colorSamples is an OrderedCollection. Each sample holds a
Dictionary-class
    instance variable holding the IV string name and the associated
value."
    "This routine finds the min and max of a IV named aString and
returns them as
    a point (min@max)."

| min max temp n |
    min _ 9999999999999999999.
    max _ 0 - min.
    1 to: self colorSamples size do:
        [:n |
        temp _ (self colorSamples at: n)
        temp isNil
            ifFalse:
                [temp > max ifTrue: [max _ temp].
                temp < min ifTrue: [min _ temp]
                ]
        ]! !

!SLTrajectory methodsFor: 'variable definition access'!

addVariableDefinition
    "create a new var def and keep it......if it does not conflict with
an existing var
    def "
```

```
    | varDef |
    varDef _ SLVariableDefinition fromUser.
    self variableDefinitions detect: [:each | each name = varDef name]
            ifNone:
                    [self variableDefinitions add: varDef.
                    ^self].
    self inform: 'A variable definition named
''' , varDef name , '''
already exists in this trajectory'.
    ^nil!

addVariableDefinition: anSLVariableDefinition
    "keep a new definition.....if it does not conflict with an
existing var def"

| varDef |
    self variableDefinitions detect: [:each | each name =
anSLVariableDefinition name]
            ifNone:
                    [self variableDefinitions add: anSLVariableDefinition.
                    ^self].
    self inform: 'A variable definition named
''' , anSLVariableDefinition name , '''
already exists in this trajectory'.
    ^nil!

addVariableDefinitionFromUser
    "create a new var def and keep it......if it does not conflict with
an existing var
    def "

| varDef |
    varDef _ SLVariableDefinition fromUser.
    self variableDefinitions detect: [:each | each name = varDef name]
            ifNone:
                    [self variableDefinitions add: varDef.
                    ^self].
    self inform: 'A variable definition named
''' , varDef name , '''
``` already exists in this trajectory'.
    ^nil!

removeVariableDefinition: aString
    "remove a var def named aString"

| varDef |
    varDef _ self variableDefinitions detect: [:each | each name = aString]
                    ifNone:
                        [self inform: 'A variable definition named
''' , aString , '''
does not exist in this trajectory'.
                        ^nil].
    self variableDefinitions remove: varDef!

unitsFor: aString
    "return the units string for my variable definition named aString"

| varDef |
    varDef _ self variableDefinitions detect: [:each | each name = aString].
    ^varDef units!

variableDefinitionNamed: aString
    "return a var def named aString"

^self variableDefinitions detect: [:each | each name = aString]
        ifNone:
            [self inform: 'A variable definition named
''' , aString , '''
does not exist in this trajectory'.
            ^nil]! !

!SLTrajectory methodsFor: 'releasing'!

release
    "clean up"

```
self colorSamples do:[:each| self removeColorSample: each].
self colorSamples: nil.

super release! !

!SLTrajectory methodsFor: 'browsing'!

browse
        "open a browser on me"

SLTrajectoryBrowser openOn: self! !

!SLTrajectory methodsFor: 'sample sorting'!
resortSamples
        | varName sortedSamples |
        "sort the samples"
varName _ self variableDefinitions first name.
sortedSamples _ self colorSamples asSortedCollection:[:x :y| (x
atVariable: varName) < (y atVariable: varName)].

self colorSamples: sortedSamples.

self changed:#order! !

!SLTrajectory methodsFor: 'xy plotting'!

xyPlotFromUser
        "ask the user for each parameter and then create a data set and
open an
        XYDataSetView on it"

| string param1 param2 dataSet |
        string _ FillInTheBlank request: 'Enter a variable name or 1,2,or
3 for the X axis:'.
        (#('1' '2' '3' ) includes: string)
            ifTrue: [param1 _ string asNumber]
            ifFalse: [param1 _ string].
        string _ FillInTheBlank request: 'Enter a variable name or 1,2,or
3 for the Y axis:'.
        (#('1' '2' '3' ) includes: string)
```

```
                ifTrue: [param2 _ string asNumber]
                ifFalse: [param2 _ string].
        dataSet _ self createDataSetWithX: param1 andY: param2.
        dataSet edit! !

!SLTrajectory methodsFor: 'xy data set generation'!
createDataSetWithX: param1 andY: param2
        "create and return a data set using the parameters param1 and
param2 on the
        respective axes. If a param is a String, then it is a variable
name, if it is a
        number, then it is 1-3 and refers to triplet values 1-3"

| query1 query2 dataSet x y |
        (param1 isKindOf: String)
                ifTrue: [query1 _ Array with: #atVariable: with: param1]
                ifFalse: [query1 _ Array with: ('value' , param1
printString) asSymbol].
        (param2 isKindOf: String)
                ifTrue: [query2 _ Array with: #atVariable: with: param2]
                ifFalse: [query2 _ Array with: ('value' , param2
printString) asSymbol].
        dataSet _ XYDataSet new.
        self colorSamples do:
                [:sample |
                query1 size > 1
                        ifTrue: [x _ sample perform: query1 first with: query1
last]
                        ifFalse: [x _ sample color perform: query1 first].
                query2 size > 1
                        ifTrue: [y _ sample perform: query2 first with: query2
last]
                        ifFalse: [y _ sample color perform: query2 first].
                dataSet dataPoints add: x @ y].
        ^dataSet! !
"-- -- -- -- -- -- -- -- -- -- -- -- -- -- -- -- -- -- "!

SLTrajectory class
        instanceVariableNames: ''!
```

!SLTrajectory class methodsFor: 'building'!

fromUserExcelTextFile
"read in a new an ExcelTextStream on a user-specified Excel text file
and open a Trajectory browser on it."

"The input format is:
--cell A1 is text name of the trajectory

--cell A2 thru An is a text description of the
trajectory. It ends in three consecutive periods. Each line is a
maximum of 75 characters.

--cell An+1 is the system that the colors were measured in.
first non-blank A cell after that is the name of the first independent
variable.

--independent variable names continue in consecutive cells to the right
until the cell name 'color' is encountered, indicating the column where
the first tristimulus readings are entered.
the next row under the IV names contain the units of the IV's.

--no default values are used during build. If an expected field is
blank, an error is generated and the build will not result in a
Trajectory. All cells, however are scanned.

--the next rows contain samples. Any cells not specified explicitly
above or implied by the IV and tristimulus columns can be used as
desired. They will be ignored by the system.
The last row contains three periods in the first column."

```
    | inName directory localName traj | inName _ FillInTheBlank request:'File name, please.'.
    directory _ FileDirectory directoryFromName: inName setFileName:
[:localNamex | localName _ localNamex].
    (directory isLegalFileName: localName)
        ifTrue:
            [ traj _ super new.
```

```
traj buildATrajectoryFrom: (ExcelTextStream oldFileNamed: inName).
^traj]!
``` fromUserExcelTextFile: aFileName
"read in a new an ExcelTextStream on a user-specified Excel text file
and open a Trajectory browser on it."

"The input format is:
--cell A1 is text name of the trajectory

--cell A2 thru An is a text description of the
trajectory. It ends in three consecutive periods. Each line is a
maximum of 75 characters.

--cell An+1 is the system that the colors were measured in.
first non-blank A cell after that is the name of the first independent
variable.

--independent variable names continue in consecutive cells to the right
until the cell name 'color' is encountered, indicating the column where
the first tristimulus readings are entered.
the next row under the IV names contain the units of the IV's.

--no default values are used during build. If an expected field is
blank, an error is generated and the build will not result in a
Trajectory. All cells, however are scanned.

--the next rows contain samples. Any cells not specified explicitly
above or implied by the IV and tristimulus columns can be used as
desired. They will be ignored by the system.
The last row contains three periods in the first column."

```
        | inName directory localName traj | inName _ aFileName.
        directory _ FileDirectory directoryFromName: inName setFileName:
[:localNamex | localName _ localNamex].
        (directory isLegalFileName: localName)
            ifTrue:
                [ traj _ super new.
```

```
traj buildATrajectoryFrom: (ExcelTextStream oldFileNamed: inName).
^traj]!

testFromUserExcelTextFile
"read in a new an ExcelTextStream on a user-specified Excel text file
and open a Trajectory browser on it."

"The input format is:
--cell A1 is text name of the trajectory

--cell A2 thru An is a text description of the
trajectory.  It ends in three consecutive periods. Each line is a
maximum of 75 characters.

--cell An+1 is the system that the colors were measured in.
first non-blank A cell after that is the name of the first independent
variable.

--independent variable names continue in consecutive cells to the right
until the cell name 'color' is encountered, indicating the column where
the first tristimulus readings are entered.
the next row under the IV names contain the units of the IV's.
--no default values are used during build.  If an expected field is
blank, an error is generated and the build will not result in a
Trajectory.  All cells, however are scanned.

--the next rows contain samples.  Any cells not specified explicitly
above or implied by the IV and tristimulus columns can be used as
desired.  They will be ignored by the system."

| inName directory localName traj | inName _ 'Paul''s Reality:Excel Color
Files:Panama/Fahrenholtz:PanamaTest01'.
    directory _ FileDirectory directoryFromName: inName setFileName:
[:localNamex | localName _ localNamex].
        (directory isLegalFileName: localName)
            ifTrue:
                [ traj _ super new.
```

```
traj buildARevisedOldTrajectoryFrom: (ExcelTextStream oldFileNamed:
inName).
^traj]! !
SLObject subclass: #SLColorSample
    instanceVariableNames: 'color independentVariables trajectory '
    classVariableNames: ''
    poolDictionaries: ''
    category: 'SeeLab Data'!

!SLColorSample methodsFor: 'accessing'!

color
    "return the value of color.
    For a description of this instance variable, see the comment
    in the accessing method 'color:'."

color isNil ifTrue:[self color: SLLabHunterColor new].
^color!

color: anSLColorTriplet
    "set the value of color.
    anSLColorTriplet is expected to be a subclass of anSLColorTriplet.
    This instance variable is used to hold the color observed for this
sample."

color _ anSLColorTriplet!

independentVariables
    "return the value of independentVariables.
    For a description of this instance variable, see the comment
    in the accessing method 'independentVariables:'."
independentVariables isNil ifTrue:[self independentVariables: Dictionary
new].
^independentVariables!

independentVariables: aDictionary
    "set the value of independentVariables.
    aDictionary is expected to be of the class Dictionary.
```

This instance variable is used to hold a dictionary of independentVariables connected with this sample. The keys of this dictionary will be the names of the variables and the values will (you guessed it!!), the values for the variables."

independentVariables _ aDictionary!

trajectory
    "return the value of trajectory.
    For a description of this instance variable, see the comment
    in the accessing method 'trajectory:'."

^trajectory!

trajectory: anSLTrajectory
    "set the value of trajectory.
    anSLTrajectory is expected to be of the class SLTrajectory.
    This instance variable is used to hold the trajectory that I am a member of."

trajectory _ anSLTrajectory! !

!SLColorSample methodsFor: 'independent variable access'!

addVariable: aString
    "add a new variable named aString to my dictionary of independent variables"

(self independentVariables includesKey: aString)
    ifTrue:[self inform:
'I already have an independent
variable named ''', aString,'''.'. ^nil].
self independentVariables at: aString put:''_!
addVariable: aString value: aValue
    "add a new variable named aString to my dictionary of independent variables"

(self independentVariables includesKey: aString)
    ifTrue:[self inform:

'I already have an independent
variable named ''', aString,'''.'. ^nil].

self independentVariables at: aString put: aValue.!

atVariable: aString
    "return the vlaue of my variable named aString"

(self independentVariables includesKey: aString)
    ifFalse:[self inform:
'I don''t have an independent
variable named ''', aString,'''.'. ^nil].

^self independentVariables at: aString!

atVariable: aString put: aValue
    "change the value of my variable named aString to aValue"

(self independentVariables includesKey: aString)
    ifFalse:[self inform:
'I don''t have an independent
variable named ''', aString,'''.'. ^nil].

self independentVariables at: aString put:aValue.!

atVariableIfPresent: aString
    "return the vlaue of my variable named aString"

(self independentVariables includesKey: aString)
    ifFalse:[ ^nil].

^self independentVariables at: aString!

removeVariable: aString
    "remove a variable named aString from my dictionary of independent variables"

(self independentVariables includesKey: aString)
    ifFalse:[self inform:
'I don''t have an independent
variable named ''', aString,'''.'. ^nil].

```smalltalk
self independentVariables removeKey: aString!

valueStringAtVariable: aString
    "return the variable aString's value with the units"

^(self atVariable: aString) printString,' ', (self trajectory unitsFor:
aString)!

variableNames
    "return a collection of the names of my variables"

^self independentVariables keys asOrderedCollection! !

!SLColorSample methodsFor: 'browsing'!

browse
    "open a browser on me"

SLColorSampleBrowser openOn: self! !

!SLColorSample methodsFor: 'printing'!

variableString

"return a string with the valueString of the first variable"

^self valueStringAtVariable: self trajectory variableDefinitions first
name! !

SLObject subclass: #SLCExperiment
    instanceVariableNames: 'trajectory coefficients '
    classVariableNames: ''
    poolDictionaries: ''
    category: 'SeeLab Data'!
SLCExperiment comment:
'This class holds an experiment.  It contains a trajectory of class
SLTrajectory and coefficients of fit (generated from a SAS analysis on
the mainframe) that will be used in generating interpolated values.  The
trajectory contains data points of color measurement corresponding to a
number of independent variables taking on a particular value.

trajectory : class SLTrajectory
``` coefficients : class OrderedCollection

This class will be the browsed model for SLCExperimentGridBrowser as way of flying through the color space of the fit experiment.'!

!SLCExperiment methodsFor: 'building'!

buildFromExcelTextFile: aFileName
    "builds an experiment from an ExcelTextStream. It first builds the trajectory
    and then the coefficient OrderedCollections from the Stream."

| inName directory localName traj textStream |
    inName _ aFileName.
    directory _ FileDirectory directoryFromName: inName
        setFileName: [:localNamex | localName _ localNamex].
    (directory isLegalFileName: localName)
        ifTrue:
            [self trajectory: SLTrajectory new.
            textStream _ ExcelTextStream oldFileNamed: inName.
            trajectory buildAnExtendedTrajectoryFrom: textStream.
            self coefficientsFromExcelText: textStream]!

coefficientsFromExcelText: aTextStream
    "builds the ordered collection of the coefficients of the experiment from
    aTextStream that has already been opened and digrested for its trajectory.
    . This expects (n*n + 3*n + 2)/2 coefficients of fit for each of the color values."

| n expectedNumber actualNumber thisCo |
    n _ trajectory variableDefinitions size.
    expectedNumber _ ((n * n) + (3 * n) + 2) / 2.
    self coefficients: (OrderedCollection new: 3).
    1 to: 3 do: [:i | coefficients add: (OrderedCollection new: expectedNumber)].
    actualNumber _ 0.

```
[thisCo _ aTextStream nextStream contents asString.
(thisCo sameAs: '...')
        | aTextStream atEnd]
    whileFalse:
            [actualNumber _ actualNumber + 1.
            (coefficients at: 1)
                add: thisCo asNumber.
            (coefficients at: 2)
                add: aTextStream nextNumber.
            (coefficients at: 3)
                add: aTextStream nextNumber.
            aTextStream getToEndOfRow].
    actualNumber = expectedNumber ifFalse: [self error: 'Coefficient
count error!!!!!!']! !

!SLCExperiment methodsFor: 'coefficient access'!
coefficientIndexFor: aNumber by: anotherNumber
"This routine calculates the index of the xecond order term of the
regression equation involving the two parameters provided.  Index
swapping is provided if the first parameter is larger than the second
although this should not normally be the case."

| nVars lo hi temp |
    nVars _ self trajectory variableDefinitions size.
    aNumber = anotherNumber ifTrue: [^nVars + 1 + aNumber].
    lo _ aNumber.
    hi _ anotherNumber.
    lo > hi
        ifTrue:
            [temp _ lo.
            lo _ hi.
            hi _ temp].
    temp _ 0.
    1 to: lo do: [:n | temp _ temp + (nVars - n + 1)].
    temp _ temp + nVars + 1 + hi - lo.
    ^temp! !

!SLCExperiment methodsFor: 'accessing'!

coefficients
```

"return the value of coefficients.

For a description of this instance variable, see the comment in the accessing method 'coefficients:'."

coefficients isNil ifTrue: [self error:'Coefficients must come form Experiment Build'].
^coefficients!

coefficients: anOrderedCollection

"set the value of coefficients.

anOrderedCollection is expected to be of the class OrderedCollection.

This instance variable is used to hold the coefficients of the fit equation of the design for values 1, 2 & 3 of the color triplet space of the trajectory. Element

1 is for value 1, #2 for value 2 and #3 for value 3, each of which is an

OrderedCollection of its own."

coefficients _ anOrderedCollection!

coefficientsFor: anInteger

"return the coefficients for a values regression"

"Element #1 is for value 1, #2 for value 2 and #3 for value 3, each of which is an OrderedCollection of its own."

^coefficients at: anInteger!

coefficientsFor: anInteger put: anOrderedCollection

"set the value of coefficients for a values regression"

"aParameter is expected to be of the class OrderedCollection.

Element #1 is for value 1, #2 for value 2 and #3 for value 3, each of which is an OrderedCollection of its own."

coefficients at: anInteger put: anOrderedCollection!

trajectory
    "return the value of trajectory.
    For a description of this instance variable, see the comment
    in the accessing method 'trajectory:'.
    We default on nil to building a trajectory from an Excel text
format file."

trajectory isNil ifTrue: [self error: 'Trajectory must come from
Experiment Build'].
    ^trajectory! !

trajectory: aParameter
    "set the value of trajectory.
    aParameter is expected to be of the class aClass.
    This instance variable is used to <explanation>."

trajectory _ aParameter! !

!SLCExperiment methodsFor: 'independent variable access'!

atVariable: aString
    "return the vlaue of my variable named aString"

(self trajectory independentVariables includesKey: aString)
    ifFalse:[self inform:
'I don''t have an independent
variable named ''', aString,'''.'. ^nil].

^self trajectory independentVariables at: aString!

valueStringAtVariable: aString
    "return the variable aString's value with the units"

^(self atVariable: aString) printString,' ', (self trajectory unitsFor:
aString)! !

!SLCExperiment methodsFor: 'releasing'!

release
    trajectory release.
    trajectory _ nil.

```
       coefficients _ nil.
       super release.! !
"-- -- -- -- -- -- -- -- -- -- -- -- -- -- -- -- -- "!

SLCExperiment class
       instanceVariableNames: ''!

!SLCExperiment class methodsFor: 'building'!

fromUserExcelTextFile
       | inName directory localName exp |
       inName _ FillInTheBlank request:'File name, please.'.
       directory _ FileDirectory directoryFromName: inName setFileName:
[:localNamex | localName _ localNamex].
       (directory isLegalFileName: localName)
              ifTrue:
                     [ exp _ super new.
exp buildFromExcelTextFile: (ExcelTextStream oldFileNamed: inName)]!

fromUserExcelTextFile: aFileName
       | inName directory localName exp |
       inName _ aFileName.
       directory _ FileDirectory directoryFromName: inName setFileName:
[:localNamex | localName _ localNamex].
       (directory isLegalFileName: localName)
              ifTrue:
                     [ exp _ self new.
exp buildFromExcelTextFile: inName].
^exp! !
SLObject subclass: #SLCSimpleRegression
       instanceVariableNames: 'experiment varCount '
       classVariableNames: ''
       poolDictionaries: ''
       category: 'SeeLab Data'!

!SLCSimpleRegression methodsFor: 'trajectory accessing'!

colorSpace
```

^self experiment trajectory colorSpace!

description

^self experiment trajectory description!

name

^self experiment trajectory name!

variableCount
    varCount isNil ifTrue: [varCount _ self experiment trajectory variableDefinitions size].
    ^varCount! !

!SLCSimpleRegression methodsFor: 'color calculating'!

calculateTripletFor: anOrderedCollection
    "This returns a SLColorTriplet subclass of the proper class for the experiment
    from the independent variable values present in anOrderedCollection."
    | tripletClass newTriplet |
    tripletClass _ SLColorTriplet allSubclasses detect: [:each | each new colorSpace = self experiment trajectory colorSpace]
                        ifNone:
                            [self inform: 'Color sample space does not exist'.
                            ^nil].
    newTriplet _ tripletClass new.
    newTriplet value1: (self calculateValue: 1 using: anOrderedCollection).
    newTriplet value2: (self calculateValue: 2 using: anOrderedCollection).
    newTriplet value3: (self calculateValue: 3 using: anOrderedCollection).
    ^newTriplet!

calculateValue: aNumber using: dataValues
    "aNumber is the regression equation to use related to a color triplet value.

dataValues is expected to be an OrderedCollection of numbers."

"start with intercept. calculate linear terms. calculate 2nd order terms."

| coefs temp | coefs _ self experiment coefficientsFor: aNumber.

"this returns an OrderedCollection"

"The zeroth order term"

temp _ coefs at: 1.

"The linear terms"

1 to: self variableCount do: [:n | temp _ temp + ((coefs at: n + 1)

* (dataValues at: n))].

"The pure second order terms"

1 to: self variableCount do: [:n | temp _ temp + ((coefs at: self variableCount + n + 1)

* (dataValues at: n) * (dataValues at: n))].

"The mixed terms"

1 to: (self variableCount - 1) do: [:n | (n+1) to: self variableCount do: [:m|

"What coefficient index do I use?"

temp _ temp + ((coefs at: (self experiment coefficientIndexFor: n by: m))

* (dataValues at: n) * (dataValues at: m))]].

^ temp!

convertValue: aValue of: anIndex

"This is generalized conversion routine that will use the appropriate formula for the type of conversion required."

| v temp | aValue isNil ifTrue: [^nil].

anIndex > self variableCount ifTrue:

[self error: 'That variable doesn not exist to CONVERT!!'.

```
                    ^nil].
    v _ self experiment trajectory variableDefinitions at: anIndex.
    v units = 'ratio'
            ifTrue:
                    [temp _ self ratioConvertValue: aValue of: anIndex.
                    ^temp].
    temp _ self normalizeValue: aValue of: anIndex.
    ^temp!
``` normalizeValue: aValue of: anIndex

"This routine normalizes an input value using the center and range values for the independent variable at index anIndex. Returns nil for bad input."

```
    | v val calc |
    anIndex > self variableCount
            ifTrue:
                    [self error: 'That variable doesn not exist to
NORMALIZE!!'.
                    ^nil].
    v _ self experiment trajectory variableDefinitions at: anIndex.
    "v is an ExtendedVariableDefinition now."
    val _ aValue.
    val < v min
            ifTrue: [val _ v min]
            ifFalse: [val > v max ifTrue: [val _ v max]].
    calc _ val - v center / v range.
    ^calc!
``` ratioConvertValue: aValue of: anIndex

"This routine normalizes an input value using the center and range values for the independent variable at index anIndex. Returns nil for bad input.

This is slightly different than a straight normalize. It is used to convert an input ratio to a coded (-1,0,1) value used for regressed value calculation."

```
    | v val calc inv |
```

```
    anIndex > self variableCount
        ifTrue:
            [self error: 'That variable does not exist to RATIO
CONVERT!!'.
            ^nil].
    v _ self experiment trajectory variableDefinitions at: anIndex.
    "v is an ExtendedVariableDefinition now."
    val _ aValue.
    val < v min
        ifTrue: [val _ v min]
        ifFalse: [val > v max ifTrue: [val _ v max]].
    val = 0 ifTrue: [inv _ 999999999]ifFalse:[inv _ 1/val].
    calc _ ((1/(1+inv) - v center) / v range).
    ^calc! !

!SLCSimpleRegression methodsFor: 'accessing'!

experiment
    "return the value of experiment.
    For a description of this instance variable, see the comment
    in the accessing method 'experiment:'."

^experiment!

experiment: aParameter
    "set the value of experiment.
    aParameter is expected to be of the class aClass.
    This instance variable is used to <explanation>."

experiment _ aParameter!

varCount
    "return the value of varCount.
    For a description of this instance variable, see the comment
    in the accessing method 'varCount:'."

^varCount!

varCount: aParameter
```

"set the value of varCount.

aParameter is expected to be of the class aClass.

This instance variable is used to <explanation>."
varCount _ aParameter! !
"-- -- -- -- -- -- -- -- -- -- -- -- -- -- -- -- -- -- "!

SLCSimpleRegression class
    instanceVariableNames: ''!

!SLCSimpleRegression class methodsFor: 'instance creation'!

on: anExperiment
    | sr |
    sr _ self new.
    sr experiment: anExperiment.
    ^sr! !

!SLCSimpleRegression class methodsFor: 'testing'!

test1
"Select this and say Print It within an inspector on an experiment"

| v ret |
ret _ OrderedCollection new.
v _ OrderedCollection new.
v add: (self convertValue: 40 of: 1).
v add: (self convertValue: 50 of: 2).
v add: (self convertValue: 0 of: 3).
v add: (self convertValue: 50 of: 4).
v add: (self convertValue: 2.5 of: 5).
1 to: 3 do:[:n| ret add: (self calculateValue: n using: v)].
^ret!

test2
"copy this into an inspector on a regression and inspect it."
    | v ret |
ret _ OrderedCollection new.
  v _ OrderedCollection new.
  v add: (self convertValue: 40 of: 1).
  v add: (self convertValue: 50 of: 2).

```
v add: (self convertValue: 0 of: 3).
v add: (self convertValue: 50 of: 4).
v add: (self convertValue: 2.5 of: 5).
ret _ self calculateTripletFor: v.
^ret! !

SLObject subclass: #SLColorTriplet
    instanceVariableNames: 'value1 value2 value3 '
    classVariableNames: ''
    poolDictionaries: ''
    category: 'SeeLab Data'!

!SLColorTriplet methodsFor: 'color space accessing'!

colorSpace
    "return a symbol denoting my color space"

self subclassResponsibility! !

!SLColorTriplet methodsFor: 'accessing'!

value1
    "return the value of value1.
    For a description of this instance variable, see the comment
    in the accessing method 'value1:'."

value1 isNil ifTrue: [self value1: 0.0].
    ^value1!

value1: aNumber
    "set the value of value1.
    aNumber is expected to be of the subclass of Number.
    This instance variable is used to hold value 1 of the triplet."

value1 _ aNumber.
    self changed: #value1!

value2
    "return the value of value2.
``` asCIELAB

"return a new color triplet converted to CIELAB"

self subclassResponsibility!

asCIELUV

For a description of this instance variable, see the comment
    in the accessing method 'value2:'."
value2 isNil ifTrue:[self value2: 0.0].
^value2!

value2: aNumber

"set the value of value2.
    aNumber is expected to be of the subclass of Number.
    This instance variable is used to hold value 2 of the triplet."

value2 _ aNumber.
self changed: #value2!

value3

"return the value of value3.
    For a description of this instance variable, see the comment
    in the accessing method 'value3:'."
value3 isNil ifTrue:[self value3: 0.0].
^value3!

value3: aNumber

"set the value of value3.
    aNumber is expected to be of the subclass of Number.
    This instance variable is used to hold value 3 of the triplet."

value3 _ aNumber.
self changed: #value3! !

!SLColorTriplet methodsFor: 'conversion'!

asCIEFMCII

"return a new color triplet converted to CIEFMCII"

self subclassResponsibility!

"return a new color triplet converted to CIELUV"

self subclassResponsibility!

asLabHunter

"return a new color triplet converted to Lab"

self subclassResponsibility!

asRGBGuns

"return a new color triplet converted to RGB"

self subclassResponsibility!

asXYZ

"return a new color triplet converted to XYZ"

self subclassResponsibility!

asYxy

"return a new color triplet converted to Yxy"

self subclassResponsibility! !

!SLColorTriplet methodsFor: 'value range accessing'!

value1Range

"return the range for value 1"

self subclassResponsibility!

value2Range

"return the range for value 2"

self subclassResponsibility!

value3Range

"return the range for value 3"

self subclassResponsibility! !

!SLColorTriplet methodsFor: 'browsing'!

browse
       "open a browser on me"

SLColorTripletBrowser openOn: self! !

!SLColorTriplet methodsFor: 'testing'!

producable self subclassResponsibility! !

SLObject subclass: #SLVariableDefinition
       instanceVariableNames: 'name units defaultValue '
       classVariableNames: ''
       poolDictionaries: ''
       category: 'SeeLab Data'!

!SLVariableDefinition methodsFor: 'accessing'!

defaultValue
       "return the value of defaultValue.
       For a description of this instance variable, see the comment
       in the accessing method 'defaultValue:'."
defaultValue isNil ifTrue:[self defaultValue: 0].
^defaultValue!

defaultValue: aNumber
       "set the value of defaultValue.
       aNumber is expected to be a subclass of the class Number.
       This instance variable is used to hold the default value for a
variable defined by me."

defaultValue _ aNumber!

name
       "return the value of name.
       For a description of this instance variable, see the comment
       in the accessing method 'name:'."

```smalltalk
name isNil ifTrue:[self name: 'not defined yet'].
^name!

name: aString
    "set the value of name.
    aString is expected to be of the class String.
    This instance variable is used to hold the name of this variable."

name _ aString!

units
    "return the value of units.
    For a description of this instance variable, see the comment
    in the accessing method 'units:'."
units isNil ifTrue:[self units: 'not defined yet'].
^units!

units: aString
    "set the value of units.
    aString is expected to be of the class String.
    This instance variable is used to hold a string naming the units
for this variable."

units _ aString! !
"-- -- -- -- -- -- -- -- -- -- -- -- -- -- -- -- -- -- "!

SLVariableDefinition class
    instanceVariableNames: ''!

!SLVariableDefinition class methodsFor: 'instance creation'!

fromUser
    | string answer nameString unitsString defaultValue |
    "create and return a new instance of me based on the user's input"

[string _ FillInTheBlank request:'Enter the name for the variable:'.
    string = ''] whileTrue:[answer _ self confirm:'Bad Input!!!!!!
Do you want to try again?'.
    answer ifFalse:[self inform:
'Operation Aborted!!'. ^nil]].
``` nameString _ string.

[string _ FillInTheBlank request:'Enter the units for the variable:'.
string = ''] whileTrue:[answer _ self confirm:'Bad Input!!!!!!
Do you want to try again?'.
answer ifFalse:[self inform:
'Operation Aborted!!'. ^nil]].

unitsString _ string.

[string _ FillInTheBlank request:'Enter the default value for the
variable:'.
string = ''] whileTrue:[answer _ self confirm:'Bad Input!!!!!!
Do you want to try again?'.
answer ifFalse:[self inform:
'Operation Aborted!!'. ^nil]].

defaultValue _ Compiler evaluate: string.

^self name: nameString units: unitsString defaultValue: defaultValue!

name: nameString units: unitsString defaultValue: aNumber
    | slvd |
    "create and return a new instance of me"

slvd _ self new.
slvd name: nameString.
slvd units: unitsString.
slvd defaultValue: aNumber.
^slvd! !

SLVariableDefinition subclass: #SLCExtendedVariableDefinition
    instanceVariableNames: 'type center range min max xStar
currentValue '
    classVariableNames: ''
    poolDictionaries: ''
    category: 'SeeLab Data'!
SLCExtendedVariableDefinition comment:
'This class extends the SLVariable definition for use with the SAS x*
definition of :

x* = (x-c)/r.

This is used with the coefficients of the equation of fit to generate a multidimensionally fit color triplet coordinate, one for each.

For speed, x* is stored internally as xStar. Any change in x,c, or r value invokes a recomputation of xStar.'!

!SLCExtendedVariableDefinition methodsFor: 'accessing'!

center
    "return the value of center.
    For a description of this instance variable, see the comment
    in the accessing method 'center:'."

^center!

center: aParameter
    "set the value of center.
    aParameter is expected to be of a class convertable to Float.
    This instance variable is used to compute xStar".

center _ aParameter asNumber asFloat.

currentValue isNil | center isNil
        ifFalse:
            [self xStarSet].
    ^center!

currentValue
    "return the value of currentValue.
    For a description of this instance variable, see the comment
    in the accessing method 'currentValue:'."

^currentValue!

currentValue: aParameter
    "set the value of currentValue.
    aParameter is expected to be of a class convertable to Float.

This instance variable is used generate color values for the equations"

```
    currentValue _ aParameter asFloat.
    self xStarSet.
    ^xStar!
``` max

"return the value of max.
For a description of this instance variable, see the comment
in the accessing method 'max:'."

```
    ^max!
``` max: aParameter

"set the value of max.
aParameter is expected to be of a class convertable to Float.
This instance variable is used to set up the browser an gauges"

```
    max _ aParameter asNumber asFloat!
``` min

"return the value of min.
For a description of this instance variable, see the comment
in the accessing method 'min:'."

```
    ^min!
``` min: aParameter

"set the value of min.
aParameter is expected to be of a class convertable to Float.
This instance variable is used to set up the browser an gauges"

```
    min _ aParameter asNumber asFloat!
``` range

"return the value of range.
For a description of this instance variable, see the comment
in the accessing method 'range:'."

```
    ^range!
``` range: aValue
    | temp |
    "set the value of range.
    aValue is expected to be of a class convertable to Float.
    This instance variable is used to compute xStar"

temp _ aValue asNumber asFloat.
    temp = 0
        ifTrue:
            [self error: 'range cannot be zero!!'.
            ^nil].
    range _ temp.
    currentValue isNil | center isNil
        ifTrue: [^nil]
        ifFalse:
            [self xStarSet.
            ^xStar]!

xStar
    "return the value of xStar.
    For a description of this instance variable, see the comment
    in the accessing method 'xStar:'."

^xStar!

xStar: aParameter
    "Cannot be done. This just holds values computed from
currentValue, center and
    range "

self error: 'xStar cannot be set directly!!'.
    ^nil!

xStarSet
    range = 0
        ifTrue:
            [self error: 'range cannot be zero!!'.
            ^nil].
    range isNil | center isNil | currentValue isNil
        ifTrue:

```
                [self error: 'X Star cannot be Computed!!'.
                ^nil]
            ifFalse: [xStar _ (currentValue - center) / range].
    ^xStar! !

!SLCExtendedVariableDefinition methodsFor: 'releasing'!

release
        type _ nil.
        center _ nil.
        range _ nil.
        min _ nil.
        max _ nil.
        xStar _ nil.
        super release! !
"-- -- -- -- -- -- -- -- -- -- -- -- -- -- -- -- -- -- "!

SLCExtendedVariableDefinition class
        instanceVariableNames: ''!

!SLCExtendedVariableDefinition class methodsFor: 'instance creation'!

fromUser
        | string answer nameString unitsString defaultValue centerValue
rangeValue minValue maxValue |
        "create and return a new instance of me based on the user's input"

[string _ FillInTheBlank request:'Enter the name for the variable:'.
string = ''] whileTrue:[answer _ self confirm:'Bad Input!!!!!!
Do you want to try again?'.
answer ifFalse:[self inform:
'Operation Aborted!!'. ^nil]].
nameString _ string.

[string _ FillInTheBlank request:'Enter the units for the variable:'.
string = ''] whileTrue:[answer _ self confirm:'Bad Input!!!!!!
Do you want to try again?'.
answer ifFalse:[self inform:
'Operation Aborted!!'. ^nil]].

unitsString _ string.
```

[string _ FillInTheBlank request:'Enter the default value for the variable:'.

string = ''] whileTrue:[answer _ self confirm:'Bad Input!!!!!!
Do you want to try again?'.

answer ifFalse:[self inform:
'Operation Aborted!!'. ^nil]].

defaultValue _ Compiler evaluate: string.

[string _ FillInTheBlank request:'Enter the center value for the variable:'.

string = ''] whileTrue:[answer _ self confirm:'Bad Input!!!!!!
Do you want to try again?'.

answer ifFalse:[self inform:
'Operation Aborted!!'. ^nil]].

centerValue _ Compiler evaluate: string.

[string _ FillInTheBlank request:'Enter the default value for the variable:'.

string = ''] whileTrue:[answer _ self confirm:'Bad Input!!!!!!
Do you want to try again?'.

answer ifFalse:[self inform:
'Operation Aborted!!'. ^nil]].

rangeValue _ Compiler evaluate: string.

[string _ FillInTheBlank request:'Enter the default value for the variable:'.

string = ''] whileTrue:[answer _ self confirm:'Bad Input!!!!!!
Do you want to try again?'.

answer ifFalse:[self inform:
'Operation Aborted!!'. ^nil]].

minValue _ Compiler evaluate: string.

[string _ FillInTheBlank request:'Enter the default value for the variable:'.

string = ''] whileTrue:[answer _ self confirm:'Bad Input!!!!!!
Do you want to try again?'.

answer ifFalse:[self inform:
'Operation Aborted!!'. ^nil]].

maxValue _ Compiler evaluate: string.

```
^self name: nameString units: unitsString defaultValue: defaultValue
center: centerValue range: rangeValue min: minValue max: maxValue!

name: nameString units: unitsString defaultValue: aNumber center:
secondNumber range: rangeNumber min: minNumber max: maxNumber
      "create and return a new instance of me"

| slcevd |
    slcevd _ self new.
    slcevd name: nameString.
    slcevd units: unitsString.
    slcevd defaultValue: aNumber.
    slcevd center: secondNumber.
    slcevd range: rangeNumber.
    slcevd min: minNumber.
    slcevd max: maxNumber.
    ^slcevd! !
```

Below is the listing for file 'ExcelTextStream.st' in standard
fileIn/fileOut format:

```
FileStream subclass: #ExcelTextStream
      instanceVariableNames: 'endOfRow endOfSheet row column
currentObject '
      classVariableNames: ''
      poolDictionaries: ''
      category: 'User Interface Tools'!
ExcelTextStream comment:
'I am a Stream over a File saved under Excel as a Text file. I allow
reading of my cells only at this time although I hope to grow into a
full-fledged I/O information pipe for my Smalltalk station users.'!

!ExcelTextStream methodsFor: 'element accessing'!

acquireMultiLineText
       "This returns a String that is obtained by reading from the
current cell down a
       column of cells until a cell ending in three periods. A string is
returned. This
       method will eat an entire spreadsheet column however so make sure
``` the last
          one of the set you desire DOES END with three periods."

| outString aLine |
        outString _ ''.
        aLine _ self nextCellAsStringOfMax: 75.
        [ExcelTextStream threeDotQuery: aLine]
                whileFalse:
                        [self getToEndOfRow.
                        outString _ outString , aLine.
                        ((outString at: (outString size)) = ' ')
                                ifFalse: [outString _ outString , ' '].
                        aLine _ self nextCellAsStringOfMax: 75].
        outString _ outString , aLine.
        self getToEndOfRow.
        self currentObject: outString!

getToEndOfRow
        | currentChar tempEndRow newRow |
        endOfRow
                ifFalse:
                        [currentChar _ self next.
                        tempEndRow _ self endOfRow.
                        [currentChar = Character cr | self atEnd]
                                whileFalse: [currentChar _ self next].
                        endOfSheet _ self atEnd.
                        endOfRow _ currentChar = Character cr | endOfSheet.
                        newRow _ tempEndRow & endOfSheet not.
                        newRow
                                ifTrue:
                                        [self column: 1.
                                        self row: self row + 1]
                                ifFalse: [self column: self column + 1].
                        self currentObject: nil]!

nextCellAsString
        "Returns the next characters up to a VT or CR as a String.
        Maximum length determined by default length described in
nextStream."

```
| newString outStream |
outStream _ self nextStream.
newString _ outStream contents asString.
self currentObject: newString.
^newString!

nextCellAsStringOfMax: anInteger
    "Returns the next characters up to a VT or CR as a String."

| newString outStream |
    outStream _ self nextStreamOfMax: anInteger.
    newString _ outStream contents asString.
    self currentObject: newString.
    ^newString!
nextNumber
    "Returns the next characters up to a VT or CR as a Float."

| newNumber outStream |
    outStream _ self nextStream.
    newNumber _ outStream contents asNumber.
    self currentObject: newNumber.
    ^newNumber!

nextStream
    "Returns the next characters up to a VT or CR as a Stream of 25
characters maximum."

| currentChar outStream tempEndRow newRow |
    outStream _ WriteStream on: (String new: 25).
    currentChar _ self next.
    tempEndRow _ self endOfRow.
    [(currentChar = Character tab | (currentChar = Character cr)    self
atEnd]
        whileFalse:
            [outStream nextPut: currentChar.
            currentChar _ self next].
    endOfSheet _ self atEnd.
    endOfRow _ currentChar = Character cr | endOfSheet.
    newRow _ tempEndRow & (endOfSheet not).
    (newRow)
        ifTrue:
```

```
                [self column: 1.
                self row: self row + 1]
            ifFalse: [self column: self column + 1].
    self currentObject: outStream.
    ^outStream!

nextStreamOfMax: anInteger

"Returns the next characters up to a VT or CR as a Stream of
anInteger characters maximum."

| currentChar outStream tempEndRow newRow |
    outStream _ WriteStream on: (String new: anInteger).
    currentChar _ self next.
    tempEndRow _ self endOfRow.
    [(currentChar = Character tab | (currentChar = Character cr) | self
atEnd]
            whileFalse:
                [outStream nextPut: currentChar.
                currentChar _ self next].
    endOfSheet _ self atEnd.
    endOfRow _ currentChar = Character cr | endOfSheet.
    newRow _ tempEndRow & (endOfSheet not).
    (newRow)
        ifTrue:
            [self column: 1.
            self row: self row + 1]
        ifFalse: [self column: self column + 1].
    self currentObject: outStream.
    ^outStream!

reset self row: nil.
    self column: nil.
    self endOfRow: nil.
    self endOfSheet: nil.
    super reset! !

!ExcelTextStream methodsFor: 'accessing--private'!

column: anInteger
```

"set the value of column.

anInteger is expected to be of the class LargePositiveInteger.

This instance variable is used to keep track of where we are in the sheet."

column _ anInteger!

currentObject
    ^currentObject!

currentObject: anObject
currentObject _ anObject!

endOfRow: aBoolean
    "set the value of endOfRow.
    aBoolean is expected to be of the class Boolean.
    This instance variable access is used to to indicate to the current put operation on the LotusStream is of the last element of the current row. A subsequent put will start a new row."

endOfRow _ aBoolean!

endOfSheet: aBoolean
    "set the value of endOfSheet.
    aBoolean is expected to be of the class Boolean.
    This instance variable access is used to to indicate to the current put operation on the LotusStream is of the last element of the current sheet. No subsequent put will be possible."

endOfSheet _ aBoolean!
row: anInteger
    "set the value of row.
    anInteger is expected to be of the class Integer.
    This instance variable is used to indicate where in the sheet we are.
    This setting method will position the sheet to the proper row. It will return an error if the sheet does not contain that row. The column will be set to the value of the instance variable."

row _ anInteger.! !

!ExcelTextStream methodsFor: 'position assessment'!

column
    | tempRow |
    "return the value of column.
    For a description of this instance variable, see the comment
    in the accessing method 'column:'."

column isNil
        ifTrue:
            [column _ LargePositiveInteger new.
            column _ 0].
    "Drive initialization of row value."
    tempRow _ self row.
    ^column!

endOfRow
    "return the value of endOfRow.
    It is a Boolean true if the last accessing operation returned the
last  element of the row of the sheet."

endOfRow isNil
        ifTrue:
            [endOfRow _ false].
    ^endOfRow!

endOfSheet
    "return the value of endOfSheet.
    It is a Boolean true if the last accessing operation returned the
last  element of the sheet."

endOfSheet isNil
        ifTrue:
            [endOfSheet _ false].
    ^endOfSheet!

row
    "return the value of row.
    For a description of this instance variable, see the comment
    in the accessing method 'row:'."

```
    row isNil
        ifTrue:
            [row _ LargePositiveInteger new.
            row _ 1].
    ^row! !
"-- -- -- -- -- -- -- -- -- -- -- -- -- -- -- -- -- -- "!

ExcelTextStream class
    instanceVariableNames: ''!

!ExcelTextStream class methodsFor: 'element testing'!

threeDotQuery: aString
    | howLong theLastThree |
    "This method tests to see if aString, the parameter of the method, ends
with three periods.  Returns true if it does.  Returns false on nil."
    (aString isNil) ifTrue:[^false].
    howLong _ aString size.
    (howLong < 3)ifTrue:[^false].
    theLastThree _ aString copyFrom: (howLong - 2) to: howLong.
    ^(theLastThree = '...')! !
```

Below is the listing for file 'ColorFormView.st' in standard fileIn/fileOut format:

```
View subclass: #ColorFormView
    instanceVariableNames: 'dispForm extent '
    classVariableNames: ''
    poolDictionaries: ''
    category: 'Color-Example'!
ColorFormView comment:
'I am a view of a colored area that matches my insetDisplayBox.  I am
used with a ColorMapEditor as my model.  I change color when my models
color map index changes.
dispForm    <Form>  A   form to display color
extent          <Point> used in composing.'!

!ColorFormView methodsFor: 'displaying'!

display
```

```
self isUnlocked
        ifTrue: [self compose].
super display!

displayForm

ColorDevice new displayForm: dispForm onFrameBufferAt: self
insetDisplayBox origin!

displayView self displayForm! !
!ColorFormView methodsFor: 'updating'!

update: aParameter aParameter == #mapIndex
        ifTrue: [self setMapIndex.
                 self display]! !

!ColorFormView methodsFor: 'composing'!

compose
    "This creates the Form for the display, then sets the map index,
which really means sets each of the pixels to the mapIndex value."

(extent -= nil and: [extent = self insetDisplayBox extent])
        ifTrue: [^self].
    extent _ self insetDisplayBox extent.
    dispForm _ Form
        extent: (self insetDisplayBox width * ColorDevice
bitsPerPixel)
        @ (self insetDisplayBox height).
    self setMapIndex!

setMapIndex

| bits pat bitsPerPixel index|
    bitsPerPixel _ ColorDevice bitsPerPixel.
    index _ model mapIndex.
``` pat _ index.
    (16 // bitsPerPixel) - 1 timesRepeat: [pat _ (pat bitShift: bitsPerPixel) + index].
    bits _ dispForm bits.
    1 to: bits size do: [:i | bits at: i put: pat].! !

!ColorFormView methodsFor: 'accessing'!
    dispForm
    ^dispForm! !

Below is the listing for file 'Color-Interface.st' in standard fileIn/fileOut format:

Object subclass: #ColorDevice
    instanceVariableNames: ''
    classVariableNames: 'BitsPerPixel MaxGunValue MaxMapIndex '
    poolDictionaries: ''
    category: 'Color-Interface'!
ColorDevice comment:
'"I am an interface to the color display hardware. I can display a color form and change the color map."

This is the extent of the documentation for this portal to the display.

This class only has class variables. Thus the only use for instances of this class is to provide access to the value of these global variables and to the methods provided for instances and the class.

Object subclass: #ColorDevice
    instanceVariableNames: ''''
    classVariableNames: ''BitsPerPixel MaxGunValue MaxMapIndex ''
    poolDictionaries: ''''
    category: ''Color-Example''

BitsPerPixel is set at class initialization time to 8. This corresponds to the number of bits required to store the maxMapIndex value since the bitmap stores CLUT indices, not color values.
ColorDevice|initialize is the only sender of the bitsPerPixel: message. Its value is accessed by the ColorBarView| and ColorFormView|compose methods, ColorBarView|fillIn:inRectangle: and ColorFormView|setMapIndex. ColorDevice also accesses in displayMap and example class methods.

MaxGunValue is initialized to the value returned by ColorDevice class|getMaxGunValue which invokes a primitive. Its only other use is the accessing method ColorDevice class|maxGunValue. No setting is possible which is understandable since this is a hardware-dependent value.

MaxMapIndex is initialized to 255 in ColorDevice|initialize, the only place it is set. It is used in ColorMapEditor to determine the size of its colorMapTable instance variable. It is generally accesed when a loop is performed to fill something (like the colorMapTable) with values and that loop requires an upper index.

CLUT access is provided (output or setting only) by the setColorMapEntry:... method. The primitive-referencing method referenced in it is wrong. You basically provide three gun values between 0 and the value provided by maxGunValue method of an instance of ColorDevice. This illustrates the usual sequence of access, instantiating a ColorDevice, sending it all the displayForm:, maxGunValue and setColorMapEntry: messages you want to. The ColorDevice class also has maxGunValue, bitsPerPixel and maxMapIndex accessing methods although I would not use them. Tampering with the values of the class variables beyond initialization would not be wise.'!

!ColorDevice methodsFor: 'primitives'!

displayForm: aForm onFrameBufferAt: aPoint
    "Display aForm on the frame buffer at aPoint."

^self displayForm: aForm onFrameBufferAt: aPoint bitsPerPixel:
BitsPerPixel!

displayForm: aForm onFrameBufferAt: aPoint bitsPerPixel: anInteger
    "Display aForm on the frame buffer at aPoint."

"aForm is of class Form but it is bitsPerPixel thick. The way that that is
        encoded is sequentially in bitsPerPixel bits for each pixel in the bitmap of the
        Form. The value supplied as aPoint is in screen pixels, not disturbed by the
    number of bitsPerPixel.  bitsPerPixel, I'm sure, is used to dissect the WordArray
    bitmap into the appropriate chunks before stuffing the framebuffer."

<primitive: 245>
    ^nil!

maxGunValue
    "return the maximum color gun value."

"This is used to determine what the maximum value supplied in the setColorMapEntry:... method    for the three colors in the CLUT can be. For the SuperMac Spectrum, this returns 65535."

<primitive: 247>
    self primitiveFailed!

primativeSetColorMapEntry: anInteger toRedValue: red greenValue: green blueValue: blue
    "Set the color map index for anInteger to the given red green and blue values.
    Create a notifier if any of the values is out of range.  Answer nil if the index
    is not valid on the current system."

<primitive: 246>
    (red < 0 or: (green < 0 or: (blue < 0])) ifTrue: [^self primitiveFailed].
    (red > self maxGunValue or: (green > self maxGunValue or: (blue > self maxGunValue]])
            ifTrue: [^self primitiveFailed].
    "values are ok, since the primitive failed it must be because the index is invalid"
    ^nil!

setColorMapEntry: anInteger toRedValue: red greenValue: green blueValue: blue
    | myInteger redT blueT greenT |

"Set the CLUT entry at anInteger to the given red green and blue values.

Create a notifier if any of the values is out of range. Answer nil if the index is not valid on the current system."

"Patch supplied by Beckmann since the primitive accesses the map backward (at least as read by this category's other methods and the KLUTZ and Control Panel desk accessories."

"Tests also supplied by Beckmann since the primitive does not work if red green and blue are not of class Integer; it produces no error and does not change the CLUT. If the objects set for red green and blue do not understand asInteger conversion, NOW an error will result."

```
myInteger _ (255 - anInteger) asInteger.
"myInteger _ anInteger."
redT _ red asInteger.
blueT _ blue asInteger.
greenT _ green asInteger.
self primativeSetColorMapEntry: myInteger toRedValue: redT
greenValue: greenT blueValue: blueT! !
"-- -- -- -- -- -- -- -- -- -- -- -- -- -- -- -- -- -- "!
```

ColorDevice class
    instanceVariableNames: ''!
!ColorDevice class methodsFor: 'class initialization'!

initialize

"Initialize class variables."

"ColorDevice initialize"
    self bitsPerPixel: 8.
    MaxGunValue _ self getMaxGunValue.
    self maxMapIndex: 255.! !

!ColorDevice class methodsFor: 'accessing'!

bitsPerPixel

^BitsPerPixel!

bitsPerPixel: anInteger

"Sent only by ColorDevice class initialize"

BitsPerPixel _ anInteger!

maxGunValue

^MaxGunValue!

maxMapIndex

^MaxMapIndex!

maxMapIndex: anInteger

"Sent only by ColorDevice class initialize"

MaxMapIndex _ anInteger! !

!ColorDevice class methodsFor: 'examples'!

displayMap

"Draw current ColorMap DIRECTLY onto the display"
"ColorDevice displayMap"
!form ba x y rand val bb cd bitsPerPixel maxMapIndex row !
cd _ ColorDevice new.
bitsPerPixel _ ColorDevice bitsPerPixel.
maxMapIndex _ ColorDevice maxMapIndex+1.
row _ maxMapIndex sqrt truncated.
form _ Form extent: (16*bitsPerPixel) @ (16).
"Here, a ByteArray is used instead of a WordArray"
ba _ ByteArray new: (16*16*bitsPerPixel) // 8..
form extent: (16*bitsPerPixel) @ 16 offset: 0@0 bits: ba.
x _ 0.
1 to: row do: [: i |
    1 to: row do: [:j |
        ba atAllPut: x.
        x _ x+1.
        cd displayForm: form onFrameBufferAt: (i*16)@(j*16)]].!

example

"Draw colored lights on the display and make them change by changing the color map."

```
"ColorDevice example"
|form ba x y rand val bb cd bitsPerPixel maxMapIndexrow
    maxMapIndex row maxGunValue|
    maxGunValue _ self maxGunValue.
    cd _ self new.
    bitsPerPixel _ self bitsPerPixel.
    maxMapIndex _ self maxMapIndex+1.
    form _ Form extent: (16*bitsPerPixel) @ (16).
    row _ maxMapIndex sqrt truncated.
    ba _ ByteArray new: (16*16*bitsPerPixel) // 8.
    form extent: (16*bitsPerPixel) @ 16 offset: 0@0 bits: ba.
    x _ 0.
    1 to: row do: [: i |
    1 to: row do: [:j |
        ba atAllPut: x.
        x _ x+1.
        cd displayForm: form onFrameBufferAt: (i*16)@(j*16)]].
    rand _ Random new.
    bb _ [((rand next * maxGunValue + 0.5) rounded
                            min: maxGunValue -1) ].
[Sensor anyButtonPressed] whileFalse:
    [cd
        setColorMapEntry: (((rand next * maxMapIndex + 0.5) rounded
                            min: (maxMapIndex
- 2))
                                                        max:
5)
        toRedValue: bb value
        greenValue: bb value
        blueValue: bb value].
    bb _ nil! !

!ColorDevice class methodsFor: 'primitives'!

getMaxGunValue
    "Answer the largest possible value for each gun (red, green, blue)
for
    color map entries."
    "Sent only by ColorDeive class initialize"
    <primitive: 247>
```

"For systems without the primitive, answer 0"
^0! !

!ColorDevice class methodsFor: 'private'!

computeMaxMapIndex

"Nobody sends this message"
    | index max colorDevice value |
    colorDevice _ self new.
    index _ 0.
    max _ self maxGunValue.
    [value _ index even ifTrue: [max] ifFalse: [0].
    (colorDevice
            setColorMapEntry: index
            toRedValue: value
            greenValue: value
            blueValue: value) == nil]
        whileFalse: [index _ index + 1].
    ^index - 1! !

ColorDevice initialize!
View subclass: #SLCColoredBoxesView
    instanceVariableNames: 'cal device '
    classVariableNames: ''
    poolDictionaries: ''
    category: 'Color-Interface'!
SLCColoredBoxesView comment:
'This class is used in the Gauged Patch, three by three and N by N browsers'!

!SLCColoredBoxesView methodsFor: 'scheduling'!

buildAndAssembleForInsertion
    "build the subviews and arrange them in a view for insertion. 10 by 10 matrix"

```
| it |
it _ self
            buildAndAssembleForInsertionIndexBase: 10
            rows: 10
            columns: 10.
^it!
``` buildAndAssembleForInsertionIndexBase: baseInteger rows: rowInteger columns: columnInteger

```
| topView cd gray baseIndex rowMax columnMax boxWidth boxHeight
thisRow thisColumn thisIndex box |
    "build the subviews and arrange them in a view for insertion"

topView _ SLCColoredBoxesView new model: self.
    topView borderWidth: 1.

cd _ ColorDevice new.
    gray _ (cd maxGunValue) // 2.
    baseIndex _ baseInteger.
    rowMax _ rowInteger.
    columnMax _ columnInteger.
    boxWidth _ 1/columnMax.
    boxHeight _ 1/rowMax.

1 to: rowMax do: [:row|
    1 to: columnMax do: [:column |
    thisRow _ row -1.
    thisColumn _ column - 1.
    thisIndex _ baseIndex + thisColumn + (thisRow*columnMax).
    box _ SLCColoredRectangle new.
    box mapIndex: thisIndex.
    cd setColorMapEntry: thisIndex toRedValue: ((60000) asInteger)
greenValue: (60000-(thisIndex*500)) blueValue: (20000-(thisIndex*150)).
    topView addSubView: box in: (((thisColumn*boxWidth) @
(thisRow*boxHeight)) extent: (boxWidth @ boxHeight)) borderWidth: 0.
    ]].
^topView!
``` buildAndAssembleForInsertionUsing: anOrderedCollection IndexBase: baseInteger rows: rowInteger columns: columnInteger

```
| topView cd gray baseIndex rowMax columnMax boxWidth boxHeight
thisRow thisColumn thisIndex box tripletIndex thisTriplet |
    "build the subviews and arrange them in a view for insertion"

cal _ SLCColorCalibration new.
    topView _ SLCColoredBoxesView new model: self.
    topView borderWidth: 1.

cd _ ColorDevice new.
    gray _ (cd maxGunValue) // 2.
    baseIndex _ baseInteger.
    rowMax _ rowInteger.
    columnMax _ columnInteger.
    boxWidth _ 1/columnMax.
    boxHeight _ 1/rowMax.

1 to: rowMax do: [:row|
    1 to: columnMax do: [:column |
    thisRow _ row -1.
    thisColumn _ column - 1.
    thisIndex _ baseIndex + thisColumn + (thisRow*columnMax).
    tripletIndex _ thisIndex - baseIndex + 1.
    thisTriplet _ cal computeGunsFrom: (anOrderedCollection at:
tripletIndex).
    box _ SLCColoredRectangle new.
    box mapIndex: thisIndex.
    cd setColorMapEntry: thisIndex toRedValue: (thisTriplet value1)
greenValue: (thisTriplet value2) blueValue: (thisTriplet value3).
    topView addSubView: box in: (((thisColumn*boxWidth) @
(thisRow*boxHeight)) extent: (boxWidth @ boxHeight)) borderWidth: 0.
    ]].
^topView! !

!SLCColoredBoxesView methodsFor: 'box color accessing'!

changeBox: boxIndex to: aColorTriplet
    "self here is the BoxView"

| guns dev |
    guns _ self cal computeGunsFrom: aColorTriplet.
```

```
        dev _ self device.
        dev    setColorMapEntry: (self subViews at: boxIndex) mapIndex
            toRedValue: guns redGun
            greenValue: guns greenGun
            blueValue: guns blueGun! !
```

!SLCColoredBoxesView methodsFor: 'calibration access'!
cal cal isNil ifTrue:[cal _ SLCColorCalibration new.].
^cal!

device
device isNil ifTrue:[device _ ColorDevice new.].
^device! !

!SLCColoredBoxesView methodsFor: 'releasing'!

release
    cal _ nil.
    device _ nil.
    super release! !
"-- -- -- -- -- -- -- -- -- -- -- -- -- -- -- -- -- -- "!

SLCColoredBoxesView class
    instanceVariableNames: ''!

!SLCColoredBoxesView class methodsFor: 'instance creation'!

on: anOrderedCollection baseIndex: index rows: rowInteger columns: columnInteger
    | v boxView aView |
    v _ self new.
    boxView _ v
                buildAndAssembleForInsertionUsing:
anOrderedCollection
                IndexBase: index
                rows: rowInteger
                columns: columnInteger.

```
    aView _ View new.
    aView addSubView: boxView.
    ^aView!
openOn: anOrderedCollection baseIndex: index rows: rowInteger columns:
columnInteger
    | v boxView topView |
        v _ self new.
    boxView _ v
                    buildAndAssembleForInsertionUsing:
anOrderedCollection IndexBase: index
                    rows: rowInteger
                    columns: columnInteger.
    topView _ StandardSystemView
                    model: self
                    label: 'General'
                    minimumSize: 250 @ 250.
    topView cacheRefresh: false.
    topView borderWidth: 1.
    topView
        addSubView: boxView
        in: (0.1 @ 0.1 extent: 0.8 @ 0.8)
        borderWidth: 2.
    topView controller open! !

!SLCColoredBoxesView class methodsFor: 'examples'!

example
    "SLCColoredBoxesView example"

| v topView boxView |
    v _ self new.
    boxView _ v buildAndAssembleForInsertion.
    topView _ StandardSystemView
                    model: self
                    label: 'ColoredBoxesView Example'
                    minimumSize: 250 @ 250.
    topView cacheRefresh: false.
    topView borderWidth: 1.
    topView
```

```
        addSubView: boxView
        in: (0.1 @ 0.1 extent: 0.8 @ 0.8)
        borderWidth: 2.
    topView controller open!

example2
    "SLCColoredBoxesView example2"

| v topView boxView rowInteger columnInteger string | string _ FillInTheBlank request: 'Enter the number of cells in the
x direction:'.
    columnInteger _ string asNumber.

string _ FillInTheBlank request: 'Enter the number of cells in the
y direction:'.
    rowInteger _ string asNumber.
    rowInteger * columnInteger > 100 ifTrue: [self error: 'Cannot do
more than 100!!'].

v _ self new.
    boxView _ v
                buildAndAssembleForInsertionIndexBase: 10
                rows: rowInteger
                columns: columnInteger.
    topView _ StandardSystemView
                model: self
                label: 'ColoredBoxesView Example'
                minimumSize: 250 @ 250.
    topView cacheRefresh: false.
    topView borderWidth: 1.
    topView
        addSubView: boxView
        in: (0.1 @ 0.1 extent: 0.8 @ 0.8)
        borderWidth: 2.
    topView controller open!
``` example3
    "SLCColoredBoxesView example3"
    "this shows how to change a boxe at a particular index to a color corresponding to a particular colorTriplet through the calibration and the device."

| v topView boxView rowInteger columnInteger string tr | string _ FillInTheBlank request: 'Enter the number of cells in the x direction:'.
    columnInteger _ string asNumber.

string _ FillInTheBlank request: 'Enter the number of cells in the y direction:'.
    rowInteger _ string asNumber.
    rowInteger * columnInteger > 100 ifTrue: [self error: 'Cannot do more than 100!!'].

v _ self new.
    boxView _ v
                buildAndAssembleForInsertionIndexBase: 10
                rows: rowInteger
                columns: columnInteger.
    topView _ StandardSystemView
                model: self
                label: 'ColoredBoxesView Example'
                minimumSize: 250 @ 250.
    topView cacheRefresh: false.
    topView borderWidth: 1.
    topView
        addSubView: boxView
        in: (0.1 @ 0.1 extent: 0.8 @ 0.8)
        borderWidth: 2.
    "Here is how you can change the color of a box:"
    tr _ SLLabHunterColor new.
    tr L: 70.
    tr a: 10.
    tr b: 20.
    boxView changeBox: 1 to: tr.

topView controller open! !

```
ColorFormView subclass: #SLCColoredRectangle
    instanceVariableNames: 'mapIndex '
    classVariableNames: ''
    poolDictionaries: ''
    category: 'Color-Interface'!

!SLCColoredRectangle methodsFor: 'composing'!

displayView
    "Display my contents"

|displayBox lastTop |
    displayBox _ self insetDisplayBox.

^self fillIn: Display
        inRectangle: (displayBox origin corner: displayBox corner)!

fillIn: aMedium inRectangle: aRectangle
    "Fill in aRectangle with the bar color."

| ext displayForm |
    ext _ aRectangle extent.
    ext _ (ext x * ColorDevice bitsPerPixel) @ ext y.
    extent _ self insetDisplayBox extent.
    dispForm _ Form
        extent: (self insetDisplayBox width * ColorDevice
bitsPerPixel)
        @ (self insetDisplayBox height).
    self setMapIndex. "Fill in all form bits with mapIndex value"
    displayForm _ self dispForm.
    displayForm extent: ext offset: 0@0 bits: displayForm bits.
    ColorDevice new displayForm: displayForm onFrameBufferAt:
aRectangle origin!
setMapIndex

| bits pat bitsPerPixel index|
    bitsPerPixel _ ColorDevice bitsPerPixel.
    index _ self mapIndex.
    pat _ index.
```

```
        (16 // bitsPerPixel) - 1 timesRepeat: [pat _ (pat bitShift:
bitsPerPixel) + index].
        bits _ dispForm bits.
        1 to: bits size do: [:i | bits at: i put: pat]! !

!SLCColoredRectangle methodsFor: 'accessing'!

mapIndex
        "return the value of mapIndex.
        For a description of this instance variable, see the comment
        in the accessing method 'mapIndex:'."

^mapIndex! !

mapIndex: aParameter
        "set the value of mapIndex.
        aParameter is expected to be of the class aClass.
        This instance variable is used to <explanation>."

mapIndex _ aParameter! !

!SLCColoredRectangle methodsFor: 'releasing'!

release
        mapIndex _ nil.
        super release! !
SLObject subclass: #SLCColorCalibration
        instanceVariableNames: ''
        classVariableNames: 'BlueGammaTable BX BY BZ GreenGammaTable GX GY
GZ RedGammaTable RX RY RZ Xb Xg Xr Yb Yg Yr Zb Zg Zr '
        poolDictionaries: ''
        category: 'Color-Interface'!

!SLCColorCalibration methodsFor: 'gun computation'!

computeGunsFrom: aColorTriplet
        | ctXYZ ctYxy guns er eg eb x y z |
ctXYZ _ aColorTriplet asXYZ.
x _ ctXYZ X.
```

```
y _ ctXYZ Y.
z _ ctXYZ Z.
ctYxy _ ctXYZ asYxy.
guns _ SLRGBGunsColor new.
(ctYxy producable) ifFalse:[guns redGun:0;greenGun:0;blueGun:0. ^guns].
"compute using inverted matrix, er,eg,eb"
er _ (((x)*(2.167))+((y)*(-0.937))+((z)*(-0.344)))/(70.692).
eg _ (((x)*(-1.264))+((y)*(2.225))+((z)*(0.066)))/(97.475).
eb _ (((x)*(0.097))+((y)*(-0.288))+((z)*(1.278)))/(117.234).
((er > 1)|(eg>1)|(eb>1))ifTrue:[er_eg_eb_0].
"compute using gamma correction, redgun, greengun and bluegun"
"Note that the gamma correction tables are set up for 0 to 255 gun
values and that the primitive Smalltalk access is 0-65535"
guns redGun: ((self redGunOf: er)*256).
guns greenGun: ((self greenGunOf: eg)*256).
guns blueGun: ((self blueGunOf: eb)*256).
^guns!

oldComputeGunsFrom: aColorTriplet
    | ctXYZ ctYxy guns er eg eb |
ctXYZ _ aColorTriplet asXYZ.
ctYxy _ ctXYZ asYxy.
(ctYxy producable) ifFalse:[^nil].
guns _ SLRGBGunsColor new.
"compute using inverted matrix, er,eg,eb"
er _ (((ctXYZ X)*(self rX))+((ctXYZ Y)*(self rY))+((ctXYZ Z)*(self
rZ)))/(self capNr).
eg _ (((ctXYZ X)*(self gX))+((ctXYZ Y)*(self gY))+((ctXYZ Z)*(self
gZ)))/(self capNg).
eb _ (((ctXYZ X)*(self bX))+((ctXYZ Y)*(self bY))+((ctXYZ Z)*(self
bZ)))/(self capNb).
((er > 1)|(eg>1)|(eb>1))ifTrue:[er_eg_eb_0].
"compute using gamma correction, redgun, greengun and bluegun"
"Note that the gamma correction tables are set up for 0 to 255 gun
values and that the primitive Smalltalk access is 0-65535"
guns redGun: ((self redGunOf: er)*256).
guns greenGun: ((self greenGunOf: eg)*256).
guns blueGun: ((self blueGunOf: eb)*256).
^guns! !
```

!SLCColorCalibration methodsFor: 'gamma correction'!

blueGammaTable
    ^self species blueGammaTable!

blueGunOf: aFloat
    | gunVal num |

"This method returns the blue gun value given the relative excitation function
        value aFloat."

(aFloat > 1.0)ifTrue:[num _ 1.0]ifFalse:[num _ aFloat].

gunVal _ self interpolateForY: num on: BlueGammaTable.
    (gunVal isNil)ifTrue:[^0]ifFalse:[^gunVal]!

greenGammaTable
    ^self species greenGammaTable!

greenGunOf: aFloat
    "This method returns the green gun value given the relative excitation function
        value aFloat."

| gunVal |
    aFloat > 1.0
        ifTrue: [^0]
        ifFalse:
            [gunVal _ self interpolateForY: aFloat on: GreenGammaTable.
            gunVal isNil
                ifTrue: [^0]
                ifFalse: [^gunVal]]!

interpolateForY: aFloat on: anOrderedCollection
    | gt lo hi ratio val num |
    gt _ anOrderedCollection.
    lo _ nil.

```
aFloat < 0
    ifTrue: [num _ 0]
    ifFalse: [aFloat > 1.0
            ifTrue: [num _ 1.0]
            ifFalse: [num _ aFloat]].
hi _ nil.
"Here, hi being nil signals we haven't found the bracket. This makes the do:
execution very short once we've found the bracketing points. We look at the
current point. If it's not the upper bracketing point, it may be the lower point
so we put it into lo."
gt do: [:thisElement | hi isNil ifTrue: [thisElement y >= aFloat
            ifTrue: [hi _ thisElement]
            ifFalse: [lo _ thisElement]]].
"If the first element's y value was less than the input value, we return a gun
value of nil"
lo isNil ifTrue: [^nil].
"Now lo contains the element with an y less than the input value and hi, the
element above it in y value"
(hi isNil)ifTrue:[val_lo x]ifFalse:[ratio _ aFloat - lo y / (hi y - lo y).
    val _ lo x + (ratio * (hi x - lo x))].
^val!

redGammaTable
    ^self species redGammaTable!

redGunOf: aFloat
    | gunVal num |
    "This method returns the red gun value given the relative excitation function
    value aFloat."
    aFloat > 1.0
        ifTrue: [num _ 1.0]
        ifFalse: [aFloat < 0
                ifTrue: [num _ 0]
                ifFalse: [num _ aFloat]].
```

```
gunVal _ self interpolateForY: aFloat on: RedGammaTable.
gunVal isNil
    ifTrue: [^0]
    ifFalse: [^gunVal]! !
!SLCColorCalibration methodsFor: 'phosphor chromaticities'!
``` bX

"This is the blue phosphor contribution for Z for the IKEGAMI 19 inch SuperMac display obtained by inverting the chromaticity matrix."
^ 0.097!

bY

"This is the blue phosphor contribution for Y for the IKEGAMI 19 inch SuperMac display obtained by inverting the chromaticity matrix."
^ -0.288!

bZ

"This is the blue phosphor contribution for Z for the IKEGAMI 19 inch SuperMac display obtained by inverting the chromaticity matrix."
^ 1.278!

gX

"This is the green phosphor contribution for X for the IKEGAMI 19 inch SuperMac display obtained by inverting the chromaticity matrix."
^ -1.264!

gY

"This is the green phosphor contribution for Y for the IKEGAMI 19 inch SuperMac display obtained by inverting the chromaticity matrix."
^ 2.225!

gZ

"This is the green phosphor contribution for Z for the IKEGAMI 19 inch SuperMac display obtained by inverting the chromaticity matrix."
^ 0.066!

rX

"This is the red phosphor contribution for X for the IKEGAMI 19 inch SuperMac display obtained by inverting the chromaticity matrix."
^ 2.167!

rY

"This is the red phosphor contribution for Y for the IKEGAMI 19 inch SuperMac display obtained by inverting the chromaticity matrix."

^ -0.937!

rZ

"This is the red phosphor contribution for Z for the IKEGAMI 19 inch SuperMac display obtained by inverting the chromaticity matrix."

^ -0.344!

xb

"This is the x value of the blue phosphor for the IKEGAMI 19 inch SuperMac display"

^ 0.152!

xg

"This is the x value of the green phosphor for the IKEGAMI 19 inch SuperMac display"

^ 0.280!

xr

"This is the x value of the red phosphor for the IKEGAMI 19 inch SuperMac display"

^ 0.618!

yb

"This is the y value of the blue phosphor for the IKEGAMI 19 inch SuperMac display"

^ 0.063!

yg

"This is the y value of the green phosphor for the IKEGAMI 19 inch SuperMac display"

^ 0.605!

yr

"This is the y value of the red phosphor for the IKEGAMI 19 inch SuperMac display"

^ 0.350!

zb

"This is the z value of the blue phosphor for the IKEGAMI 19 inch SuperMac display"

^ 0.785!

zg

"This is the z value of the green phosphor for the IKEGAMI 19 inch SuperMac display"

^ 0.115!

zr

"This is the z value of the red phosphor for the IKEGAMI 19 inch SuperMac display"

^ 0.032! !

!SLCColorCalibration methodsFor: 'gun normalization factors'!

capNb

"This returns the blue gun normalization"

"^ 124.339*2 from blue tile"

^117.234 "from white is all guns high"!

capNg

"This returns the green gun normalization"

"^ 70.816*2 from blue tile"

^97.475 "from white is all on hi"!

capNr

"This returns the red gun normalization"

"^ 35.685*2  from blue tile"

^70.692 "from white is all on hi"!

N

"This returns the overall normalization"

^ 225!

nb

"This returns the blue gun normalization"

^ 0.42236!

ng

"This returns the green gun normalization"
^ 0.19689!

nr

"This returns the red gun normalization"
^ 0.38075! !

"-- -- -- -- -- -- -- -- -- -- -- -- -- -- -- -- -- -- "!

SLCColorCalibration class
    instanceVariableNames: ''!

!SLCColorCalibration class methodsFor: 'gamma table setup'!

setupBlueGamma
    | gt top |
    gt _ OrderedCollection new: 27.
    "collection is ordered in ascending relative excitation values"
    "top is the photometric reading at gun value 255"
    "the gamma correction is stored as a set of (gun@excitation value) points"
    top _ 1049.
    gt add: 0 @ (260 / top).
    gt add: 10 @ (261 / top).
    gt add: 20 @ (262 / top).
    gt add: 30 @ (268 / top).
    gt add: 40 @ (278 / top).
    gt add: 50 @ (290 / top).
    gt add: 60 @ (307 / top).
    gt add: 70 @ (323 / top).
    gt add: 80 @ (345 / top).
    gt add: 90 @ (368 / top).
    gt add: 100 @ (392 / top).
    gt add: 110 @ (422 / top).
    gt add: 120 @ (452 / top).
    gt add: 130 @ (489 / top).
    gt add: 140 @ (521 / top).
    gt add: 150 @ (558 / top).
    gt add: 160 @ (595 / top).

gt add: 170 @ (635 / top).
gt add: 180 @ (678 / top).
gt add: 190 @ (720 / top).
gt add: 200 @ (765 / top).
gt add: 210 @ (818 / top).
gt add: 220 @ (865 / top).
gt add: 230 @ (909 / top).
gt add: 240 @ (965 / top).
gt add: 250 @ (1015 / top).
gt add: 255 @ (top / top).
BlueGammaTable _ gt!

setupGreenGamma
 | gt top |
 gt _ OrderedCollection new: 27.
 "collection is ordered in ascending relative excitation values"
 "top is the photometric reading at gun value 255"
 "the gamma correction is stored as a set of (gun@excitation value) points"
 top _ 2227.
 gt add: 0 @ (683 / top).
 gt add: 11 @ (684 / top).
 gt add: 16 @ (689 / top).
 gt add: 30 @ (696 / top).
 gt add: 40 @ (716 / top).
 gt add: 50 @ (738 / top).
 gt add: 60 @ (774 / top).
 gt add: 70 @ (809 / top).
 gt add: 80 @ (848 / top).
 gt add: 90 @ (900 / top).
 gt add: 100 @ (948 / top).
 gt add: 110 @ (1002 / top).
 gt add: 120 @ (1063 / top).
 gt add: 130 @ (1130 / top).
 gt add: 140 @ (1193 / top).
 gt add: 150 @ (1261 / top).
 gt add: 160 @ (1334 / top).
 gt add: 170 @ (1418 / top).
 gt add: 180 @ (1499 / top).
 gt add: 190 @ (1586 / top).

```
gt add: 200 @ (1667 / top).
gt add: 210 @ (1764 / top).
gt add: 220 @ (1856 / top).
gt add: 230 @ (1939 / top).
gt add: 240 @ (2035 / top).
gt add: 250 @ (2146 / top).
gt add: 255 @ (top / top).
GreenGammaTable _ gt!
``` setupRedGamma

```
| gt top |
gt _ OrderedCollection new: 27.
"collection is ordered in ascending relative excitation values"
"top is the photometric reading at gun value 255"
"the gamma correction is stored as a set of (gun@excitation value) points"
top _ 2672.
gt add: 0 @ (1139 / top).
gt add: 10 @ (1142 / top).
gt add: 20 @ (1152 / top).
gt add: 30 @ (1168 / top).
gt add: 40 @ (1189 / top).
gt add: 50 @ (1216 / top).
gt add: 60 @ (1268 / top).
gt add: 70 @ (1314 / top).
gt add: 80 @ (1367 / top).
gt add: 90 @ (1425 / top).
gt add: 100 @ (1467 / top).
gt add: 110 @ (1520 / top).
gt add: 120 @ (1592 / top).
gt add: 130 @ (1646 / top).
gt add: 140 @ (1705 / top).
gt add: 150 @ (1777 / top).
gt add: 160 @ (1843 / top).
gt add: 170 @ (1931 / top).
gt add: 180 @ (2002 / top).
gt add: 190 @ (2094 / top).
gt add: 200 @ (2164 / top).
gt add: 210 @ (2249 / top).
```

```
        gt add: 220 @ (2344 / top).
        gt add: 230 @ (2422 / top).
        gt add: 240 @ (2507 / top).
        gt add: 250 @ (2625 / top).
        gt add: 255 @ (top / top).
        RedGammaTable _ gt! !

!SLCColorCalibration class methodsFor: 'class initialization'!

initialize
        self setupRedGamma.
        self setupBlueGamma.
        self setupGreenGamma.! !

!SLCColorCalibration class methodsFor: 'accessing'!

blueGammaTable
        ^BlueGammaTable!

greenGammaTable
        ^GreenGammaTable!

redGammaTable
        ^RedGammaTable! !

SLCColorCalibration initialize!
SLObject subclass: #SLCMapIndex
        instanceVariableNames: 'index '
        classVariableNames: ''
        poolDictionaries: ''
        category: 'Color-Interface'!

!SLCMapIndex methodsFor: 'accessing'!

index
        "return the value of index.
        For a description of this instance variable, see the comment
        in the accessing method 'index:'."
```

^index!

index: aParameter

"set the value of index.

aParameter is expected to be of the class aClass.

This instance variable is used to <explanation>."

index _ aParameter!

mapIndex

"return the value of index.

For a description of this instance variable, see the comment
in the accessing method 'index:'."

^index! !

Below is the listing for file 'Color Spaces.st' in standard
fileIn/fileOut format:

SLColorTriplet subclass: #SLFMCIIColor
    instanceVariableNames: ''
    classVariableNames: ''
    poolDictionaries: ''
    category: 'Color Spaces'!

!SLFMCIIColor methodsFor: 'color space accessing'!

colorSpace

"return a symbol denoting my color space"

^#FMCII! !

SLColorTriplet subclass: #SLXYZColor
    instanceVariableNames: ''
    classVariableNames: ''
    poolDictionaries: ''
    category: 'Color Spaces'!

!SLXYZColor methodsFor: 'value range accessing'!

valuelRange
    "return the range for value 1"

^0 to: 120!

value2Range
    "return the range for value 2"

^0 to: 120!

value3Range
    "return the range for value 3"

^0 to: 120! !

!SLXYZColor methodsFor: 'conversion'!

asCIELAB
    "From Gardner colorimeter manual"

| c crY crX crZ | c _ SLCIELABColor new.
    crY _ (self Y ln * (1 / 3)) exp.
    crX _ ((1.02 * self X) ln * (1 / 3)) exp.
    crZ _ ((0.8467 * self Z) ln * (1 / 3)) exp.
    c elStar: 24.99 * crY - 16.
    c aStar: 107.7 * (crX - crY).
    c bStar: 43.09 * (crY - crZ).
    ^c!

asLabHunter
    | c sy |
    c _ SLLabHunterColor new.
    sy _ ((self Y)sqrt).
    c L: (10.0 * sy).
    c a: (((1.02 * (self X))-(self Y))*(17.5/sy)).
    c b: ( ((self Y)-(0.8467*(self Z)))*(7.0/sy)).
    ^c!

```
asXYZ
    ^self!

asYxy
    | nYxy total | nYxy _ SLYxyColor new.
    nYxy Y: self Y.
    total _ self X + self Y + self Z.
    (total = 0)ifFalse:[nYxy x: self X / total.
    nYxy y: self Y / total]ifTrue:[nYxy x: 0.nYxy y: 0].
    ^nYxy! !

!SLXYZColor methodsFor: 'accessing'!

X
    "returns the value of X for this triplet"
    ^ self value1!

X: aFloat
    "sets the value of X for this triplet"
    self value1: aFloat.!

Y
    "returns the value of Y for this triplet"
    ^ self value2!

Y: aFloat
    "sets the value of Y for this triplet"
    self value2: aFloat.!

Z
    "returns the value of Z for this triplet"
    ^ self value3!

Z: aFloat
    "sets the value of Z for this triplet"
    self value3: aFloat.! !
```

```
!SLXYZColor methodsFor: 'color space accessing'!

colorSpace

"return a symbol denoting my color space"

^#XYZ!

colorSpaceLabels
    | cs |
    "return a collection of labels for displaying my color space
variables"

cs _ OrderedCollection new: 3.
    cs add: #X.
    cs add: #Y.
    cs add: #Z.
    ^cs! !

SLColorTriplet subclass: #SLRGBGunsColor
    instanceVariableNames: ''
    classVariableNames: ''
    poolDictionaries: ''
    category: 'Color Spaces'!
SLRGBGunsColor comment:
'''This class represents the color space of the monitor''s gun values.
These values are commonly called red green and blue and those terms are
used here.  All color spaces must respond to conversion messages that
result in gun values to be displayed.'''!

!SLRGBGunsColor methodsFor: 'color space accessing'!

colorSpace
    | cs |
    "return a symbol denoting my color space.
I am the red, green and blue monitor gun values."

^#RGBGuns!
```

```
colorSpaceLabels
    | cs |
    "return a OrderedCollection of three strings denoting my color
space.
I am the red, green and blue monitor gun values."

cs _ OrderedCollection new: 3.
    cs add: #Rg.
    cs add: #Gg.
    cs add: #Bg.
    ^cs! !

!SLRGBGunsColor methodsFor: 'value range accessing'!
value1Range
    "return the range for value 1"

^0 to: 65535!

value2Range
    "return the range for value 2"

^0 to: 65535!

value3Range
    "return the range for value 3"

^0 to: 65535! !

!SLRGBGunsColor methodsFor: 'accessing'!

blueGun

^self value3!

blueGun: anInteger self value3: anInteger!

greenGun

^self value2!
```

```
greenGun: anInteger self value2: anInteger!

redGun

^self value1!

redGun: anInteger self value1: anInteger! !
"-- -- -- -- -- -- -- -- -- -- -- -- -- -- -- -- -- -- "!

SLRGBGunsColor class
        instanceVariableNames: ''!

!SLRGBGunsColor class methodsFor: 'instance creation'!

R: redPercent G: greenPercent B: bluePercent
    | rgb |
    "create and return a new instance of me"

rgb _ self new.
    rgb percentRed: redPercent.
    rgb percentGreen: greenPercent.
    rgb percentBlue: bluePercent.
    ^rgb! !
SLColorTriplet subclass: #SLCIELUVColor
        instanceVariableNames: ''
        classVariableNames: ''
        poolDictionaries: ''
        category: 'Color Spaces'!

!SLCIELUVColor methodsFor: 'color space accessing'!

colorSpace

"return a symbol denoting my color space"

^#CIELUV! !
```

```
SLColorTriplet subclass: #SLCIELABColor
    instanceVariableNames: ''
    classVariableNames: ''
    poolDictionaries: ''
    category: 'Color Spaces'!

!SLCIELABColor methodsFor: 'conversion'!

asCIELAB
^self! !

!SLCIELABColor methodsFor: 'color space accessing'!

colorSpace

"return a symbol denoting my color space"

^#CIELAB! !

!SLCIELABColor methodsFor: 'accessing'!

aStar
^ value2!

aStar: aFloat
self value2: (aFloat)!

bStar
^ value3!

bStar: aFloat
self value3: (aFloat)!

elStar
^ value1!

elStar: aFloat
self value1: (aFloat)! !
```

```
SLColorTriplet subclass: #SLYxyColor
    instanceVariableNames: ''
    classVariableNames: ''
    poolDictionaries: ''
    category: 'Color Spaces'!

!SLYxyColor methodsFor: 'value range accessing'!

value1Range
    "return the range for value 1"

^0 to: 100!

value2Range
    "return the range for value 2"

^0 to: 1.0!

value3Range
    "return the range for value 3"

^0 to: 1.0! !

!SLYxyColor methodsFor: 'conversion'!

asXYZ
    | c |
    c _ SLXYZColor new.
    self y = 0
        ifTrue:
            [c X: 0.
             c Z: 0]
        ifFalse:
            [c X: self x * self Y / self y.
             c Z: ((self Y / self y) * (1.0 - self x - self y))].
    c Y: self Y.
    ^c!

asYxy
    ^self! !
```

!SLYxyColor methodsFor: 'accessing'!

x
^self value2!

x: aFloat
^self value2: aFloat!

Y
^self value1!

y
^self value3!

y: aFloat
^self value3: aFloat!

Y: aFloat
^self value1: aFloat! !

!SLYxyColor methodsFor: 'testing'!

producable
    "This tests the x and y values for inclusion within the gamut of the monitor
    phosphors."
    "The algorithm is based on testing for the x,y point in question being above or
    below the lines connecting the phosphor chromaticity points. The test answers
    True if the x,y point in question lies inside or on the edge of the triangle, False
    otherwise."
    "These must be examined for validity of 'above' and 'below' decisions for each
    new CRT phosphor set"

| cal slopebg slopegr slopebr blkbg blkgr blkbr abovebg abovegr belowbr outside inside |

```
cal _ SLCColorCalibration new.

"Here we calculate the slopes of the three lines connecting the
chromaticity
    points for the phosphors."
    slopebg _ cal yg - cal yb / (cal xg - cal xb).
    slopegr _ cal yr - cal yg / (cal xr - cal xg).
    slopebr _ cal yr - cal yb / (cal xr - cal xb).

"Here we set up line equations in blocks for evaluation"
    blkbg _ [:x | slopebg * (x - cal xb) + cal yb].
    blkgr _ [:x | slopegr * (x - cal xg) + cal yg].
    blkbr _ [:x | slopebr * (x - cal xb) + cal yb].

"Note that the two sets of values/blocks above should eventually
be made
    instance variables of the colorcalibration."

"Here we evaluate the point's positions relative to the lines
using the blocks."
    abovebg _ self y > (blkbg value: self x).
    abovegr _ self y > (blkgr value: self x).
    belowbr _ self y < (blkbr value: self x).
    outside _ abovebg | abovegr | belowbr.
    inside _ outside not.
    ^inside! !

!SLYxyColor methodsFor: 'color space accessing'!

colorSpace

"return a symbol denoting my color space"

^#Yxy!

colorSpaceLabels
    | cs |
    "return a collection of labels for displaying my color space
variables"
```

```
cs _ OrderedCollection new: 3.
cs add: #Y.
cs add: #x.
cs add: #y.
^cs! !

SLColorTriplet subclass: #SLLabHunterColor
    instanceVariableNames: ''
    classVariableNames: ''
    poolDictionaries: ''
    category: 'Color Spaces'!

!SLLabHunterColor methodsFor: 'conversion'!

asLabHunter
    "return a new color triplet converted to Lab Hunter coordinates"

^self!

asXYZ
    | newColor |
    "convert to the XYZ system"
    newColor _ SLXYZColor new.
    newColor X: (((self L)/100)*((0.5602*(self a)) + (0.9804*(self L)))).
    newColor Y: ((self L)*(self L))/100.
    newColor Z: (((self L)/59.27)*((0.7*(self L))-(self b))).
    ^ newColor! !

!SLLabHunterColor methodsFor: 'color space accessing'!

colorSpace

"return a symbol denoting my color space"

^#LabHunter!

colorSpaceLabels
    | cs |
```

"return a collection of labels for displaying my color space variables"

cs _ OrderedCollection new: 3.
cs add: #Lh.
cs add: #ah.
cs add: #bh.
^cs! !

!SLLabHunterColor methodsFor: 'accessing'!

a
    "return the value of a.
    result is expected to be of the class Float.
    This variable is used to hold the a value of a Hunter Lab color space triplet."

^self value2!

a: aFloat
    "set the value of a.
    aFloat is expected to be of the class Float.
    This variable is used to hold the a value of a Hunter Lab color space triplet.  This value ranges from -60 to +60."

self value2: aFloat!

b
    "return the value of b.
    result is expected to be of the class Float.
    This variable is used to hold the b value of a Hunter Lab color space triplet."

^self value3!

b: aFloat
    "set the value of b.
    aFloat is expected to be of the class Float.
    This variable is used to hold the b value of a Hunter Lab color space triplet.  This value ranges from -60 to +60."

self value3: aFloat!

L

"return the value of L.
result is expected to be of the class Float.
This variable is used to hold the L value of a Hunter Lab color space triplet."

^self value1!

L: aFloat

"set the value of a.
aFloat is expected to be of the class Float.
This variable is used to hold the L value of a Hunter Lab color space triplet. This value ranges from -60 to +60."

self value1: aFloat! !

!SLLabHunterColor methodsFor: 'value range accessing'!

value1Range

"return the range for value 1"

^0 to: 100!

value2Range

"return the range for value 2"

^-60 to: 60!

value3Range

"return the range for value 3"

^-60 to: 60! !

SLLabHunterColor subclass: #SLLabHunterRColor
    instanceVariableNames: ''
    classVariableNames: ''
    poolDictionaries: ''
    category: 'Color Spaces'!

!SLLabHunterRColor methodsFor: 'value range accessing'!

value1Range
    "return the range for value 1"

^50 to: 90!

value2Range
    "return the range for value 2"

^-15 to: 15!

value3Range
    "return the range for value 3"

^0 to: 30! !

Below is the listing for file 'SLColorTripletBrowser.st' in standard fileIn/fileOut format:

SLObject subclass: #SLColorTripletBrowser
    instanceVariableNames: 'colorTriplet '
    classVariableNames: ''
    poolDictionaries: ''
    category: 'SeeLab Data Browsers'!

!SLColorTripletBrowser methodsFor: 'updating'!

update: aSymbol
    "handle updates"

(aSymbol = #value1) ifTrue:[ self changed: #value1. self changed: #guns].
(aSymbol = #value2) ifTrue:[ self changed: #value2. self changed: #guns].
(aSymbol = #value3) ifTrue:[ self changed: #value3. self changed: #guns].
(aSymbol = #updateAll) ifTrue:[ self changed: #value1.
self changed: #value2.
self changed: #value3.
self changed: #guns].

```
super update: aSymbol! !

!SLColorTripletBrowser methodsFor: 'indirect accessing'!

value1
    "get value1 from my colorTriplet"

^self colorTriplet value1!

value1: aNumber
    "set value1 in my colorTriplet"
    "This is sent when the gauge is jerked around"

self colorTriplet value1: ((aNumber * 100) truncated / 100) asFloat!

value1Range
    "get the range for value1 from my colorTriplet"

^self colorTriplet value1Range!

value2
    "get value2 from my colorTriplet"

^self colorTriplet value2!

value2: aNumber
    "set value2 in my colorTriplet"

self colorTriplet value2: ((aNumber * 100) truncated / 100) asFloat!

value2Range
    "get the range for value2 from my colorTriplet"

^self colorTriplet value2Range!

value3
    "get value3 from my colorTriplet"

^self colorTriplet value3!
```

```
value3: aNumber
    "set value3 in my colorTriplet"

self colorTriplet value3: ((aNumber * 100) truncated / 100) asFloat!

value3Range
    "get the range for value3 from my colorTriplet"

^self colorTriplet value3Range! !

!SLColorTripletBrowser methodsFor: 'scheduling'!

buildAndAssembleBrowser
    | topView |
    "build the subviews and arrange them in a SSV for scheduling"

topView _ StandardSystemView
                model: self
                label: 'Color Triplet Browser'
                minimumSize: 250 @ 70.
    topView borderWidth: 1.

topView
        addSubView:

(LabelView label:(colorTriplet colorSpaceLabels at: 1))
        in: (0 @ 0 extent: (1 / 3) @ (1 / 4))
        borderWidth: 1.

topView
        addSubView: self value1DigitGauge
        in: (0 @ (1/4) extent: (5 / 21) @ (3/4))
        borderWidth: 1.

topView
        addSubView: self value1BarGauge
        in: ((5/21) @ (1/4) extent: (2 / 21) @ (3/4))
        borderWidth: 1.
``` topView
    addSubView:
        (LabelView label:(colorTriplet colorSpaceLabels at: 2))
    in: ((1/3) @ 0 extent: (1 / 3) @ (1 / 4))
    borderWidth: 1.

topView
    addSubView: self value2DigitGauge
    in: ((1/3) @ (1/4) extent: (5 / 21) @ (3/4))
    borderWidth: 1.

topView
    addSubView: self value2BarGauge
    in: ((12/21) @ (1/4) extent: (2 / 21) @ (3/4))
    borderWidth: 1.

topView
    addSubView:
        (LabelView label:(colorTriplet colorSpaceLabels at: 3))
    in: ((2/3) @ 0 extent: (1 / 3) @ (1 / 4))
    borderWidth: 1.

topView
    addSubView: self value3DigitGauge
    in: ((2/3) @ (1/4) extent: (5 / 21) @ (3/4))
    borderWidth: 1.

topView
    addSubView: self value3BarGauge
    in: ((19/21) @ (1/4) extent: (2/21) @ (3/4))
    borderWidth: 1.

^topView!

buildAndAssembleBrowserForInsertion
    aView ,
    "build the subviews and arrange them in a view for insertion"

```
aView _ View new model: self.
aView borderWidth: 1.

aView
        addSubView: (LabelView label:(self colorTriplet
colorSpaceLabels at:1))
        in: (0 @ 0 extent: (1 / 3) @ (1 / 4))
        borderWidth: 1.

aView
        addSubView: self value1DigitGauge
        in: (0 @ (1/4) extent: (5 / 21) @ (3/4))
        borderWidth: 1.

aView
        addSubView: self value1BarGauge
        in: ((5/21) @ (1/4) extent: (2 / 21) @ (3/4))
        borderWidth: 1.

aView
        addSubView: (LabelView label:(self colorTriplet
colorSpaceLabels at:2))
        in: ((1/3) @ 0 extent: (1 / 3) @ (1 / 4))
        borderWidth: 1.

aView
        addSubView: self value2DigitGauge
        in: ((1/3) @ (1/4) extent: (5 / 21) @ (3/4))
        borderWidth: 1.

aView
        addSubView: self value2BarGauge
        in: ((12/21) @ (1/4) extent: (2 / 21) @ (3/4))
        borderWidth: 1.

aView
        addSubView: (LabelView label:(self colorTriplet
colorSpaceLabels at:3))
        in: ((2/3) @ 0 extent: (1 / 3) @ (1 / 4))
        borderWidth: 1.
``` aView
    addSubView: self value3DigitGauge
    in: ((2/3) @ (1/4) extent: (5 / 21) @ (3/4))
    borderWidth: 1.

aView
    addSubView: self value3BarGauge
    in: ((19/21) @ (1/4) extent: (2/21) @ (3/4))
    borderWidth: 1.

^aView! !

!SLColorTripletBrowser methodsFor: 'subview creation'!

value1BarGauge
^BarGaugeView
                on: self
                aspect: #value1
                change: #value1:
                range: self value1Range
                orientation: #vertical
                type: #bar
                needleDirection: nil!

value1DigitGauge
^DigitGaugeView
                on: self
                aspect: #value1
                change: #value1:
                range: self value1Range!

value2BarGauge
^BarGaugeView
                on: self
                aspect: #value2
                change: #value2:
                range: self value2Range
                orientation: #vertical
                type: #bar
                needleDirection: nil!

```
value2DigitGauge
^DigitGaugeView
                    on: self
                    aspect: #value2
                    change: #value2:
                    range: self value2Range!

value3BarGauge
^BarGaugeView
                    on: self
                    aspect: #value3
                    change: #value3:
                    range: self value3Range
                    orientation: #vertical
                    type: #bar
                    needleDirection: nil!

value3DigitGauge
^DigitGaugeView
                    on: self
                    aspect: #value3
                    change: #value3:
                    range: self value3Range! !

!SLColorTripletBrowser methodsFor: 'release'!

release
    "do some clean up"
colorTriplet removeDependent: self.
colorTriplet _ nil.

super release.!

removeDependent: anObject
    "intercept this message to clean up"

self release.

super removeDependent: anObject! !
```

'SLColorTripletBrowser methodsFor: 'accessing'!

colorTriplet
    "return the value of colorTriplet.
    For a description of this instance variable, see the comment
    in the accessing method 'colorTriplet:'."

^colorTriplet!

colorTriplet: anSLColorTriplet
    | oldColorTriplet |
    "set the value of colorTriplet.

anSLColorTriplet is expected to be a subclass of SLColorTriplet.
    This instance variable is used to hold the color triplet being
browsed."

oldColorTriplet _ colorTriplet.

colorTriplet _ anSLColorTriplet.

oldColorTriplet isNil ifFalse:[oldColorTriplet removeDependent: self].
colorTriplet addDependent: self.! !
"-- -- -- -- -- -- -- -- -- -- -- -- -- -- -- -- -- -- "!

SLColorTripletBrowser class
    instanceVariableNames: ''!

!SLColorTripletBrowser class methodsFor: 'instance creation'!

on: anSLColorTriplet
    | ctb |
    "create and return a new instance of me on anSLColorTriplet"

ctb _ self new.
ctb colorTriplet: anSLColorTriplet.
^ctb!

```
openOn: anSLColorTriplet
    "create and schedule a new instance of me on anSLColorTriplet"
    "SLColorTripletBrowser openOn: (SLCIELABColor new)."
    "SLColorTripletBrowser openOn: (SLRGBGunsColor new)."

| ctb |
    ctb _ self on: anSLColorTriplet.
    ctb buildAndAssembleBrowser controller open! !
```

Below is the listing for file 'Color Science Tools.st' in standard fileIn/fileOut format:

```
SLObject subclass: #SLCGaugedPatch
    instanceVariableNames: 'experiment ivValues triplet cost
calibration device gunTriplet regression '
    classVariableNames: ''
    poolDictionaries: ''
    category: 'Color Science Tools'!

!SLCGaugedPatch methodsFor: 'value range accessing'!

value1Range
    | iv top |
    iv _ self variables at: 1.
    top _ iv max.
    (top > 10000) ifTrue: [top _ 10000].
    ^iv min to: top!

value2Range
    | iv top |
    iv _ self variables at: 2.
    top _ iv max.
    (top > 10000) ifTrue: [top _ 10000].
    ^iv min to: top!

value3Range
    | iv top |
    iv _ self variables at: 3.
    top _ iv max.
```

```
        (top > 10000) ifTrue: [top _ 10000].
        ^iv min to: top!

value4Range
        | iv top |
        iv _ self variables at: 4.
        top _ iv max.
        (top > 10000) ifTrue: [top _ 10000].
        ^iv min to: top!

value5Range
        | iv top |
        iv _ self variables at: 5.
        top _ iv max.
        (top > 10000) ifTrue: [top _ 10000].
        ^iv min to: top!

value6Range
        | iv top |
        iv _ self variables at: 6.
        top _ iv max.
        (top > 10000) ifTrue: [top _ 10000].
        ^iv min to: top!

value7Range
        | iv top |
        iv _ self variables at: 7.
        top _ iv max.
        (top > 10000) ifTrue: [top _ 10000].
        ^iv min to: top! !

!SLCGaugedPatch methodsFor: 'gauge value access'!

value1
        ^ self ivValues at: 1!

value1: aNumber
        self ivValues at: 1 put: aNumber.
        self changed: #value1.
```

```
        self refigureThings.!

value2
        ^ self ivValues at: 2!

value2: aNumber
        self ivValues at: 2 put: aNumber.
        self changed: #value2.
        self refigureThings.!

value3
        ^ self ivValues at: 3!

value3: aNumber
        self ivValues at: 3 put: aNumber.
        self changed: #value3.
        self refigureThings.!

value4
        ^ self ivValues at: 4!

value4: aNumber
        self ivValues at: 4 put: aNumber.
        self changed: #value4.
        self refigureThings.!

value5
        ^ self ivValues at: 5!

value5: aNumber
        self ivValues at: 5 put: aNumber.
        self changed: #value5.
        self refigureThings.!

value6
        ^ self ivValues at: 6!

value6: aNumber
        self ivValues at: 6 put: aNumber.
```

```
        self changed: #value6.
        self refigureThings.!

value7
        ^ self ivValue at: 7!

value7: aNumber
        self ivValues at: 7 put: aNumber.
        self changed: #value7.
        self refigureThings.! !

!SLCGaugedPatch methodsFor: 'DigitGauge building'!

value1DigitGauge
^DigitGaugeView
                        on: self
                        aspect: #value1
                        change: #value1:
                        range: self value1Range!

value2DigitGauge
^DigitGaugeView
                        on: self
                        aspect: #value2
                        change: #value2:
                        range: self value2Range!

value3DigitGauge
        ^DigitGaugeView
                on: self
                aspect: #value3
                change: #value3:
                range: self value3Range!

value4DigitGauge
        ^DigitGaugeView
                on: self
                aspect: #value4
                change: #value4:
                range: self value4Range!
```

```
value5DigitGauge
    ^DigitGaugeView
        on: self
        aspect: #value5
        change: #value5:
        range: self value5Range!

value6DigitGauge
    ^DigitGaugeView
        on: self
        aspect: #value6
        change: #value6:
        range: self value6Range!

value7DigitGauge
    ^DigitGaugeView
        on: self
        aspect: #value7
        change: #value7:
        range: self value7Range! !

!SLCGaugedPatch methodsFor: 'BarGauge building'!

value1BarGauge
^BarGaugeView
                on: self
                aspect: #value1
                change: #value1:
                range: self value1Range
                orientation: #vertical
                type: #bar
                needleDirection: nil!

value2BarGauge
^BarGaugeView
                on: self
                aspect: #value2
                change: #value2:
                range: self value2Range
```

```
                    orientation: #vertical
                    type: #bar
                    needleDirection: nil!

value3BarGauge
    ^BarGaugeView
                    on: self
                    aspect: #value3
                    change: #value3:
                    range: self value3Range
                    orientation: #vertical
                    type: #bar
                    needleDirection: nil!

value4BarGauge
    ^BarGaugeView
                    on: self
                    aspect: #value4
                    change: #value4:
                    range: self value4Range
                    orientation: #vertical
                    type: #bar
                    needleDirection: nil!

value5BarGauge
    ^BarGaugeView
                    on: self
                    aspect: #value5
                    change: #value5:
                    range: self value5Range
                    orientation: #vertical
                    type: #bar
                    needleDirection: nil!

value6BarGauge
    ^BarGaugeView
        on: self
        aspect: #value6
        change: #value6:
        range: self value6Range
```

```
        orientation: #vertical
        type: #bar
        needleDirection: nil!

value7BarGauge
    ^BarGaugeView
        on: self
        aspect: #value7
        change: #value7:
        range: self value7Range
        orientation: #vertical
        type: #bar
        needleDirection: nil! !

!SLCGaugedPatch methodsFor: 'GaugeSet building'!

gaugeSet1
    | gaugeSet |
    gaugeSet _ View new model: self.
    gaugeSet borderWidth: 1.
    gaugeSet
        addSubView: (LabelView label:((self variables at:1) name))
        in: (0 @ 0 extent: (1) @ (1 / 4))
        borderWidth: 1.

gaugeSet
        addSubView: self value1DigitGauge
        in: (0 @ (1/4) extent: (1) @ (1/4))
        borderWidth: 1.

gaugeSet
        addSubView: self value1BarGauge
        in: (0 @ (1/2) extent: (1) @ (1/2))
        borderWidth: 1.
    ^gaugeSet!

gaugeSet2
    | gaugeSet |
    gaugeSet _ View new model: self.
    gaugeSet borderWidth: 1.
``` gaugeSet
    addSubView: (LabelView label:((self variables at:2) name))
    in: (0 @ 0 extent: (1) @ (1 / 4))
    borderWidth: 1.

gaugeSet
    addSubView: self value2DigitGauge
    in: (0 @ (1/4) extent: (1) @ (1/4))
    borderWidth: 1.

gaugeSet
    addSubView: self value2BarGauge
    in: (0 @ (1/2) extent: (1) @ (1/2))
    borderWidth: 1.
^gaugeSet!

gaugeSet3
    | gaugeSet |
    ((self variables at:3) units) = 'ratio' ifTrue:[^ self ratioGauge3].
    gaugeSet _ View new model: self.
    gaugeSet borderWidth: 1.
    gaugeSet
        addSubView: (LabelView label:((self variables at:3) name))
        in: (0 @ 0 extent: (1) @ (1 / 4))
        borderWidth: 1.

gaugeSet
        addSubView: self value3DigitGauge
        in: (0 @ (1/4) extent: (1) @ (1/4))
        borderWidth: 1.

gaugeSet
        addSubView: self value3BarGauge
        in: (0 @ (1/2) extent: (1) @ (1/2))
        borderWidth: 1.
    ^gaugeSet!

gaugeSet4

```
    | gaugeSet |
    ((self variables at:4) units) = 'ratio' ifTrue:[^ self
ratioGauge4].
    gaugeSet _ View new model: self.
    gaugeSet borderWidth: 1.
    gaugeSet
        addSubView: (LabelView label:((self variables at:4) name))
        in: (0 @ 0 extent: (1) @ (1 / 4))
        borderWidth: 1.

gaugeSet
        addSubView: self value4DigitGauge
        in: (0 @ (1/4) extent: (1) @ (1/4))
        borderWidth: 1.

gaugeSet
        addSubView: self value4BarGauge
        in: (0 @ (1/2) extent: (1) @ (1/2))
        borderWidth: 1.
    ^gaugeSet!

gaugeSet5
    | gaugeSet |
    gaugeSet _ View new model: self.
    gaugeSet borderWidth: 1.
    gaugeSet
        addSubView: (LabelView label:((self variables at:5) name))
        in: (0 @ 0 extent: (1) @ (1 / 4))
        borderWidth: 1.

gaugeSet
        addSubView: self value5DigitGauge
        in: (0 @ (1/4) extent: (1) @ (1/4))
        borderWidth: 1.

gaugeSet
        addSubView: self value5BarGauge
        in: (0 @ (1/2) extent: (1) @ (1/2))
        borderWidth: 1.
    ^gaugeSet!
```

```
gaugeSet6

| gaugeSet |
    gaugeSet _ View new model: self.
    gaugeSet borderWidth: 1.
    gaugeSet
        addSubView: (LabelView label:((self variables at:6) name))
        in: (0 @ 0 extent: (1) @ (1 / 4))
        borderWidth: 1.

gaugeSet
        addSubView: self value6DigitGauge
        in: (0 @ (1/4) extent: (1) @ (1/4))
        borderWidth: 1.

gaugeSet
        addSubView: self value6BarGauge
        in: (0 @ (1/2) extent: (1) @ (1/2))
        borderWidth: 1.
    ^gaugeSet!

gaugeSet7

| gaugeSet |
    gaugeSet _ View new model: self.
    gaugeSet borderWidth: 1.
    gaugeSet
        addSubView: (LabelView label:((self variables at:7) name))
        in: (0 @ 0 extent: (1) @ (1 / 4))
        borderWidth: 1.

gaugeSet
        addSubView: self value7DigitGauge
        in: (0 @ (1/4) extent: (1) @ (1/4))
        borderWidth: 1.

gaugeSet
        addSubView: self value7BarGauge
        in: (0 @ (1/2) extent: (1) @ (1/2))
        borderWidth: 1.
    ^gaugeSet! !
```

!SLCGaugedPatch methodsFor: 'updating'!

refigureThings
    "This is the response to the update: #color message."
    "Recompute the triplet with the new ivValues."
    "Update the palette with that triplet."
    "Updating the cost using the new numbers is take care of with
update: #cost."
    "I am using direct instance variable access here for speed."

| codedValues |
    codedValues _ OrderedCollection new.
    1 to: self variables size do: [:n | codedValues add: (regression
convertValue: (ivValues at: n)
                    of: n)].
    triplet value1: (regression calculateValue: 1 using: codedValues).
    triplet value2: (regression calculateValue: 2 using: codedValues).
    triplet value3: (regression calculateValue: 3 using: codedValues).
    gunTriplet _ calibration computeGunsFrom: triplet.
    device
        setColorMapEntry: 3
        toRedValue: gunTriplet value1
        greenValue: gunTriplet value2
        blueValue: gunTriplet value3.! !

update: aSymbol
    self halt.
    aSymbol = #cost
        ifTrue: [cost _ cost + 1]
        ifFalse: [aSymbol = #color ifTrue: [self refigureThings]]! !

!SLCGaugedPatch methodsFor: 'ratio gauge stuff'!

ratioGauge3
    | gaugeSet |
    gaugeSet _ View new model: self.
    gaugeSet borderWidth: 1.
    gaugeSet
        addSubView: (LabelView label:'percent')
        in: (0 @ 0 extent: (1) @ (1 / 8))
        borderWidth: 1.

```
gaugeSet
    addSubView: (LabelView label:((self variables at:3) name))
    in: (0 @ (1/8) extent: (1) @ (1 / 8))
    borderWidth: 1.

"DIGIT GAUGES"
gaugeSet
    addSubView: self value3ADigitGauge
    in: (0 @ (1/4) extent: (1/2) @ (1/8))
    borderWidth: 1.

gaugeSet
    addSubView: self value3BDigitGauge
    in: ((1/2) @ (1/4) extent: (1/2) @ (1/8))
    borderWidth: 1.

"BAR GAUGES"
gaugeSet
    addSubView: self value3ABarGauge
    in: (0 @ (3/8) extent: (1/2) @ (5/8))
    borderWidth: 1.

gaugeSet
    addSubView: self value3BBarGauge
    in: ((1/2) @ (3/8) extent: (1/2) @ (5/8))
    borderWidth: 1.
^gaugeSet!

ratioGauge4
    | gaugeSet |
    gaugeSet _ View new model: self.
    gaugeSet borderWidth: 1.
    gaugeSet
        addSubView: (LabelView label:'percent')
        in: (0 @ 0 extent: (1) @ (1 / 8))
        borderWidth: 1.
    gaugeSet
        addSubView: (LabelView label:((self variables at:4) name))
```

```
            in: (0 @(1/8) extent: (1) @ (1 / 8))
        borderWidth: 1.

"DIGIT GAUGES"
    gaugeSet
        addSubView: self value4ADigitGauge
        in: (0 @ (1/4) extent: (1/2) @ (1/8))
        borderWidth: 1.

gaugeSet
        addSubView: self value4BDigitGauge
        in: ((1/2) @ (1/4) extent: (1/2) @ (1/8))
        borderWidth: 1.

"BAR GAUGES"
    gaugeSet
        addSubView: self value4ABarGauge
        in: (0 @ (3/8) extent: (1/2) @ (5/8))
        borderWidth: 1.

gaugeSet
         addSubView: self value4BBarGauge
         in: ((1/2) @ (3/8) extent: (1/2) @ (5/8))
         borderWidth: 1.
    ^gaugeSet!

value3A
    | r |
    r _ self ivValues at: 3. "The ratio"
    ^((r * 100)/(1 + r))!

value3A: aNumber
    aNumber = 100
        ifTrue: [self ivValues at: 3 put: 999999]
        ifFalse: [self ivValues at: 3 put: (aNumber / (100 -
aNumber) asFloat)].
    self changed: #value3A.
    self changed: #value3B.
    self refigureThings!
``` value3ABarGauge
^BarGaugeView
                    on: self
                    aspect: #value3A
                    change: #value3A:
                    range: (0 to: 100)
                    orientation: #vertical
                    type: #bar
                    needleDirection: nil!

value3ADigitGauge
    ^DigitGaugeView
        on: self
        ~~aspect: #value3A~~
        change: #value3A:
        range: (0 to: 100)!

value3B
    | r |
    r _ self ivValues at: 3. "The ratio"
    ^((100)/(1 + r))!

value3B: aNumber
    (aNumber = 0)ifFalse:[self ivValues at: 3 put: (((100-aNumber)/aNumber) asFloat)]
    ifTrue:[self ivValues at: 3 put: 999999].
    self changed: #value3A.
    self changed: #value3B.
    self refigureThings.!

value3BBarGauge
^BarGaugeView
                    on: self
                    aspect: #value3B
                    change: #value3B:
                    range: (0 to: 100)
                    orientation: #vertical
                    type: #bar
                    needleDirection: nil!

```
value3BDigitGauge
    ^DigitGaugeView
        on: self
        aspect: #value3B
        change: #value3B:
        range: (0 to: 100)!

value4A
    | r |
    r _ self ivValues at: 4. "The ratio"

^((r * 100)/(1 + r))!

value4A: aNumber
    aNumber = 100
        ifTrue: [self ivValues at: 4 put: 999999]
        ifFalse: [self ivValues at: 4 put: (aNumber / (100 -
aNumber) asFloat)].
    self changed: #value4A.
    self changed: #value4B.
    self refigureThings!

value4ABarGauge
^BarGaugeView
                on: self
                aspect: #value4A
                change: #value4A:
                range: (0 to: 100)
                orientation: #vertical
                type: #bar
                needleDirection: nil!

value4ADigitGauge
    ^DigitGaugeView
        on: self
        aspect: #value4A
        change: #value4A:
        range: (0 to: 100)!

value4B
```

```
| r |
r _ self ivValues at: 4. "The ratio"
^((100)/(1 + r))!
``` value4B: aNumber

```
(aNumber = 0)ifFalse:[self ivValues at: 4 put: (((100-
aNumber)/aNumber) asFloat)]
    ifTrue:[self ivValues at: 4 put: 999999].
self changed: #value4A.
self changed: #value4B.
self  refigureThings.!

value4BBarGauge
^BarGaugeView
                         on: self
                         aspect: #value4B
                         change: #value4B:
                         range: (0 to: 100)
                         orientation: #vertical
                         type: #bar
                         needleDirection: nil!

value4BDigitGauge
    ^DigitGaugeView
        on: self
        aspect: #value4B
        change: #value4B:
        range: (0 to: 100)! !

!SLCGaugedPatch methodsFor: 'building'!

buildAndAssembleBrowser
    "I'll return a StandardSystem view. I'm called by openOn: in this
class"
    "I have an experiment already."
    "INSTANCE VARIABLE SETUP"
    "I need to set the ivValues to their center values"

| gaugePanel patchPanel lbl topView exp ivs theTriplet
surroundTriplet |
```

```
exp _ self experiment trajectory.
self ivValues: OrderedCollection new.
ivs _ self ivValues.
1 to: exp variableDefinitions size do: [:n | ivs add: (exp
variableDefinitions at: n) center].
"I need to calculate the colorTriplet corresponding to those
ivValues"
triplet _ SLLabHunterColor new.
self refigureThings. "This is what 'update:#color' invokes"
"I need to calculate the cost associated with that recipe"
cost _ 100.
"--- VIEW BUILDING ---"
"GAUGE PANEL"
gaugePanel _ self buildGaugePanel.
"PATCH PANEL"
patchPanel _ self buildPatchPanelWith: triplet.
"I need to set up the costPanel"
"I need to set up the descriptionPanel with the text description
of the
    experiment"
"TOP VIEW CREATION"
lbl _ self experiment trajectory name, '   3:4'.
topView _ StandardSystemView
            model: self
            label: lbl
            minimumSize: 250 @ 70.
topView cacheRefresh: false.
topView borderWidth: 1.
"TOPVIEW ASSEMBLY"
topView
    addSubView: gaugePanel
    in: (0 @ 0 extent: 1 @ (1 / 2))
    borderWidth: 1.
topView
    addSubView: patchPanel
    in: (0 @ (1 / 2) extent: 1 @ (1 / 2))
    borderWidth: 1.
"I will return the topView"
^topView!
``` buildGaugePanel

"This returns a GaugePanel ready for insertion into the topView."
"Figure out how many gauges"

| cnt fraction panel | cnt _ self experiment trajectory variableDefinitions size.

cnt > 7 ifTrue: [self error: 'I can only handle a maximum of 7 variables!!'].

"Calculate how wide each one is"

fraction _ 1 / cnt.

"Create the panel"

panel _ View new model: self.

panel insideColor: Form white.

panel
    addSubView: self gaugeSet1
    in: (0 @ 0 extent: 1 / cnt @ 1)
    borderWidth: 1.

cnt = 1 ifTrue: [^panel].

panel
    addSubView: self gaugeSet2
    in: ((1/cnt) @ 0 extent: 1 / cnt @ 1)
    borderWidth: 1.

cnt = 2 ifTrue: [^panel].

panel
    addSubView: self gaugeSet3
    in: ((2/cnt) @ 0 extent: 1 / cnt @ 1)
    borderWidth: 1.

cnt = 3 ifTrue: [^panel].

panel
    ~~addSubView: self gaugeSet4~~
    in: ((3/cnt) @ 0 extent: 1 / cnt @ 1)
    borderWidth: 1.

cnt = 4 ifTrue: [^panel].

panel
    addSubView: self gaugeSet5
    in: ((4/cnt) @ 0 extent: 1 / cnt @ 1)
    borderWidth: 1.

cnt = 5 ifTrue: [^panel].

panel

```
        addSubView: self gaugeSet6
        in: ((5/cnt) @ 0 extent: 1 / cnt @ 1)
        borderWidth: 1.
    cnt = 6 ifTrue: [^panel].
    panel
        addSubView: self gaugeSet7
        in: ((6/cnt) @ 0 extent: 1 / cnt @ 1)
        borderWidth: 1.
    ^panel!

buildPatchPanelWith: aTriplet
    "here we build 2 views, one imbedded in the other, to display the
color"
    "This one defaults to a single patch in the center of the surround
on index 3
    for the regressed color."

| patchPanel theTriplet thePatch tripletCoTwo ind |
    patchPanel _ View new.
    thePatch _ ColorFormView new.
    ind _ SLCMapIndex new. ind index: 3.
    thePatch model: ind.
    patchPanel
        addSubView: thePatch
        in: (0.2 @ 0.2 extent: 0.6 @ 0.6)
        borderWidth: 1.

^patchPanel!

buildPatchPanelWith: aTriplet andSurround: surroundTriplet
    "here we build 2 views, one imbedded in the other, to display the
color"
    "Index 4 is used for the surround"
    "This one defaults to a single patch in the center of the surround
on index 3
    for the regressed color."

| patchPanel theTriplet thePatch tripletCoTwo |
    patchPanel _ SLCColoredBoxesView new.
    patchPanel model: self.
```

```
theTriplet _ OrderedCollection new.
theTriplet add: surroundTriplet.
patchPanel
        buildAndAssembleForInsertionUsing: theTriplet
        IndexBase: 4
        rows: 1
        columns: 1.
thePatch _ SLCColoredBoxesView new.
thePatch model: self.
tripletCoTwo _ OrderedCollection new.
tripletCoTwo add: aTriplet.
thePatch
        buildAndAssembleForInsertionUsing: tripletCoTwo
        IndexBase: 3
        rows: 1
        columns: 1.
patchPanel
        addSubView: thePatch
        in: (0.2 @ 0.2 extent: 0.6 @ 0.6)
        borderWidth: 1.
^patchPanel! !

!SLCGaugedPatch methodsFor: 'accessing'!

calibration
        "return the value of calibration.
        For a description of this instance variable, see the comment
        in the accessing method 'calibration:'."

^calibration!

calibration: aParameter
        "set the value of calibration.
        aParameter is expected to be of the class aClass.
        This instance variable is used to <explanation>."

calibration _ aParameter!

cost
        "return the value of cost.
```

```
        For a description of this instance variable, see the comment
        in the accessing method 'cost:'."

^cost!

cost: aParameter
        "set the value of cost.
        aParameter is expected to be of the class aClass.
        This instance variable is used to <explanation>."

cost _ aParameter!

device
        "return the value of device.
        For a description of this instance variable, see the comment
        in the accessing method 'device:'."

^device!

device: aParameter
        "set the value of device.
        aParameter is expected to be of the class aClass.
        This instance variable is used to <explanation>."

device _ aParameter!

experiment
        "return the value of experiment.
        For a description of this instance variable, see the comment
        in the accessing method 'experiment:'."

^experiment!

experiment: aParameter
        "set the value of experiment.
        aParameter is expected to be of the class aClass.
        This instance variable is used to <explanation>."

experiment _ aParameter!

ivValues
```

"return the value of ivValues.

For a description of this instance variable, see the comment in the accessing method 'ivValues:'."

^ivValues!

ivValues: aParameter

"set the value of ivValues.

aParameter is expected to be of the class aClass.

This instance variable is used to <explanation>."

ivValues _ aParameter!

regression

"return the value of regression.

For a description of this instance variable, see the comment in the accessing method 'regression:'."

^regression!

regression: aParameter

"set the value of regression.

aParameter is expected to be of the class aClass.

This instance variable is used to <explanation>."

regression _ aParameter!

triplet

"return the value of triplet.

For a description of this instance variable, see the comment in the accessing method 'triplet:'."

^triplet!

triplet: aParameter

"set the value of triplet.

aParameter is expected to be of the class aClass.

This instance variable is used to <explanation>."

triplet _ aParameter!

variables

```
    ^self experiment trajectory variableDefinitions! !

!SLCGaugedPatch methodsFor: 'releasing'!

release
experiment release.
ivValues do:[:each | ivValues at: each release].
ivValues _ nil.
triplet _ nil.
cost _ nil.
calibration _ nil.
device _ nil.
gunTriplet _ nil.
regression _ nil.
super release.! !
"-- -- -- -- -- -- -- -- -- -- -- -- -- -- -- -- -- --"!

SLCGaugedPatch class
    instanceVariableNames: ''!

!SLCGaugedPatch class methodsFor: 'instance creation'!

openOn: anExperiment
    "SLCGaugedPatch openOn: (SLCExperiment fromUserExcelTextFile:
'Paul''s Reality:EP120.ex.txt')"
| gaugedPatch |
    "create and schedule a new instance of me on anExperiment with
center values for each of the independent variables."
    gaugedPatch _ self new.
    "Set my experiment."
    gaugedPatch experiment: anExperiment.
    gaugedPatch calibration: SLCColorCalibration new.
    gaugedPatch device: ColorDevice new.
    gaugedPatch regression: (SLCSimpleRegression on: anExperiment).
    "buildAndAssembleBrowser returns a StandardSystemView all set up."
    gaugedPatch buildAndAssembleBrowser controller open! !

SLColorTripletBrowser subclass: #SLCTripletPatchBrowser
    instanceVariableNames: 'red green blue patchIndex surroundIndex
``` surroundGray calibration ' classVariableNames: '' poolDictionaries: '' category: 'Color Science Tools'!
SLCTripletPatchBrowser comment:
'red, green and blue are the gun values for the patch <0..maxGunValue of the ColorDevice>
patchIndex is the CLUT index used for the patch <0..maxMapIndex>
surroundGray is the level of the gray surround <0..100>
surroundIndex is where the gray is stored in the CLUT <0..maxMapIndex>'!

!SLCTripletPatchBrowser methodsFor: 'scheduling'!

buildAndAssembleBrowser
    | topView patch labelHeight gaugeHeight patchHeight cd gray surround |

"build the subviews and arrange them in a SSV for scheduling"

topView _ StandardSystemView
        model: self
        label: 'Triplet Patch Browser'
        minimumSize: 250 @ 70.
    topView cacheRefresh: false.
    topView borderWidth: 1.
labelHeight _ 1/7.
gaugeHeight _ 1/3-labelHeight.
patchHeight _ 1-(labelHeight+gaugeHeight).
"Left gauge -- 0@0 extent 1/3 @ labelHeight + gaugeHeight"
    topView
        addSubView:
        ~~(LabelView label: (colorTriplet colorSpaceLabels at: 1))~~
        in: (0 @ 0 extent: (1 / 3) @ (labelHeight))
        borderWidth: 1.

topView
        addSubView: self value1DigitGauge
        in: (0 @ (labelHeight) extent: (5 / 21) @ (gaugeHeight))
        borderWidth: 1.

```
        topView
                addSubView: self value1BarGauge
                in: ((5/21) @ (labelHeight) extent: (2 / 21) @
(gaugeHeight))
                borderWidth: 1.

"Center gauge -- 1/3 @ 0 extent 1/3 @ gaugeHeight"
        topView
                addSubView:
                (LabelView label:(colorTriplet colorSpaceLabels at: 2))
                in: ((1/3) @ 0 extent: (1 / 3) @ (labelHeight))
                borderWidth: 1.

topView
                addSubView: self value2DigitGauge
                in: ((1/3) @ (labelHeight) extent: (5 / 21) @ (gaugeHeight))
                borderWidth: 1.

topView
                addSubView: self value2BarGauge
                in: ((12/21) @ (labelHeight) extent: (2 / 21) @
(gaugeHeight))
                borderWidth: 1.

"Right gauge -- 2/3 @ 0 extent 1/3 @ gaugeHeight"
        topView
                addSubView:
                (LabelView label:(colorTriplet colorSpaceLabels at: 3))
                in: ((2/3) @ 0 extent: (1 / 3) @ (labelHeight))
                borderWidth: 1.

topView
                addSubView: self value3DigitGauge
                in: ((2/3) @ (labelHeight) extent: (5 / 21) @ (gaugeHeight))
                borderWidth: 1.

topView
                addSubView: self value3BarGauge
                in: ((19/21) @ (labelHeight) extent: (2/21) @ (gaugeHeight))
                borderWidth: 1.
```

```
"The colorPatch"
    surround _ SLCColoredRectangle new.
    surround mapIndex: 5.
    cd _ ColorDevice new.
    gray _ (cd maxGunValue).
    cd setColorMapEntry: 5 toRedValue: gray greenValue: gray
blueValue: gray.

patch _ SLCColoredRectangle new.
    patch mapIndex: 6.
    cd _ ColorDevice new.
    gray _ (cd maxGunValue) // 2.
    cd setColorMapEntry: 6 toRedValue: gray greenValue: 0 blueValue:
0.

surround addSubView: patch
        in: ((1/4)@(1/4) extent: (1/2)@(1/2))
        borderWidth: 1.

topView
        addSubView: surround
        in: ((0) @ (gaugeHeight + labelHeight) extent: (1) @
(patchHeight))
        borderWidth: 1.
^topView!

buildAndAssembleNewBrowser
    | topView patch labelHeight gaugeHeight patchHeight cd gray
surround labelWidth |
    "build the subviews and arrange them in a SSV for scheduling"

topView _ StandardSystemView
            model: self
            label: 'Triplet Patch Browser  5:6'
            minimumSize: 250 @ 70.
    topView cacheRefresh: false.
    topView borderWidth: 1.
labelHeight _ 1/20.
labelWidth _ 1/10.
```

```
gaugeHeight _ 1-(2*labelHeight).
patchHeight _ 1.
"Left gauge -- 0@0 extent 1/3 @ labelHeight + gaugeHeight"
    topView
        addSubView:
        (LabelView label:(colorTriplet colorSpaceLabels at: 1))
        in: (0 @ 0 extent: (labelWidth) @ (labelHeight))
        borderWidth: 1.

topView
        addSubView: self value1DigitGauge
        in: (0 @ (labelHeight) extent: (labelWidth) @ (labelHeight))
        borderWidth: 1.

topView
        addSubView: self value1BarGauge
        in: (0 @ (2*labelHeight) extent: (labelWidth) @
(gaugeHeight))
        borderWidth: 1.

"Center gauge -- 1/3 @ 0 extent 1/3 @ gaugeHeight"
    topView
        addSubView:
        (LabelView label:(colorTriplet colorSpaceLabels at: 2))
        in: ((labelWidth) @ 0 extent: (labelWidth) @ (labelHeight))
        borderWidth: 1.

topView
        addSubView: self value2DigitGauge
        in: ((labelWidth) @ (labelHeight) extent: (labelWidth) @
(labelHeight))
        borderWidth: 1.

topView
        addSubView: self value2BarGauge
        in: ((labelWidth) @ (2*labelHeight) extent: (labelWidth) @
(gaugeHeight))
        borderWidth: 1.
```

"Right gauge -- 2/3 @ 0 extent 1/3 @ gaugeHeight"
    topView
        addSubView:
        (LabelView label:(colorTriplet colorSpaceLabels at: 3))
        in: ((2*labelWidth) @ 0 extent: (labelWidth) @ (labelHeight))
        borderWidth: 1.

topView
        addSubView: self value3DigitGauge
        in: ((2*labelWidth) @ (labelHeight) extent: (labelWidth) @ (labelHeight))
        borderWidth: 1.

topView
        addSubView: self value3BarGauge
        in: ((2*labelWidth) @ (2*labelHeight) extent: (labelWidth) @ (gaugeHeight))
        borderWidth: 1.
"The colorPatch"
    surround _ View new.

patch _ SLCColoredRectangle new.
    patch mapIndex: 6.
    cd _ ColorDevice new.
    gray _ (cd maxGunValue) // 2.
    cd setColorMapEntry: 6 toRedValue: 0 greenValue: 0 blueValue: 0.

surround addSubView: patch
        in: ((1/4)@(1/4) extent: (1/2)@(1/2))
        borderWidth: 1.

topView
        addSubView: surround
        in: ((3 * labelWidth) @ 0 extent: (1-(3*labelWidth)) @ 1)
        borderWidth: 1.
^topView!

buildAndAssembleNewBrowserForInsertion

```
| topView patch labelHeight gaugeHeight patchHeight cd gray
surround labelWidth aView |
    "build the subviews and arrange them in a SSV for scheduling"

aView _ View new model: self.
        topView cacheRefresh: false.
        topView borderWidth: 1.
labelHeight _ 1/20.
labelWidth _ 1/10.
gaugeHeight _ 1-(2*labelHeight).
patchHeight _ 1.
"Left gauge -- 0@0 extent 1/3 @ labelHeight + gaugeHeight"
        topView
            addSubView:
            (LabelView label:(colorTriplet colorSpaceLabels at: 1))
            in: (0 @ 0 extent: (labelWidth) @ (labelHeight))
            borderWidth: 1.

topView
            addSubView: self value1DigitGauge
            in: (0 @ (labelHeight) extent: (labelWidth) @ (labelHeight))
            borderWidth: 1.

topView
            addSubView: self value1BarGauge
            in: (0 @ (2*labelHeight) extent: (labelWidth) @
(gaugeHeight))
            borderWidth: 1.

"Center gauge -- 1/3 @ 0 extent 1/3 @ gaugeHeight"
        topView
            addSubView:
            (LabelView label:(colorTriplet colorSpaceLabels at: 2))
            in: ((labelWidth) @ 0 extent: (labelWidth) @ (labelHeight))
            borderWidth: 1.

topView
            addSubView: self value2DigitGauge
            in: ((labelWidth) @ (labelHeight) extent: (labelWidth) @
```

```
(labelHeight))
        borderWidth: 1.

topView addSubView: self value2BarGauge in: ((labelWidth) @ (2*labelHeight) extent: (labelWidth) @
(gaugeHeight))

borderWidth: 1.

"Right gauge -- 2/3 @ 0 extent 1/3 @ gaugeHeight"
    topView addSubView:

(LabelView label:(colorTriplet colorSpaceLabels at: 3))

in: ((2*labelWidth) @ 0 extent: (labelWidth) @
(labelHeight))

borderWidth: 1.

topView addSubView: self value3DigitGauge in: ((2*labelWidth) @ (labelHeight) extent: (labelWidth) @
(labelHeight))

borderWidth: 1.

topView addSubView: self value3BarGauge in: ((2*labelWidth) @ (2*labelHeight) extent: (labelWidth) @
(gaugeHeight))

borderWidth: 1.
"The colorPatch"
    surround _ SLCColoredRectangle new.
    surround mapIndex: 5.
    cd _ ColorDevice new.
    gray _ (cd maxGunValue).
    cd setColorMapEntry: 5 toRedValue: gray greenValue: gray
blueValue: gray.

patch _ SLCColoredRectangle new.
    patch mapIndex: 6.
    cd _ ColorDevice new.
```

```
gray _ (cd maxGunValue) // 2.
cd setColorMapEntry: 6 toRedValue: gray greenValue: 0 blueValue:
0.

surround addSubView: patch
    in: ((1/4)@(1/4) extent: (1/2)@(1/2))
    borderWidth: 1.

topView
    addSubView: surround
    in: ((3 * labelWidth) @ 0 extent: (1-(3*labelWidth)) @ 1)
    borderWidth: 1.
^topView! !

!SLCTripletPatchBrowser methodsFor: 'private'!

badComputeGunValues
    | max capL a b capX capY capZ k redNormalize greenNormalize
blueNormalize offset |
"bogus for Lab kindof"
max _ (ColorDevice new) maxGunValue.
capL _ self colorTriplet value1.
a _ self colorTriplet value2.
b _ self colorTriplet value3.
"calculate X,Y,Z (see Gardner manual)"
capX _ (capL / 100) * ((0.5602 * a) + (0.9804 * capL)).
capY _ (capL * capL)/100.
capZ _ (capL / 59.27)*((0.7 * capL) - b).
"Now, calculate red, green and blue gun values"
"k and the normalization factors are bogus here"
"the coeefficients are based on actual SuperMac Color monitor display
phosphor chromaticities."
"see Cowan SIGGRAPH '84, p 48"
offset _ 170.0.
k _ 145.0.
redNormalize _ greenNormalize _ blueNormalize _ 1.
red _ ((k/redNormalize) * (offset + (2.167 * capX) - (0.937 * capY) -
(0.344 * capZ)))//1.
green _ ((k/greenNormalize) * (offset + (-1.264 * capX) + (2.225 * capY)
+ (0.066 * capZ)))//1.
```

```
blue _ ((k/blueNormalize)* (offset + (0.097 * capX) - (0.288 * capY) +
(1.278 * capZ)))//1.
patchIndex _ 6!

changePatchGuns

| cd | cd _ ColorDevice new.

cd
        setColorMapEntry: patchIndex
        toRedValue:   red
        greenValue:   green
        blueValue:    blue!

changeSurroundGuns

"compute Gun level from surroundGray value which is a percentage"

| cd gray |
    cd _ ColorDevice new.
    gray _ cd maxGunValue * (surroundGray / 100).
    cd
        setColorMapEntry: surroundIndex
        toRedValue: gray
        greenValue: gray
        blueValue: gray!

recomputeBogusGunValues

| max 1 |
"bogus for Lab kindof"
max _ (ColorDevice new) maxGunValue.
red _ ((0.5 + ((self colorTriplet value2) /122)) * max)//1.
blue _ ((0.5 - ((self colorTriplet value3)/122)) * max)//1.
green_(((self colorTriplet value1)/100) * max)//1.
patchIndex _ 6.!

recomputeGunValues

| rgbTriplet |
    rgbTriplet _ calibration computeGunsFrom: self colorTriplet.
```

```
    (rgbTriplet isNil)ifFalse:[red _ rgbTriplet redGun.
    green _ rgbTriplet greenGun.
    blue _ rgbTriplet blueGun]ifTrue:[red_green_blue_0].
    patchIndex _ 6! !
```

!SLCTripletPatchBrowser methodsFor: 'indirect accessing'!

value1: aNumber
    "set value1 in my colorTriplet"
    "This is sent when the gauge is jerked around"

self colorTriplet value1: ((aNumber * 100) truncated / 100) asFloat.
"Here I change the CLUT. I calculate the gun values now associated with
the colorSystem and write them to the CLUT at patchIndex."
self recomputeGunValues.
self changePatchGuns.!

value2: aNumber
    "set value1 in my colorTriplet"
    "This is sent when the gauge is jerked around"

self colorTriplet value2: ((aNumber * 100) truncated / 100) asFloat.
"Here I change the CLUT. I calculate the gun values now associated with
the colorSystem and write them to the CLUT at patchIndex."
self recomputeGunValues.
self changePatchGuns.!

value3: aNumber
    "set value1 in my colorTriplet"
    "This is sent when the gauge is jerked around"

self colorTriplet value3: ((aNumber * 100) truncated / 100) asFloat.
"Here I change the CLUT. I calculate the gun values now associated with
the colorSystem and write them to the CLUT at patchIndex."
self recomputeGunValues.
self changePatchGuns! !

!SLCTripletPatchBrowser methodsFor: 'accessing'!

blue
    "return the value of blue.

For a description of this instance variable, see the comment
in the accessing method 'blue:'."

^blue!

blue: aParameter
    "set the value of blue.
    aParameter is expected to be of the class aClass.
    This instance variable is used to <explanation>."

blue _ aParameter!

calibration
^calibration!

calibration: aColorCalibration
calibration _ aColorCalibration!

green
    "return the value of green.
    For a description of this instance variable, see the comment
    in the accessing method 'green:'."

^green!

green: aParameter
    "set the value of green.
    aParameter is expected to be of the class aClass.
    This instance variable is used to <explanation>."

green _ aParameter!

patchIndex
    "return the value of patchIndex.
    For a description of this instance variable, see the comment
    in the accessing method 'patchIndex:'."

^patchIndex!

patchIndex: aParameter

```
        "set the value of patchIndex.
        aParameter is expected to be of the class aClass.
        This instance variable is used to <explanation>."

patchIndex _ aParameter!

red
        "return the value of red.
        For a description of this instance variable, see the comment
        in the accessing method 'red:'."

^red!

red: aParameter
        "set the value of red.
        aParameter is expected to be of the class aClass.
        This instance variable is used to <explanation>."

red _ aParameter!

surroundGray
        "return the value of surroundGray.
        For a description of this instance variable, see the comment
        in the accessing method 'surroundGray:'."

^surroundGray!

surroundGray: aParameter
        "set the value of surroundGray.
        aParameter is expected to be of the class aClass.
        This instance variable is used to <explanation>."

surroundGray _ aParameter!

surroundIndex
        "return the value of surroundIndex.
        For a description of this instance variable, see the comment
        in the accessing method 'surroundIndex:'."

^surroundIndex!
``` surroundIndex: aParameter

"set the value of surroundIndex.

aParameter is expected to be of the class aClass.

This instance variable is used to <explanation>."

surroundIndex _ aParameter! !

!SLCTripletPatchBrowser methodsFor: 'releasing'!

release
    red _ nil.
    green _ nil.
    blue _ nil.
    patchIndex _ nil.
    surroundIndex _ nil.
    surroundGray _ nil.
    calibration _ nil.
    super release!

removeDependent: anObject
    "this message is intercepted to help break some other dependencies . when an
    instance of me is scheduled alone"

self release.
    super removeDependent: anObject! !
"-- -- -- -- -- -- -- -- -- -- -- -- -- -- -- -- -- -- "!

SLCTripletPatchBrowser class
    instanceVariableNames: ''!

!SLCTripletPatchBrowser class methodsFor: 'instance creation'!

newOn: anSLColorTriplet
    | ctb |
    "create and return a new instance of me on anSLColorTriplet"

ctb _ self new.
ctb colorTriplet: anSLColorTriplet.

```
ctb calibration: SLCColorCalibration new.
^ctb!

on: anSLColorTriplet

| ctb |

"create and return a new instance of me on anSLColorTriplet"

ctb _ self new.
    ctb colorTriplet: anSLColorTriplet.
    ctb calibration: SLCColorCalibration new.
    ^ctb!

openNewOn: anSLColorTriplet
    "create and schedule a new instance of me on anSLColorTriplet"
    "SLCTripletPatchBrowser openNewOn: (SLLabHunterColor new)."
    "SLCTripletPatchBrowser openNewOn: (SLYxyColor new)."
    "SLCTripletPatchBrowser openNewOn: (SLRGBGunsColor new)."
    "SLCTripletPatchBrowser openNewOn: (SLXYZColor new)."
    | ctb |
    ctb _ self newOn: anSLColorTriplet.
    ctb buildAndAssembleNewBrowser controller open!

openOn: anSLColorTriplet
    "create and schedule a new instance of me on anSLColorTriplet"
    "SLCTripletPatchBrowser openOn: (SLLabHunterColor new)."
    "SLCTripletPatchBrowser openOn: (SLYxyColor new)."
    "SLCTripletPatchBrowser openOn: (SLRGBGunsColor new)."
    "SLCTripletPatchBrowser openOn: (SLXYZColor new)."
    | ctb |
    ctb _ self on: anSLColorTriplet.
    ctb buildAndAssembleBrowser controller open! !

SLObject subclass: #SLCThreeByThreeBrowser
    instanceVariableNames: 'experiment ivValues gridValues xIndex yIndex gridTriplets '
    classVariableNames: ''
    poolDictionaries: ''
    category: 'Color Science Tools'!
```

!SLCThreeByThreeBrowser methodsFor: 'color calculating'!

calculateValue: aNumber using: dataValues
    "aNumber is the regression equation to use related to a color triplet value.
    dataValues is expected to be an OrderedCollection of numbers."
    "start with intercept. calculate linear terms. calculate 2nd order terms."

| coefs temp |
    coefs _ self experiment coefficientsFor: aNumber.
    "this returns an OrderedCollection"
    "The zeroth order term"
    temp _ coefs at: 1.
    "The linear terms"
    1 to: self variableCount do: [:n | temp _ temp + ((coefs at: n + 1)
                            * (dataValues at: n))].
    "The pure second order terms"
    1 to: self variableCount do: [:n | temp _ temp + ((coefs at: self variableCount + n + 1)
                            * (dataValues at: n) * (dataValues at: n))].
    "The mixed terms"
    1 to: (self variableCount - 1) do: [:n | (n+1) to: self variableCount do: [:m |

"What coefficient index do I use?"
temp _ temp + ((coefs at: (self experiment coefficientIndexFor: n by: m))
                            * (dataValues at: n) * (dataValues at: m))]].
^ temp!

convertValue: aValue of: anIndex
    "This is generalized conversion routine that will use the appropriate formula for
    the type of conversion required."

| v temp |
    aValue isNil ifTrue: [^nil].

```
            anIndex > self variableCount
                ifTrue:
                    [self error: 'That variable doesn not exist to
CONVERT!!'.
                    ^nil].
        v _ self experiment trajectory variableDefinitions at: anIndex.
        v units = 'ratio'
                ifTrue:
                    [temp _ self ratioConvertValue: aValue of: anIndex.
                    ^temp].
        temp _ self normalizeValue: aValue of: anIndex.
        ^temp!
``` normalizeValue: aValue of: anIndex

"This routine normalizes an input value using the center and range values for the independent variable at index anIndex. Returns nil for bad input."

```
        | v val calc |
        anIndex > self variableCount
            ifTrue:
                [self error: 'That variable doesn not exist to
NORMALIZE!!'.
                ^nil].
        v _ self experiment trajectory variableDefinitions at: anIndex.
        "v is an ExtendedVariableDefinition now."
        val _ aValue.
        val < v min
            ifTrue: [val _ v min]
            ifFalse: [val > v max ifTrue: [val _ v max]].
        calc _ val - v center / v range.
        ^calc!
``` ratioConvertValue: aValue of: anIndex

"This routine normalizes an input value using the center and range values for the independent variable at index anIndex. Returns nil for bad input.

This is slightly different than a straight normalize. It is used to convert an input ratio to a coded (-1,0,1) value used for regressed value calculation."

```
    | v val calc inv |
    anIndex > self variableCount
        ifTrue:
            [self error: 'That variable does not exist to RATIO
CONVERT!!'.
            ^nil].
    v _ self experiment trajectory variableDefinitions at: anIndex.
    "v is an ExtendedVariableDefinition now."
    val _ aValue.
    val < v min
        ifTrue: [val _ v min]
        ifFalse: [val > v max ifTrue: [val _ v max]].
    val = 0 ifTrue: [inv _ 999999999]ifFalse:[inv _ 1/val].
    calc _ ((1/(1+inv) - v center) / v range).

^calc! !

!SLCThreeByThreeBrowser methodsFor: 'trajectory accessing'!

colorSpace

^self experiment trajectory colorSpace!

description

^self experiment trajectory description!

name

^self experiment trajectory name!

variableCount

^self experiment trajectory variableDefinitions size! !

!SLCThreeByThreeBrowser methodsFor: 'accessing'!

experiment
```

"return the value of experiment.

For a description of this instance variable, see the comment in the accessing method 'experiment:'."

^experiment!

experiment: aParameter

"set the value of experiment.

aParameter is expected to be of the class aClass.

This instance variable is used to <explanation>."

experiment _ aParameter!

gridTriplets

"return the value of gridTriplets.

For a description of this instance variable, see the comment in the accessing method 'gridTriplets:'."

| tripletClass |
gridTriplets isNil
    ifTrue:
        ["Figure out what class the Triplets should belong to."
        tripletClass _ SLColorTriplet allSubclasses detect:
[:each | each new colorSpace = self experiment trajectory colorSpace]
                        ifNone:
                            [self inform: 'That space does not exist!!'.
                            ^nil].
        gridTriplets _ OrderedCollection new.
        1 to: 9 do: [:n | gridTriplets add: tripletClass new].
        ].
    ^gridTriplets!

gridTriplets: aParameter

"set the value of gridTriplets.

aParameter is expected to be of the class OrderedCollection of elements of ColorTriplet subclasses. This instance variable is used."

gridTriplets _ aParameter!

gridValues
    "return the value of gridValues.
    For a description of this instance variable, see the comment
    in the accessing method 'gridValues:'."
gridValues isNil ifTrue:[gridValues _ OrderedCollection new.].
^gridValues!

gridValues: aParameter
    "set the value of gridValues.
    aParameter is expected to be of the class aClass.
    This instance variable is used to <explanation>."

gridValues _ aParameter!

ivValues
    "return the value of ivValues.
    For a description of this instance variable, see the comment
    in the accessing method 'ivValues:'."

ivValues isNil ifTrue:[ivValues _ OrderedCollection new.
        1 to: self variableCount do:[:n | ivValues add: nil]].
^ivValues!

ivValues: aParameter
    "set the value of ivValues.
    aParameter is expected to be of the class aClass.
    This instance variable is used to <explanation>."

ivValues _ aParameter!

xIndex
    "return the value of xIndex.
    For a description of this instance variable, see the comment
    in the accessing method 'xIndex:'."

^xIndex!

xIndex: aParameter
    "set the value of xIndex.

aParameter is expected to be of the class aClass.
This instance variable is used to <explanation>."

xIndex _ aParameter! !

yIndex
    "return the value of yIndex.
    For a description of this instance variable, see the comment
    in the accessing method 'yIndex:'."

^yIndex!

yIndex: aParameter
    "set the value of yIndex.
    aParameter is expected to be of the class aClass.
    This instance variable is used to <explanation>."

yIndex _ aParameter! !

!SLCThreeByThreeBrowser methodsFor: 'building'!

buildAndAssembleBrowser
    "SLCThreeByThreeBrowser newlyBuilt"
    | string param1 param2 varDefs vals message v temp minString maxString str minStream str2 maxStream theGrid |

"Find out what x and y axis variables are"
    varDefs _ self experiment trajectory variableDefinitions.
    xIndex _ 0.
    [xIndex = 0]
        whileTrue:
            [string _ FillInTheBlank request: 'Enter a variable name for the X axis:'.
            1 to: self variableCount do: [:n | string = (varDefs at: n) name ifTrue: [xIndex _ n]].
            xIndex = 0 ifTrue: [self error: 'No variable like that!!']].
    yIndex _ 0.
    [yIndex = 0]
        whileTrue:

```
        (string _ FillInTheBlank request: 'Enter a variable
name for the Y axis:'.
        1 to: self variableCount do: [:n | string = (varDefs
at: n) name ifTrue: [yIndex _ n]].
        yIndex = 0 ifTrue: [self error: 'No variable like
that!!']].
```

"Find out the values for every other variable in the collection"
vals _ self ivValues.
1 to: self variableCount do:[ "For each of the variables"
:n| ((n = xIndex) |( n = yIndex)) ifFalse:[ "If it's not the x or y index"
vals at: n put: nil.
[(ivValues at: n) = nil]whileTrue:[message _ 'Value for '.
v _ varDefs at: n.
str _ ReadWriteStream on: ''.
(v min) printOn: str.
minString _ str contents.
str2 _ ReadWriteStream on: ''.
(v max) printOn: str2.
maxString _ str2 contents.
message _ message , v name asString, ' (min: ', minString , ', max: ', maxString , ' ', v units, ')'.
string _ FillInTheBlank request: message.
vals at: n put: (string asNumber).
]]
ifTrue:[vals at: n put: nil "for the x and y axis related ~~variables since they are handled elsewise~~."]].
self ivValues: vals.

"The x and y variable indices are determined and the values of the other variables are set."

"Generate the Lab values for each cell in the grid"
"Always three in the X and three in the Y, -1,0, and 1 for now."
self makeCodedGrid. "This sets up a (-1,0,1) OrderedCollection of values for each of the cells in the grid in gridValues."
self calculateGridTriplets.

"At this point the OrderedCollection in gridTriplets should contain the Lab values of the Grid."

theGrid _ SLCColoredBoxesView new.

theGrid buildAndAssembleForInsertionUsing: gridTriplets IndexBase: 100 rows: 3 columns: 3.

^theGrid!

buildAndAssembleGrid

"SLCThreeByThreeBrowser newlyBuilt"

| string param1 param2 varDefs vals message v temp minString maxString str minStream str2 maxStream theGrid |

"Find out what x and y axis variables are"
varDefs _ self experiment trajectory variableDefinitions.
xIndex _ 0.
[xIndex = 0]
    whileTrue:
        [string _ FillInTheBlank request: 'Enter a variable name for the X axis:'.
        1 to: self variableCount do: [:n | string = (varDefs at: n) name ifTrue: [xIndex _ n]].

xIndex = 0 ifTrue: [self error: 'No variable like that!!']].
    yIndex _ 0.
    [yIndex = 0]
        whileTrue:
            [string _ FillInTheBlank request: 'Enter a variable name for the Y axis:'.
            1 to: self variableCount do: [:n | string = (varDefs at: n) name ifTrue: [yIndex _ n]].

yIndex = 0 ifTrue: [self error: 'No variable like that!!']].

"Find out the values for every other variable in the collection"
    vals _ self ivValues.
    1 to: self variableCount do:[ "For each of the variables"
    :n| ((n = xIndex) |( n = yIndex)) ifFalse:[ "If it's not the x or y index"

```
        vals at: n put: nil.
        [(ivValues at: n) = nil]whileTrue:[message _ 'Value for '.
        v _ varDefs at: n.
        str _ ReadWriteStream on: ''.
        (v min) printOn: str.
        minString _ str contents.
        str2 _ ReadWriteStream on: ''.
        (v max) printOn: str2.
        maxString _ str2 contents.
        message _ message , v name asString, ' (min: ', minString , ',
max: ', maxString , ' ', v units, ')'.
        string _ FillInTheBlank request: message.
        vals at: n put: (string asNumber).
        ]]
        ifTrue:[vals at: n put: nil "for the x and y axis related
variables since they are handled elsewise."]].
        self ivValues: vals.

"The x and y variable indices are determined and the values of the
other variables are set."
        "Generate the Lab values for each cell in the grid"
        "Always three in the X and three in the Y, -1,0, and 1 for now."
        self makeCodedGrid. "This sets up a (-1,0,1) OrderedCollection of
values for each of the cells in the grid in gridValues."
        self calculateGridTriplets.

"At this point the OrderedCollection in gridTriplets should
contain the Lab values of the Grid."
        ^gridTriplets!

buildAndAssembleNewGrid
    | varDefs vals message v str minString str2 maxString string |
    "SLCThreeByThreeBrowser newlyBuilt"
    self getXAndYIndices.
    self getVarValues.
    self makeCodedGrid.
    self calculateGridTriplets.
    ^gridTriplets!
```

```
calculateGridTriplets
    | inputs |
1 to: 9 do:[ :n |
    inputs _ gridValues at: n.
    (self gridTriplets at: n) value1: (self calculateValue: 1 using:
inputs).
    (self gridTriplets at: n) value2: (self calculateValue: 2 using:
inputs).
    (self gridTriplets at: n) value3: (self calculateValue: 3 using:
inputs)].
^gridTriplets!

getVarValues
    | varDefs vals message v str minString str2 maxString string |
    varDefs _ self experiment trajectory variableDefinitions.
    "Find out the values for every other variable in the collection"
    vals _ self ivValues.
    1 to: self variableCount do: [:n | "For each of the variables"
        n = xIndex | (n = yIndex)
            ifTrue: [vals at: n put: nil
                "for the x and y axis related variables since
they are handled
                elsewise."]
            ifFalse:
                ["If it's not the x or y index"
                vals at: n put: nil.
                [(ivValues at: n)
                    = nil]
                    whileTrue:
                        [message _ 'Value for '.
                        v _ varDefs at: n.
                        str _ ReadWriteStream on: ''.
                        v min printOn: str.
                        minString _ str contents.
                        str2 _ ReadWriteStream on: ''.
                        v max printOn: str2.
                        maxString _ str2 contents.
                        message _ message , v name asString
, ' (min: ' , minString , ', max: ' , maxString , ' ' , v units , ')'.
``` message.
```
                                string _ FillInTheBlank request:
                                vals at: n put: string asNumber]]].
    self ivValues: vals.!

getXAndYIndices
    "Find out what x and y axis variables are"

| varDefs aStream |
    varDefs _ self experiment trajectory variableDefinitions.
    aStream _ WriteStream on: (String new: 200).
    aStream nextPutAll: 'Pick Horizontal Variable:'; cr.
    xIndex _ 1.
    varDefs do: [:var | aStream nextPutAll: var name; cr].
    aStream skip: -1.
    [xIndex = 1]
        whileTrue:
            [xIndex _ (PopUpMenu labels: aStream contents lines:
#(1 )) startUp.
            xIndex > 1 ifFalse: [self error: 'You must pick
one!!']].
    xIndex _ xIndex - 1.
    "Because of header"
    aStream _ nil.
    aStream _ WriteStream on: (String new: 200).
    aStream nextPutAll: 'Pick Vertical Variable:'; cr.
    yIndex _ 1.
    1 to: varDefs size do: [:n | n = xIndex ifFalse: [aStream
nextPutAll: (varDefs at: n) name; cr]].
    aStream skip: -1.
    [yIndex = 1]
        whileTrue: [yIndex _ (PopUpMenu labels: aStream contents
lines: #(1 )) startUp].
    "xIndex is already normalized"
    yIndex _ yIndex - 1.
    "Now so is y"
    yIndex >= xIndex
        ifTrue: ["second pick was at or after position of first
pick"
``` yIndex _ yIndex + 1.
"In essence, bump it one"]!

makeCodedGrid

"Generate the Lab values for each cell in the grid"
"Always three in the X and three in the Y, -1,0, and 1 for now."
"Using (X,Y) notation:

------------------------------------
 1  |   (-1,1)    ||   (0,1)    ||   (1,1)    |
 0  |   (-1,0)    ||   (0,0)    ||   (1,0)    |
-1  |   (-1,-1)   ||   (0,-1)   ||   (1,-1)   |
    ------------------------------------
         -1            0             1

"

| codedValues codedVals codedOnes x y nTuple |

"Lazy initialize. This makes up a 9 triplet set of the proper sister class."

self gridTriplets.

"I'm doing this on purpose here to make sure it is empty for the add: below."

gridValues _ OrderedCollection new.

"codedValues is now set up as an -1,0,1 range n-tuple with nil for x and y vars."

codedValues _ OrderedCollection new.
1 to: self variableCount do: [:n | codedValues add: (self convertValue: (ivValues at: n)
            of: n)].

codedOnes _ #(-1 0 1 ) asOrderedCollection.
1 to: 3 do: [:row | 1 to: 3 do:

[:column |
    "Make a new one."
    nTuple _ OrderedCollection new.
    1 to: self variableCount do: [:n | nTuple add:
(codedValues at: n)].

```
                "Set up X and Y".
                x _ codedOnes at: column.
                y _ codedOnes at: 4 - row.
                "Cells numbered from upper left"
                nTuple at: xIndex put: x.
                nTuple at: yIndex put: y.

gridValues add: nTuple]]!

putLabelsOn
        | varDefs xName yName xLabel yLabel |
        varDefs _ self experiment trajectory variableDefinitions.
        xName _ varDefs at: xIndex name.
        yName _ varDefs at: yIndex name.
        xLabel _ LabelView label: xName.
        yLabel _ LabelView label: yName.! !

!SLCThreeByThreeBrowser methodsFor: 'releasing'!

release
experiment release.
experiment _ nil.
ivValues do:[:each | ivValues at: each release].
ivValues _ nil.
gridValues do:[:each | gridValues at: each release].
gridValues _ nil.
xIndex _ nil.
yIndex _ nil.
gridTriplets do:[:each | gridTriplets at: each release].
gridTriplets _ nil.

super release.! !
"-- -- -- -- -- -- -- -- -- -- -- -- -- -- -- -- -- -- "!

SLCThreeByThreeBrowser class
        instanceVariableNames: ''!

!SLCThreeByThreeBrowser class methodsFor: 'instance creation'!
```

```
on: anExperiment
    | tb tripletCollection |
    tb _ self new.
    tb experiment: anExperiment.
    tripletCollection _ tb buildAndAssembleGrid.
    ^SLCColoredBoxesView on: tripletCollection baseIndex: 10 rows: 3
columns: 3!

openLabeledOn: anExperiment
    | tb tripletCollection colors topView varDefs lbl xIndex yIndex v
valStr vals str varCount tag xName yName xLabel yLabel |
    tb _ self new.
    tb experiment: anExperiment.
    tripletCollection _ tb buildAndAssembleNewGrid.
    colors _ SLCColoredBoxesView
                on: tripletCollection
                baseIndex: 10
                rows: 3
                columns: 3.
    "Build the label"
    varDefs _ anExperiment trajectory variableDefinitions.
    lbl _ ' '.
    varCount _ anExperiment trajectory variableDefinitions size.
    1 to: varCount do:
        [:n |
        "For each of the variables"
        (tb ivValues at: n) isNil
            ifTrue: [tag _ nil]
            ifFalse:
                ["If it's not the x or y index"
                v _ varDefs at: n.
                valStr _ ReadWriteStream on: ''.
                (tb ivValues at: n)
                    printOn: valStr.
                tag _ v name asString , ' = ' , valStr
contents].
        tag = nil
            ifFalse:
                [lbl = ' ' ifFalse: [lbl _ lbl , '; '].
                lbl _ lbl , tag]].
```

```
xName _ (varDefs at: tb xIndex) name.
yName _ (varDefs at: tb yIndex) name.
xLabel _ LabelView label: xName.
yLabel _ LeftLabelView label: yName.
topView _ StandardSystemView
            model: self
            label: tb name
            minimumSize: 250 @ 250.
topView cacheRefresh: false.
topView borderWidth: 1.
topView
    addSubView: (LabelView label: lbl)
    in: (0.1 @ 0.025 extent: 0.8 @ 0.05)
    borderWidth: 1.
topView
    addSubView: xLabel
    in: (0.1 @ 0.93 extent: 0.8 @ 0.05)
    borderWidth: 0.
topView
    addSubView: yLabel
    in: (0.03 @ 0.1 extent: 0.05 @ 0.8)
    borderWidth: 0.
topView
    addSubView: colors
    in: (0.1 @ 0.1 extent: 0.8 @ 0.8)
    borderWidth: 1.
topView controller open!

openLabeledOn: anExperiment withBase: baseIndex
    | tb tripletCollection colors topView varDefs lbl xIndex yIndex v
valStr vals str varCount tag xName yName xLabel yLabel |
    tb _ self new.
    tb experiment: anExperiment.
    tripletCollection _ tb buildAndAssembleNewGrid.
    colors _ SLCColoredBoxesView
                on: tripletCollection
                baseIndex: baseIndex
                rows: 3
                columns: 3.
```

```
"Build the label"
varDefs _ anExperiment trajectory variableDefinitions.
lbl _ ' '.
varCount _ anExperiment trajectory variableDefinitions size.
1 to: varCount do:
    [:n |
    "For each of the variables"
    (tb ivValues at: n) isNil
        ifTrue: [tag _ nil]
        ifFalse:
            ["If it's not the x or y index"
            v _ varDefs at: n.
            valStr _ (tb ivValues at: n) printString.
            tag _ v name asString , ' = ' , valStr].
    tag = nil
        ifFalse:
            [lbl = ' ' ifFalse: [lbl _ lbl , '; '].
            lbl _ lbl , tag]].
xName _ (varDefs at: tb xIndex) name.
yName _ (varDefs at: tb yIndex) name.
xLabel _ LabelView label: xName.
yLabel _ LeftLabelView label: yName.
topView _ StandardSystemView
            model: self
            label: tb name , '    ' , baseIndex printString
, ':' , (baseIndex + 8) printString
            minimumSize: 250 @ 250.
topView cacheRefresh: false.
topView borderWidth: 1.
topView
    addSubView: (LabelView label: lbl)
    in: (0.1 @ 0.025 extent: 0.8 @ 0.05)
    borderWidth: 1.
topView
    addSubView: xLabel
    in: (0.1 @ 0.93 extent: 0.8 @ 0.05)
    borderWidth: 0.
topView
    addSubView: yLabel
```

```
            in: (0.03 @ 0.1 extent: 0.05 @ 0.8)
            borderWidth: 0.
    topView
            addSubView: colors
            in: (0.1 @ 0.1 extent: 0.8 @ 0.8)
            borderWidth: 1.
    topView controller open!

openOn: anExperiment
    | tb tripletCollection |
    tb _ self new.
    tb experiment: anExperiment.
    tripletCollection _ tb buildAndAssembleGrid.
    SLCColoredBoxesView openOn: tripletCollection baseIndex: 10 rows: 3 columns: 3!

startupOn: anExperiment
    | baseIndex string bottomCell limitCell |
    bottomCell _ 7.
    "1 through 6 reserved for fixed tools"
    limitCell _ 240. "A 3 by 3 takes nine map entries"
    baseIndex _ limitCell + 1.
    [baseIndex > limitCell | (baseIndex < bottomCell)]
            whileTrue:
                [string _ FillInTheBlank request: 'Beginning color map index? ( 7-240 )'.
                baseIndex _ string asNumber.
                baseIndex < bottomCell ifTrue: [self inform: 'Index to too low!! :' , baseIndex printString].
                baseIndex > limitCell ifTrue: [self inform: 'Index to high!! :' , baseIndex printString]].
    self openLabeledOn: anExperiment withBase: baseIndex! !
SLCThreeByThreeBrowser subclass: #SLCNByNBrowser
    instanceVariableNames: 'rows '
    classVariableNames: ''
    poolDictionaries: ''
    category: 'Color Science Tools'!

!SLCNByNBrowser methodsFor: 'accessing'!
```

```
gridTriplets
    "return the value of gridTriplets.
    For a description of this instance variable, see the comment
    in the accessing method 'gridTriplets:'."

| tripletClass cells |
    gridTriplets isNil
        ifTrue:
            ["Figure out what class the Triplets should belong
to."
            tripletClass _ SLColorTriplet allSubclasses detect:
[:each | each new colorSpace = self experiment trajectory colorSpace]
                        ifNone:
                            [self inform: 'That space soes
not exist!!'.
                            ^nil].
            gridTriplets _ OrderedCollection new.
            cells _ rows * rows.
            1 to: cells do: [:n | gridTriplets add: tripletClass
new].
            ].
    ^gridTriplets!

rows
    "return the value of rows.
    For a description of this instance variable, see the comment
    in the accessing method 'rows:'."

^rows!

rows: aParameter
    "set the value of rows.
    aParameter is expected to be of the class aClass.
    This instance variable is used to <explanation>."

rows _ aParameter! !

!SLCNByNBrowser methodsFor: .'building'!
```

```
calculateGridTriplets
        | inputs cells |
    cells _ rows * rows.
    1 to: cells do:[ :n |
            inputs _ gridValues at: n.
            (self gridTriplets at: n) value1: (self calculateValue: 1 using:
inputs).
            (self gridTriplets at: n) value2: (self calculateValue: 2 using:
inputs).
            (self gridTriplets at: n) value3: (self calculateValue: 3 using:
inputs)].
    ^gridTriplets!

makeCodedGrid
        "Generate the Lab values for each cell in the grid"

| codedValues codedVals codedOnes x y nTuple value |
        "Lazy initialize. This makes up a 9 triplet set of the proper
sister class."
        self gridTriplets.

"I'm doing this on purpose here to make sure it is empty for the
add: below."
        gridValues _ OrderedCollection new.

"codedValues is now set up as an -1,0,1 range n-tuple with nil for
x and y vars."
        codedValues _ OrderedCollection new.
        1 to: self variableCount do: [:n | codedValues add: (self
convertValue: (ivValues at: n)
                        of: n)].

codedOnes _ OrderedCollection new.
        1 to: rows do: [:n| value _ (2 * ((n-1)/(rows-1))) - 1.
            codedOnes add: value].
        1 to: rows do: [:row | 1 to: rows do:
                [:column |
                "Make a new one."
                nTuple _ OrderedCollection new.
```

```
                    1 to: self variableCount do: [:n | nTuple add:
(codedValues at: n)].

"Set up X and Y".
                    x _ codedOnes at: column.
                    y _ codedOnes at: (rows + 1) - row.
                    "Cells numbered from upper left"
                    nTuple at: xIndex put: x.
                    nTuple at: yIndex put: y.

gridValues add: nTuple]]! !
"-- -- -- -- -- -- -- -- -- -- -- -- -- -- -- -- -- -- "!

SLCNByNBrowser class
        instanceVariableNames: ''!

!SLCNByNBrowser class methodsFor: 'instance creation'!

openLabeledOn: anExperiment withBase: baseIndex size: rows
        | tb tripletCollection colors varDefs lbl varCount tag v valStr
xName yName xLabel yLabel topView baseTop |
        tb _ self new.
        tb rows: rows.
        tb experiment: anExperiment.
        tripletCollection _ tb buildAndAssembleNewGrid.
        colors _ SLCColoredBoxesView
                        on: tripletCollection
                        baseIndex: baseIndex
                        rows: rows
                        columns: rows.
        "Build the label"
        varDefs _ anExperiment trajectory variableDefinitions.
        lbl _ ' '.
        varCount _ anExperiment trajectory variableDefinitions size.
        1 to: varCount do:
                [:n |
                "For each of the variables"
                (tb ivValues at: n) isNil
                        ifTrue: [tag _ nil]
                        ifFalse:
```

```
                ["If it's not the x or y index"
                v _ varDefs at: n.
                valStr _ ReadWriteStream on: ''.
                (tb ivValues at: n)
                        printOn: valStr.
                tag _ v name asString , ' = ' , valStr
contents].
        tag = nil
            ifFalse:
                [lbl = ' ' ifFalse: [lbl _ lbl , '; '].
                lbl _ lbl , tag]].
    xName _ (varDefs at: tb xIndex) name.
    yName _ (varDefs at: tb yIndex) name.
    xLabel _ LabelView label: xName.
    yLabel _ LeftLabelView label: yName.
    baseTop _ baseIndex + (rows * rows) -1.
    topView _ StandardSystemView
                model: self
                label: (tb name, '    ', baseIndex printString,
':', baseTop printString)
                minimumSize: 250 @ 250.
    topView cacheRefresh: false.
    topView borderWidth: 1.
    topView
        addSubView: (LabelView label: lbl)
        in: (0.1 @ 0.025 extent: 0.8 @ 0.05)
        borderWidth: 1.
    topView
        addSubView: xLabel
        in: (0.1 @ 0.93 extent: 0.8 @ 0.05)
        borderWidth: 0.
    topView
        addSubView: yLabel
        in: (0.03 @ 0.1 extent: 0.05 @ 0.8)
        borderWidth: 0.
    topView
        addSubView: colors
        in: (0.1 @ 0.1 extent: 0.8 @ 0.8)
        borderWidth: 1.
    topView controller open!
```

```
startupOn: anExperiment

| baseIndex string rows limitCell topCell bottomCell | bottomCell _ 7.

"1 through 6 reserved for fixed tools"

limitCell _ 250.

baseIndex _ limitCell + 1.

[baseIndex > limitCell | (baseIndex < bottomCell)]

whileTrue:

[string _ FillInTheBlank request: 'Beginning color map
index? ( 7-250 )'.

baseIndex _ string asNumber.

baseIndex < bottomCell ifTrue: [self inform: 'Index to
too low!! :' , baseIndex printString].

baseIndex > limitCell ifTrue: [self inform: 'Index to
high!! :' , baseIndex printString]].

topCell _ limitCell + 1.

[topCell > limitCell]

whileTrue:

[string _ FillInTheBlank request: 'Cells on an edge? (
2-15 ) '.

rows _ string asNumber.

topCell _ baseIndex - 1 + (rows * rows).

topCell > limitCell ifTrue: [self inform: 'Top index
to high!! :' , topCell printString].

rows < 2 ifTrue:[self inform: 'Cannot be a single
cell.'. topCell _ limitCell + 1]
            ].

self openLabeledOn: anExperiment withBase: baseIndex size: rows! !
```

What is claimed is:

1. A method of forming a food product having a region of a preselected color comprising:

selecting at least one parameter from a group consisting of color producing agent, heating time value, color producing agent concentration value, final food color value, and substrate color value, each selected parameter defining an input parameter;

inputting each selected input parameter into a programmed computer means, the computer means programmed with a functional relationship between the selected input parameter and at least one other parameter included in the group, the computer means capable of providing output information, the output information defined as at least one of the parameters in the group other than the selected parameter; and making a food product suitable for microwave heating according to the output information so that when the food product is exposed to microwave radiation, a food product of the desired color is formed.

2. The method of claim 1 wherein the selected parameter is selected from the group consisting of a color producing agent, heating time value, and color producing agent concentration value, and the output information includes final food product color value including hue and chroma.

3. The method of claim 1 wherein the selected parameter is final food product color value including hue and chroma, and the output information includes at least one of the following group including the color producing agent, heating time value, and color producing agent concentration value.

4. The method of claim 1 wherein the programmed computer means comprises color graphics output means, and the method further comprises:
adjusting the food product color on the computer graphics output means until a desired color is achieved; and
outputting data from said computer means relating to the output information.

5. The method of claim 1 wherein the output information includes final food color value and the input parameter further includes at least one of the following:
a browning agent selected from the group consisting of a mixture of proteins and reducing sugars and a mixture of prereacted browning intermediates;
controllers selected from the group comprising metal ions, pH adjusting agents, and carriers; and
microwave exposure time for the product.

* * * * *